US009355403B2

(12) United States Patent
Thomas et al.

(10) Patent No.: US 9,355,403 B2
(45) Date of Patent: May 31, 2016

(54) ADAPTABLE RETAIL PRICING ENVIRONMENT AND ELECTRONIC EXCHANGE, DELIVERING CUSTOMIZED MOBILE SHOPPER REWARDS AND DISCOUNTS

(75) Inventors: David Edward Thomas, Dublin, CA (US); Jonathan G. Quinn, San Mateo, CA (US); Michael Robert Minasi, Burlingame, CA (US); Michelle Marian, San Ramon, CA (US); Mir Mohammad Aamir, Danville, CA (US); Tamara Ruth Pattison, Berkeley, CA (US)

(73) Assignee: SAFEWAY INC., Pleasanton, CA (US)

( * ) Notice: Subject to any disclaimer, the term of this patent is extended or adjusted under 35 U.S.C. 154(b) by 26 days.

(21) Appl. No.: 13/072,567

(22) Filed: Mar. 25, 2011

(65) Prior Publication Data
US 2011/0288922 A1 Nov. 24, 2011

Related U.S. Application Data

(60) Provisional application No. 61/282,742, filed on Mar. 25, 2010.

(51) Int. Cl.
*G06Q 30/00* (2012.01)
*G06Q 30/02* (2012.01)

(52) U.S. Cl.
CPC ............ *G06Q 30/0201* (2013.01); *G06Q 30/02* (2013.01); *G06Q 30/0222* (2013.01); *G06Q 30/0224* (2013.01)

(58) Field of Classification Search
CPC .......................... G06Q 30/02; G06Q 30/0224
See application file for complete search history.

(56) References Cited

U.S. PATENT DOCUMENTS 5,918,211 A * 6/1999 Sloane ............................ 705/16
6,076,070 A * 6/2000 Stack .............................. 705/20

(Continued)

FOREIGN PATENT DOCUMENTS

| CA | 2794092 A1 | 9/2011 |
| EP | 0973112 A2 | 1/2000 |

(Continued)

OTHER PUBLICATIONS

International Search Report and Written Opinion issued Aug. 19, 2011, in PCT/US 11/30015.

(Continued)

*Primary Examiner* — Namrata (Pinky) Boveja
*Assistant Examiner* — Thuy N Nguyen
(74) *Attorney, Agent, or Firm* — Conley Rose, P.C.; Rodney B. Carroll

(57) ABSTRACT

A mobile device including one or more linked memories to store a mobile application and customer data, the mobile application downloaded from a rewards server associated with a retailer, the customer data associated with a loyalty program of the retailer. The mobile device further includes a processor to display the mobile application via the user interface. The processor displays a log-in page permitting a customer to access at least one retailer account associated with the customer and displays a purchase price, via the mobile application, for at least one product associated with the retailer. The processor updates, upon reception of the customer input indicating selection of a payment option, the at least one retailer account to indicate a deduction of the displayed purchase price from at least one payment account.

20 Claims, 86 Drawing Sheets

(56) References Cited

U.S. PATENT DOCUMENTS

| | | | |
|---|---|---|---|
| 6,182,060 | B1 | 1/2001 | Hedgcock et al. |
| 6,233,682 | B1 * | 5/2001 | Fritsch .......................... 713/168 |
| 6,266,649 | B1 | 7/2001 | Linden et al. |
| 6,349,309 | B1 | 2/2002 | Aggarwal et al. |
| 6,513,015 | B2 * | 1/2003 | Ogasawara .................. 705/26.1 |
| 6,820,062 | B1 | 11/2004 | Gupta et al. |
| 7,343,319 | B1 | 3/2008 | Walker et al. |
| 7,379,933 | B1 | 5/2008 | Witkowski et al. |
| 7,552,069 | B2 | 6/2009 | Kepecs |
| 7,672,876 | B2 | 3/2010 | Bonner et al. |
| 7,734,513 | B2 | 6/2010 | Bonner et al. |
| 7,739,157 | B2 | 6/2010 | Bonner et al. |
| 7,742,952 | B2 | 6/2010 | Bonner et al. |
| 7,783,527 | B2 | 8/2010 | Bonner et al. |
| 7,856,377 | B2 | 12/2010 | Cohagan et al. |
| 8,271,466 | B2 * | 9/2012 | Pacella .......................... 707/705 |
| 8,275,699 | B2 | 9/2012 | Shader et al. |
| 8,412,590 | B2 * | 4/2013 | Elliott .......................... 705/26.9 |
| 8,527,395 | B2 | 9/2013 | Pylant |
| 2001/0018665 | A1 | 8/2001 | Sullivan et al. |
| 2002/0198772 | A1 | 12/2002 | Bates et al. |
| 2004/0044575 | A1 * | 3/2004 | Bakker et al. .................. 705/14 |
| 2004/0117249 | A1 | 6/2004 | Wang et al. |
| 2004/0225578 | A1 * | 11/2004 | Hager et al. ..................... 705/26 |
| 2005/0071780 | A1 * | 3/2005 | Muller et al. .................. 715/825 |
| 2005/0159974 | A1 * | 7/2005 | Moss et al. ......................... 705/1 |
| 2005/0189415 | A1 | 9/2005 | Fano et al. |
| 2006/0047573 | A1 | 3/2006 | Mitchell et al. |
| 2006/0085270 | A1 | 4/2006 | Ruckart |
| 2006/0277103 | A1 * | 12/2006 | Fujita et al. ..................... 705/14 |
| 2006/0293953 | A1 | 12/2006 | Nicholson |
| 2007/0094080 | A1 | 4/2007 | Wiken |
| 2007/0192183 | A1 * | 8/2007 | Monaco et al. .................. 705/14 |
| 2007/0198347 | A1 | 8/2007 | Muldoon |
| 2007/0265914 | A1 | 11/2007 | McClung, III |
| 2008/0040261 | A1 * | 2/2008 | Nix et al. ......................... 705/39 |
| 2008/0065490 | A1 | 3/2008 | Novick et al. |
| 2008/0262925 | A1 | 10/2008 | Kim et al. |
| 2009/0063351 | A1 | 3/2009 | Schmeyer et al. |
| 2009/0138433 | A1 | 5/2009 | Reid |
| 2009/0150218 | A1 * | 6/2009 | Brunner et al. .................. 705/10 |
| 2009/0222343 | A1 * | 9/2009 | Greene et al. .................... 705/14 |
| 2009/0265210 | A1 | 10/2009 | Bonner et al. |
| 2009/0276289 | A1 | 11/2009 | Dickinson et al. |
| 2010/0070346 | A1 | 3/2010 | Davis |
| 2010/0082447 | A1 * | 4/2010 | Lin et al. ......................... 705/26 |
| 2010/0109839 | A1 | 5/2010 | Bonner et al. |
| 2010/0268661 | A1 | 10/2010 | Levy et al. |
| 2010/0280880 | A1 | 11/2010 | Faith et al. |
| 2011/0047017 | A1 * | 2/2011 | Lieblang et al. ........... 705/14.13 |
| 2011/0066483 | A1 | 3/2011 | Salmon et al. |
| 2011/0191170 | A1 | 8/2011 | Zhang et al. |
| 2011/0191184 | A1 | 8/2011 | Blackhurst et al. |
| 2011/0213651 | A1 | 9/2011 | Milana et al. |
| 2011/0288906 | A1 | 11/2011 | Thomas et al. |
| 2011/0288924 | A1 | 11/2011 | Thomas et al. |
| 2011/0288925 | A1 | 11/2011 | Thomas et al. |
| 2011/0295670 | A1 | 12/2011 | Thomas et al. |
| 2011/0295671 | A1 | 12/2011 | Thomas et al. |
| 2012/0215625 | A1 | 8/2012 | Ramer et al. |
| 2013/0268356 | A1 | 10/2013 | Quatse et al. |

FOREIGN PATENT DOCUMENTS

| | | | |
|---|---|---|---|
| WO | WO-9935551 A2 * | 4/1999 | |
| WO | WO99/35551 * | 7/1999 | |
| WO | 0198998 A1 | 12/2001 | |
| WO | 2011119974 A1 | 9/2011 | |

OTHER PUBLICATIONS

Tata Consultancy Services. "Retail Industry Solutions." [online] Oct. 2009. [retrieved on Sep. 8, 2011], URL:http//:www.tcs.com/siteCollectionDocuments/Brochures/Retail_Brochure_TCS_Retail_Solutions_10_2009. pdf, 4 pages.

International Preliminary Report on Patentability Issued Jan. 7, 2013 in PCT/US11/30015 Filed Mar. 25, 2011.

Filing receipt and specification for provisional patent entitled "Personalized pricing system & associated methodology of delivering customized shopper rewards and discounts," by David Edward Thomas, et al., filed Mar. 25, 2010 as U.S. Appl. No. 61/282,742.

Office Action dated Dec. 6, 2012 (46 pages), U.S. Appl. No. 13/072,534, filed Mar. 25, 2011.

Office Action (Final) dated Oct. 17, 2013 (28 pages), U.S. Appl. No. 13/072,534, filed Mar. 25, 2011.

Advisory Action dated Jan. 3, 2014 (3 pages), U.S. Appl. No. 13/072,534, filed Mar. 25, 2011.

Office Action dated Jan. 28, 2014 (26 pages), U.S. Appl. No. 13/072,534, filed Mar. 25, 2011.

Office Action dated Dec. 20, 2012 (60 pages), U.S. Appl. No. 13/072,547, filed Mar. 25, 2011.

Office Action (Final) dated Oct. 9, 2013 (30 pages), U.S. Appl. No. 13/072,547, filed Mar. 25, 2011.

Advisory Action dated Dec. 30, 2013 (3 pages), U.S. Appl. No. 13/072,547, filed Mar. 25, 2011.

Office Action dated Jan. 28, 2014 (27 pages), U.S. Appl. No. 13/072,547, filed Mar. 25, 2011.

Office Action dated Dec. 12, 2012 (44 pages), U.S. Appl. No. 13/072,556, filed Mar. 25, 2011.

Office Action (Final) dated Nov. 4, 2013 (28 pages), U.S. Appl. No. 13/072,556, filed Mar. 25, 2011.

Advisory Action dated Jan. 28, 2014 (3 pages), U.S. Appl. No. 13/072,556, filed Mar. 25, 2011.

Office Action dated Dec. 31, 2012 (46 pages), U.S. Appl. No. 13/072,580, filed Mar. 25, 2011.

Office Action (Final) dated Jul. 19, 2013 (26 pages), U.S. Appl. No. 13/072,580, filed Mar. 25, 2011.

Advisory Action dated Dec. 18, 2013 (3 pages), U.S. Appl. No. 13/072,580, filed Mar. 25, 2011.

Office Action dated Jan. 10, 2013 (44 pages), U.S. Appl. No. 13/072,590, filed Mar. 25, 2011.

Notice of Allowance dated Nov. 20, 2013 (15 pages), U.S. Appl. No. 13/072,590, filed Mar. 25, 2011.

Supplemental Notice of Allowability dated Jan. 24, 2014 (6 pages), U.S. Appl. No. 13/072,590, filed Mar. 25, 2011.

Office Action (Final) dated Jul. 17, 2014 (36 pages), U.S. Appl. No. 13/072,534, filed Mar. 25, 2011.

Office Action (Final) dated Jul. 16, 2014 (40 pages), U.S. Appl. No. 13/072,547, filed Mar. 25, 2011.

Office Action dated Mar. 27, 2014 (53 pages), U.S. Appl. No. 13/072,556, filed Mar. 25, 2011.

Office Action (Final) dated Jul. 24, 2014 (54 pages), U.S. Appl. No. 13/072,556, filed Mar. 25, 2011.

Office Action dated May 21, 2014 (35 pages), U.S. Appl. No. 13/072,580, filed Mar. 25, 2011.

Office Action dated Dec. 2, 2014 (44 pages), U.S. Appl. No. 13/072,547, filed Mar. 25, 2011.

Office Action dated Dec. 9, 2014 (50 pages), U.S. Appl. No. 13/072,556, filed Mar. 25, 2011.

Office Action dated Dec. 12, 2014 (20 pages), U.S. Appl. No. 13/072,580, filed Mar. 25, 2011.

Office Action dated Dec. 17, 2014 (41 pages), U.S. Appl. No. 13/072,534, filed Mar. 25, 2011.

Advisory Action dated Sep. 19, 2014 (3 pages), U.S. Appl. No. 13/072,534, filed Mar. 25, 2011.

Advisory Action dated Oct. 3, 2014 (3 pages), U.S. Appl. No. 13/072,547, filed Mar. 25, 2011.

Advisory Action dated Oct. 14, 2014 (3 pages), U.S. Appl. No. 13/072,556, filed Mar. 25, 2011.

Office Action (Final) dated May 7, 2015 (61 pages), U.S. Appl. No. 13/072,547, filed Mar. 25, 2011.

Advisory Action dated Sep. 14, 2015 (3 pages), U.S. Appl. No. 13/072,534, filed Mar. 25, 2011.

Office Action dated Oct. 21, 2015 (37 pages), U.S. Appl. No. 13/072,534, filed Mar. 25, 2011.

(56) References Cited

OTHER PUBLICATIONS

Advisory Action dated Jul. 24, 2015 (5 pages), U.S. Appl. No. 13/072,547, filed Mar. 25, 2011.
Office Action dated Sep. 30, 2015 (42 pages), U.S. Appl. No. 13/072,547, filed Mar. 25, 2011.
Advisory Action dated Sep. 16, 2015 (3 pages), U.S. Appl. No. 13/072,556, filed Mar. 25, 2011.
Office Action dated Oct. 1, 2015 (45 pages), U.S. Appl. No. 13/072,556, filed Mar. 25, 2011.
Advisory Action and Notice of Abandonment dated Sep. 16, 2015 (4 pages), U.S. Appl. No. 13/072,580, filed Mar. 25, 2011.
Office Action (Final) dated Jun. 16, 2015 (81 pages), U.S. Appl. No. 13/072,556, filed Mar. 25, 2011.
Office Action (Final) dated Jun. 30, 2015 (63 pages), U.S. Appl. No. 13/072,534, filed Mar. 25, 2011.

\* cited by examiner

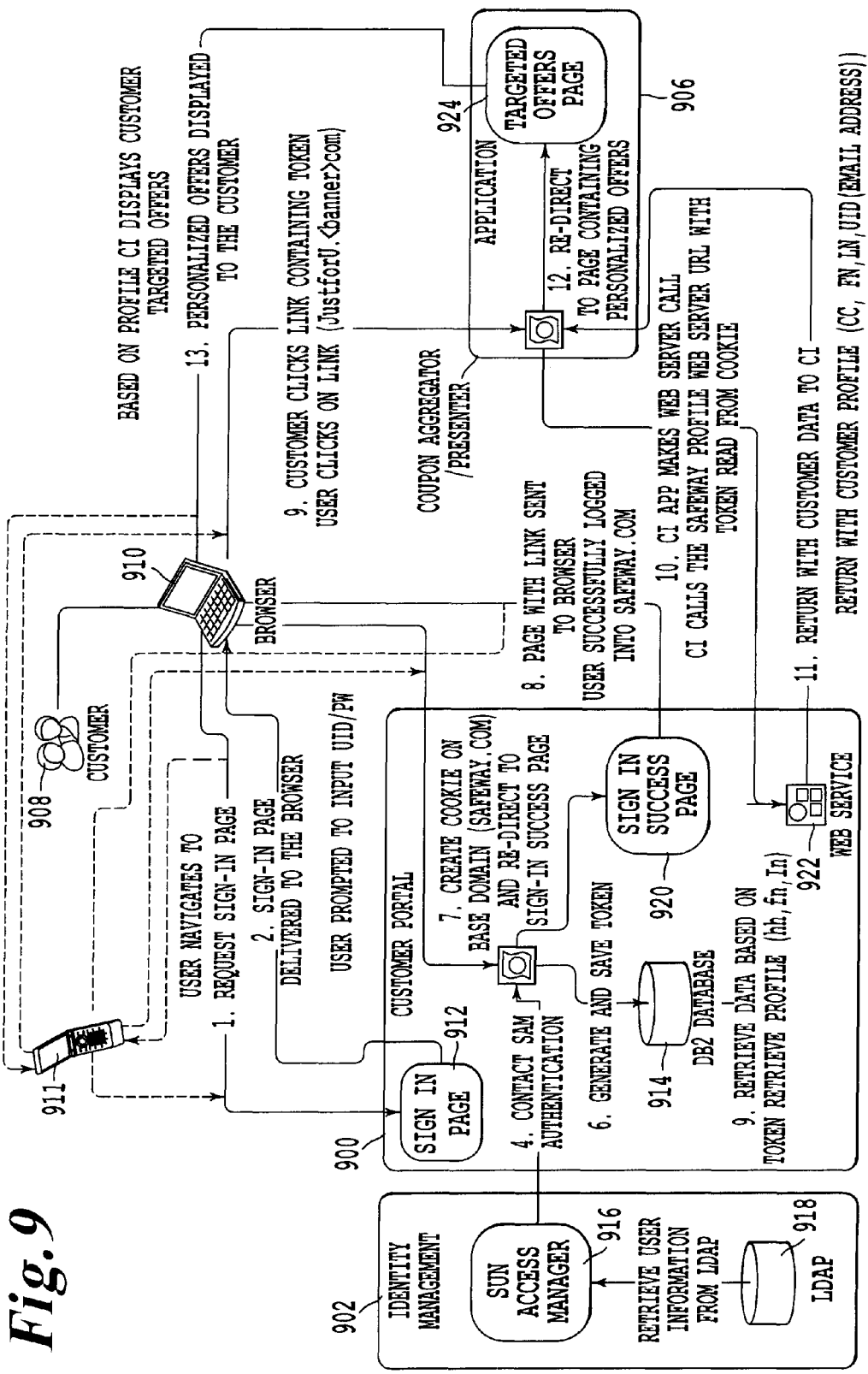

| Customer Name | John Smith |
|---|---|
| User ID | J_Smith |
| Password | Savings456 |
| May Customer Be Reminded At Retailer of Offers? | Yes |
| Medium ID | RS1277381937472 |
| Price Zone | 1 |
| Survey Location | 0x00EH |
| Purchase History Location | 0x00FH |

Table 1

*Fig. 12*

| Product | Brand | Price | Date(s) |
|---|---|---|---|
| Product 1 | B1 | $1.50 | 1/1/10-1/6/10 |
| Product 1 | B2 | $1.40 | 1/1/10-1/6/10 |
| Product 1 | B1 | $1.75 | 1/7/10-1/14/10 |
| Product 1 | B2 | $1.50 | 1/7/10-1/14/10 |
| Product 1 | B1 | $2.25 | 1/15/10-1/21/10 |
| Product 1 | B2 | $2.15 | 1/15/10-1/21/10 |
| Product 1 | B1 | $2.00 | 1/22/10-1/28/10 |
| Product 1 | B2 | $1.50 | 1/22/10-1/28/10 |
| Product 2 | B3 | $1.50 | 1/1/10-1/6/10 |
| Product 2 | B4 | $1.75 | 1/1/10-1/6/10 |
| Product 2 | B5 | $2.00 | 1/1/10-1/6/10 |
| Product 2 | B3 | $1.75 | 1/7/10-1/14/10 |
| Product 2 | B4 | $1.75 | 1/7/10-1/14/10 |
| Product 2 | B5 | $2.00 | 1/7/10-1/14/10 |
| Product 2 | B3 | $2.00 | 1/15/10-1/21/10 |
| Product 2 | B4 | $1.65 | 1/15/10-1/21/10 |
| Product 2 | B5 | $1.75 | 1/15/10-1/21/10 |
| Product 2 | B3 | $2.00 | 1/22/10-1/28/10 |
| Product 2 | B4 | $1.75 | 1/22/10-1/28/10 |
| Product 2 | B5 | $1.50 | 1/22/10-1/28/10 |

Table 2

*Fig. 13*

| Medium ID | RS12773819374 72 | | | | |
|---|---|---|---|---|---|
| Product | Brand | Price | Markdown | Quantity | Date |
| Product 1 | B1 | $1.50 | $.5 | 2 | 1/1/10 |
| Product 1 | B1 | $1.75 | $.25 | 2 | 1/7/10 |
| Product 1 | B1 | $2.00 | $0 | 1 | 1/22/10 |
| Product 2 | B2 | $1.50 | $0 | 2 | 1/1/10 |
| Product 2 | B3 | $1.50 | $0 | 2 | 1/15/10 |
| Product 2 | B4 | $1.50 | $0 | 2 | 1/28/10 |

Table 3

*Fig. 14*

| | Example |
|---|---|
| Offer ID | 1026_8235 |
| Group Offer ID | A001 |
| Offer Type | Price Point |
| CPG | ConFoods |
| Brand | Brand2 |
| Department ID | 510 |
| Category Type | Condiments & Sauces |
| Image Number | 707009 |
| Price Point of Coupon Value | $2.99 |
| Cost Verbiage | Personalized Price |
| Verbiage Line 1 | Steak Sauce Barbecue Style |
| Verbiage Line 2 | 10 OZ |
| Verbiage Line 3 | 24Pk - .5LT |
| Limits | Unlimited through 5/1/10 |
| Mix & Match Select Limit | 4 |
| Promo Start | 3/15/10 |
| Promo End | 5/1/10 |
| Regular Price | $3.50 |
| Disclaimer | Must be used at checkout to receive discount |

Table 4

*Fig. 15*

|  | Example |
|---|---|
| Household ID | 250005024026 |
| Household Medium Number 1 | 074536 |
| Household Medium Number 2 | 345678 |
| Offer ID | 415_5530 |
| Group Offer ID | A001 |
| Rank ID | 1, 2, 3, etc. |

Table 5

*Fig. 16*

|  | Example |
|---|---|
| Loyalty Medium Number | 345678 |
| Household Medium Number | 000000 |
| Offer ID | 1026_8235 |
| Date | 4/1/10 |
| Time Stamp | 2:00pm |
| Store ID | VA5678 |
| TXN ID | 234646 |
| Register Number | 234646_A1 |
| UPC ID | 0 12345 67890 5 |
| MKDN Amount | 000000 |
| Banner NM | 000000 |
| EXTCODE | 000000 |

Table 6

*Fig. 17*

|  | Example |
|---|---|
| Loyalty Medium Number | 345678 |
| Household Source | 000000 |
| First Visit | 3/1/10 |
| First Visit Time | 1:00pm |
| Visit Count | 10 |
| Revisit Source | Email |
| Last Visit Date | 3/12/10 |
| Page Count | 3 |
| Offer Clip Count | 5 |
| Mfgr Clip Count | 10 |
| First Offer Clip Date | 3/5/10 |
| Last Offer Clip Date | 3/12/10 |
| Print Date | 3/12/10 |
| Print Quantity | 1 |
| Email List | Y |
| Email Quantity | 2 |
| Visit Source | www.retailstore.com |
| Household ID | 250005025026 |
| Offer Clip | [List of Offers Clipped] |

Table 7

*Fig. 18*

|                  | Example   |
|------------------|-----------|
| Offer ID         | 1026_8235 |
| Price Zone       | 1         |
| Competitor Name  | XYZ Store |
| Competitor Price | $3.49     |
| Capture Date     | 2/10/10   |

Table 8

*Fig.19*

| Loyalty Medium Number | Price Zone |
|-----------------------|------------|
| 23456                 | 1          |
| 34523                 | 2          |
| 23425                 | 3          |

Table 9

*Fig.20*

| Image Name  | Image Number | Image           |
|-------------|--------------|-----------------|
| Milk Carton | 707009       | Dairy_Milk.jpg  |
| Eggs        | 707010       | Egg_Carton.jpg  |
| Bread       | 707011       | Bread_Loaf.jpg  |
| Apples      | 707012       | Red_Apples.jpg  |

Table 10

*Fig.21*

|  | Example |
|---|---|
| Email | J_Smith@gmail.com |
| Registration Date | 2/10/10 |
| Last Visit Date | 2/15/10 |
| Total # Offers Activated | 10 |
| Total # Offers Available | 15 |
| Total $ Value of Offers Activated | $25 |
| Total $ Value of Offers Available | $30 |
| Total # of Digital Coupons Activated | 5 |
| Total # of Digital Coupon Offers Available | 8 |
| Total $ Value of Digital Coupon Offers Activated | $7 |
| Total $ Value of Digital Coupon Offers Available | $9 |
| Total # EDV Offers Activated | 4 |
| Total # EDV Offers Available | 5 |
| Total $ Value of EDV Offers Activated | $5 |
| Total $ Value of EDV Offers Available | $6 |
| Total Offers Savings Year to Date | $20 |
| Total Digital Offers Savings Year to Date | $15 |
| Total EDV Offers Savings Year to Date | $10 |

Table 11

Welcome to Retailer Store!

Login to access Personalized Offers Savings Program

2414 — Login ID

Password

View Offers — 2416

Not a Member?

Register — 2418

Home   Locations   Search   Site Map   Contact Us

*Fig. 24C*

Update Contact Information 2600

My Account
- User ID/E-mail
- Password
- Contact Information
- E-mail Subscriptions Link Your Loyalty Medium To Your Account    Why?    Loyalty Medium Phone Number (Associated with your Loyalty Medium)
[_____] —2602

— OR —

Loyalty Medium Number
[_____] —2604

Need Help? Call Customer Support

2606

*Title:
[▼]

*First Name:
[_____]

*Last Name:
[_____]

*Address Line 1:
[_____]

Address Line 2:
[_____]

*Zip/Postal Code:
[_____]

edit

City:
PLEASANTON

State:
California

Country:
United States

2608

Want extra savings on products for kids?
Just let us know birth month and year for personalized savings.

Child #1: [Select Month ▼] [Select Year ▼]
Child #2: [Select Month ▼] [Select Year ▼]
Child #3: [Select Month ▼] [Select Year ▼]
Child #4: [Select Month ▼] [Select Year ▼]
Child #5: [Select Month ▼] [Select Year ▼]

Please indicate your interest in savings for pets in your family.
☐ Cat
☐ Dog
☐ Other 2610 —[ Save Changes ]    cancel

*Fig.26A*

Register for Customized Offers Savings Program

2700

First Name: — 2702
[ ]
Last Name:
[ ]
Address Line 1:
[ ]
Address Line 2:
[ ]
Zip/Postal Code:
[ ]
Email
[ ]
Enter Password:
[ ]
Confirm Password:
[ ]
Loyalty Medium ID:
[ ]

[ Submit ] — 2706

Don't have a Loyalty Medium?

2704 — [ Apply ]

*Fig. 27*

Please Complete the Following Survey:

2800

Please select one or more of the following categories for which you would like to receive offers: — 2802

- ○ Dairy Produce
- ○ Fresh Vegetables
- ○ Cosmetics
- ○ Pharmaceuticals
- ○ Office Supplies
- ○ Cleaning Supplies Please describe any other products for which you would like to receive offers: — 2804

[ Submit ] — 2806

Save More with Just for U! | View Mobile Version

Coupon Center | Personalized Deals | Your Club Specials | Sign In ▶

Welcome to Retailer Savings Program!

Thank you for registering with your Loyalty Medium. Now you can start saving more than ever before with 3 great ways to save.
Visit our website and start enjoying all your savings!

Account Name:  test80@yahoo.com

Forgot your Password?  Click Here

[ Sign In Now ▶ ]

3 great ways to save!

① coupon center
② personalized deals
③ your club specials

Have Questions?
Find answers on our FAQ page.
Contact Us ▶

Maximize Your Savings
Learn how to save even more with just for U.
Watch the Video ▶

Our Store | Recipes & Meals | Healthy Living | Blog | Contact Us

*Fig. 30A*

Exclusive Coupons | View with Images | View Mobile Version

Coupon Center | Personalized Deals | Your Club Specials | Sign In ▶

Coupon Center:

New Savings are Here!

Yvonne, find great deals like these, plus many more, updated every week, so you can keep saving more every time you shop.

[ Save Now ▶ ]—3008

Find these coupons and more at

Save Now ▶

3004

FREE
with $15 purchase
Foster Farms Great Bites
7.62 oz. Selected Varieties.
Limit 1.
Expires: 2/19/2011

3006

$1.99 each

Best Foods Mayonnaise
22 to 30-oz. Selected Varieties
Limit 2.
Expires: 2/19/2011

Our Store | Recipes & Meals | Healthy Living | Blog | Email Preferences | Contact Us

*Fig. 30B*

Get Exclusive Prices on Items YOU Buy! | View with Images | View Mobile Version

Coupon Center | Personalized Deals | Your Club Specials | Sign In ▶

New Personalized Deals are Here!

Visit    today — download your new Personalized Deals to your Loyalty Medium, print your Savings List, then shop in store. You can save again and again!

[ Save Now ▶ ] — 3016

Featured Personalized Deal:

Lucerne
Large Grade AA
Eggs
Your Price: $1.88

[ Add ]  [ View All ]

Like This Offer? 👍 👎

Save with these and many more Personalized Deals. View All ▶

3012

Your Price: $3.12

Oscar Mayer
Oven Roasted Deli Shaved
9 oz.

Expires 4/19/11

Your Price: $2.88

Orowheat
English Muffins
12 oz. SelVar

Expires 4/19/11

3014

Your Price: $1.45

Artisan
Baguette
8 oz.

Expires 4/19/11

Your Price: $2.40

Ocean Spray
Cranberry Cocktail Drink
64 oz. SelVar

Expires 4/19/11

[ View All ]

*Fig. 30C*

Welcome, Dusty
(Not you?, Sign Out) | My Account

Grocery Delivery | Find a Store | Weekly Specials

Search [Enter Keyword] Go

Our Store | Recipes & Meals | Healthy Living | Blog | Grocery Delivery

Coupon Center | Personalized Deals | Your club Specials | Shopping List

In Personalized Deals

Offers Added  0

▼ View by category

Show All (70)
Beverages (9)
Bread & Bakery (6)
Canned Goods & Soups (3)
Condiments, Spices & Bake (4)
Cookies, Snacks & Candy (4)
Dairy, Eggs & Cheese (4)
Deli (5)
Frozen Foods (5)
Fruits & Vegetables (13)
Grains, Pasta & Sides (2)
Meat & Seafood (7)

3200 personalized deals — 3202

Good for up to 90 days plus they can be used over & over again.

Click "add" to load deal onto your loyalty medium.

Print/E-mail Shopping List ⊙ — 3206

3212
Liquid Laundry
Detergent 150oz      3216
Personalized Price
$9.89
3214A — Our Regular Price
$9.99 — 3214B ⊕ Add
3220 unlimited see details ⊙
expires 4/19/2011
3218

QUILTED NORTHERN
Qualified Nothern Bath Tissue
9-12 Roll
Personalized Price
$6.19
Our Regular Price
$7.99

⊕ Add unlimited see details ⊙
expires 4/19/2011

3208 — ▼ 1 ▲

Safeway
Safeway Trash Bags 13gal
38/45/50ct

Personalized Price
$5.49
Walmart
$5.74

⊕ Add unlimited see details ⊙
expires 4/19/2011

| Personal Care & Pharmacy (8) | Primo Taglio Fresh Mozzarella Ball | $3.99 | Reg. Price | Save Up To | | | ⊕ Add To List |
|---|---|---|---|---|---|---|---|
| Wine, Beer & Spirits (16) | 8 OZ | Club Price | $4.49 | $0.50 | 11% | 2/9-2/22 | |
| | Donnan Light & Fit Yogurt Sel Var | $1.99 | Reg. Price | Save Up To | | | ⊖ Remove |
| Related Links: | 6-8 OZ | Club Price | $2.50 | $0.51 | 20% | 2/9-3/5 | |
| 1. Coupon Center | | | | | | | ▼ 1 ▲ |
| 2. Personalized Deals | Print/E-mail Shopping List ⊙ | | | | | | |
| 3. Your Club Specials | | | | | | | |
| Coupon Policy | | | | | | | |
| Competitors Info | | | | | | | |
| FAQ | | | | | | | |

Left column:

Save 75¢
FIBER ONE® CEREAL
when you buy any ONE BOX
Fiber One® cereal listed one-time see details
expires 4/27/2011
[+ Add]

Save 75¢
BOB EVANS®
OFF ANY BOB EVANS®
FROZEN SANDWICH one-time see details
expires 4/27/2011
[+ Add]

Middle column:

Save 55¢
TRIX® CEREAL
when you buy ONE BOX
Trix® cereal one-time see details
expires 4/27/2011
[+ Add]

Save $1.00
McCann's
on ANY McCann's Irish
Oatmeal product one-time see details
expires 4/27/2011
[+ Add]

Right column:

SAVE 50¢ on TWO
PILLSBURY® TOASTER
STRUDEL®
when you buy TWO any
flavor/verity Pillsbury®
Toaster Strudel® Pastries one-time see details
expires 4/27/2011
[+ Add]

one-time see details
expires 4/27/2011
[+ Add]

---

Grains, Pasta & Sides (8)
Meat & Seafood (8)
Paper, Cleaning & Home (16)
Personal Care & Pharmacy (39)
Pet Care (22)
Wine Beer & Spirits (1)

▸ View by Brand
Crest Rinse (2)
Crest Toothpaste (2)
Gilletie Fusion (2)
Pringles (3)
Tide (2)
Vicks Cough & Cold Products (3)

Related Links:
1. Coupon Center
2. Personalized Deals
3. Your Club Specials

Coupon Policy

Print/E-mail Shopping List

Once offers are added to your card you can use them in the local geographical region that you reside in.

Grains, Pasta & Sides (8)
Meat & Seafood (8)
Paper, Cleaning & Home (16)
Personal Care & Pharmacy (39)
Pet Care (22)
Wine Beer & Spirits (1)
- View by category
Crest Rinse (2)
Crest Toothpaste (2)
Gillette Fusion (2)
Pringles (3)
Tide (2)
Vicks Cough & Cold Products (3)

Congratulations!

These prices are confirmed on your LOYALTY MEDIUM

| Product | Price | Quantity | Expiration Date |
|---|---|---|---|
| Product 1 | Price 1 | Unlimited | 1/31/10 |
| Product 2 | Price 2 | 15 | 5/15/10 |
| Product 4 | Price 4 | Unlimited | 7/21/10 |

*Fig.36*

| Print My Savings List | | | ☑ Grayscale ☑ Hide images | 🖶 Print | |
|---|---|---|---|---|
| Product Name | Savings | Product Description | Type | Expiration Date |
| Meat & Seafood | | | | |
|  Butchers Cut Ham | $1.00 off | Hickory Smoked Bacon, Sliced | one-time | 7/20/09 |
|  Butchers Cut Regular Sliced Bacon | You Save $1.00 off per item | 97% Fat Free Tub - 10 Oz | unlimited | 7/20/09 |
|  Trans Ocean Crab Classic Leg Style | $1.00 off | Crab Classic, Leg Style | one-time | 7/20/09 |
| Produce | | | | |
|  O Organics Baby Peeled Carrots | You Save $3.00 per item | O Organics Baby Peeled Carrots 1 Lb Prepacked - 16 Oz | unlimited | 7/20/09 |
|  Snack Salad Snapea Caesar Crisps | $1.00 off | Saanpea Crisps, Ceasar flavor, Baked - 3.3 Oz | one-time | 7/20/09 |
| Beverages | | | | |
|  FIJI Water | $1.50 off | $1.50 Off One (1) 500 ML 6-pack of FIJI Water | one-time | 7/20/09 |
|  Floridas Natural Orange Juice | $1.00 off | Floridas Natural Orange Juice Home Squeezed With Calcium -64 Fl. Oz. | one-time | 7/20/09 |
| Dairy | | | | |
|  Beatrice Egg Beaters | $1.00 off | Egg Product, Original | one-time | 7/20/09 |
|  Knudsen Double Peach Cottage Cheese | $1.50 off | Cottage Cheese, Lowfat, & Peach Topping | one-time | 7/20/09 |

To: J_Smith@gmail.com

From: Retailer_LoyaltyMedium@Retailer.com

Subject: New Offers

Dear John Smith:

Congratulations! You have received new offers for the customized offers savings program.

Please log into store.com to view your offers.

*Fig.41A*

```
                  GROCERY
2@2.99/1@3.19
NCRSTD NUT CRUNCH       3.87 F
Reg Price             10.47
Club Sav                .90-
J4U Store eCpn          .40-
J4U Mfr eCpn            .50-
KRAFT MAC&CH             .50 F
Reg Price              1.99
Club Sav                .80-
Mfr Cpn                 .25-
REFRSH WATER            3.99 F
CRV WATER               0.25
Reg Price              4.99
Club Sav                .50-
J4U Personal           1.00-

MEAT

CHICKEN 33304           5.00 F

10% off Dept             .50-F

MISCELLANEOUS

10% off Basket          1.79-F

****TAX      .00 BAL     15.62
        CASH                  15.62

CHANGE                  .00
4/01/10   10:44  4876 55 00201
                                 1111
Welcome Club Member!
------------------------------------
   YOUR CASHIER TODAY WAS ROBIN
------------------------------------
              SAVINGS
      Savings              $  2.24
      Basket Savings       $  1.79
      Personalized Savings $  1.00
      Mfr Cpn Savings      $   .50
      Department Savings   $   .50
      Cpn Savings          $   .40
      Mfr Cpn Savings Paper $  .25
      TOTAL                $  6.68
      TOTAL SAVINGS VALUE     30%
------------------------------------
As of today, you have accumulated 5 Of 7
toward your Free Signature Cafe Sandwich.
LET US HEAR FROM YOU!
```

Retailer Offer Game

Thank you for playing! Please vote for two of your favorite offers below.

| Product 1 | Product 1 Price | Unlimited thru May 2011 | Vote |
| Product 2 | Product 2 Price | Unlimited, Expires May 1, 2011 | Vote |
| Product 3 | Product 3 Price | One Time, Expires May 1, 2011 | Vote |
| Product 4 | Product 4 Price | Limit 5, Expires April 15, 2011 | Vote |
| Product 5 | Product 5 Price | Unlimited thru May 2011 | Vote |

Retailer Offer Game

Congratulations! Based on total votes, the following offers are available to be added to your loyalty medium:

| Product 1 | Product 1 Price | Unlimited thru May 2011 | Add |
| Product 4 | Product 4 Price | Limit 5, Expires April 15, 2011 | Add |

*Fig. 43B*

| 4402 | | | | 4400 | | |
|---|---|---|---|---|---|---|
| Card Number: 410883728201 | | Search | | | Current Card Number: 410883728201 | Logout |
| Card Contents | Incidents | | Profile | | | |

☑ Show offers loaded to card
☑ Show unloaded Personalized offers  ☑ Show unloaded MFG offers

| Status | Cou... | | Start Date | End Date | Value |
|---|---|---|---|---|---|
| Loaded | 1472 | ch Bags 100 Ct | 02/08/2010 | 05/31/2010 | Personalized Price $3.49 |
| Loaded | 1472 | Box Diapers Selected Varieties | 02/08/2010 | 05/31/2010 | Personalized Price $28.99 |
| Loaded | | ogurt 6 Pk 4 Oz. | 02/08/2010 | 05/31/2010 | Personalized Price $2.29 |
| Loaded | 14726272 | Zabaraines Rice 7-8 Oz. | 02/01/2010 | 05/31/2010 | Personalized Price $1.75 |
| Loaded | 14550094 | off one (1) bottle of Similisan Earache Relief ea | 02/25/2010 | 12/01/2010 | MFG - Save $1.00 |
| Loaded | 14706149 | off any L'Oreal Paris Skincare Product | 02/25/2010 | 12/01/2010 | MFG - Save $1.00 |
| Loaded | 14906152 | off any Bare Naturals product or any L'Oreal | 03/01/2010 | 12/01/2010 | MFG - Save $1.00 |
| Unloaded | 1471 | uca 10 Oz. | 03/01/2010 | 05/31/2010 | Personalized Price $2.99 |
| Unloaded | 1472 | uca 10 Oz. | 02/08/2010 | 05/31/2010 | Personalized Price $3.49 |
| Unloaded | 1472 | etergent 96 Load 150 Oz. | 02/08/2010 | 05/31/2010 | Personalized Price $12.99 |
| Unloaded | 1472 | ndry Detergent 32 3x50 2x Oz. | 02/08/2010 | 05/31/2010 | Personalized Price $4.99 |
| Unloaded | 14724105 | Arno Complete Moisture Solution 12 Oz. | 02/08/2010 | 05/31/2010 | MFG - Save $1.00 |
| Unloaded | 14724106 | Arno Complete Moisture Solution 12 Oz. | 02/08/2010 | 05/31/2010 | MFG - Save $1.00 |

Callouts: "Loaded to Loyalty Medium" and "Available to Load to Loyalty Medium"

Page 1 of 37 (551 items)

*Fig. 44A*

| Card Number: 410883728201 | | | 4404 | Current Card Number: 410883728201 | Logout |
|---|---|---|---|---|---|
| Card Contents | Incidents | Profile | | | |

| Date | Rep Name | Reason for Call | Make Goods | Comments | Action |
|---|---|---|---|---|---|
| 06/01/2010 | Winnie.Wang@Safe... | Coupons lost in... | $1.00 | | |
| | | Coupons lost ✓ | $1.00 ✓ | test add make good offer | Save \| Cancel |

*Fig. 44B*

Fig. 45A shopping list

4502

| Product Name/Description | Price/Savings | Type | Good Thru |
|---|---|---|---|
| *Beverages* | | | |
| PEET'S - Peet's Special Coffee Blends 12oz SelVar | Your Price $8.58 | Personalized Price | 04/19/2011 |
| ODWALLA JUICE ORANGE 64 fl oz. | Club Price* $5.99 | Club Price* | 02/06/11-12/31/11 |
| *Bread & Bakery* | | | |
| THOMAS - Thomas' English Muffins 12-13oz | Your Price $1.50 | Personalized Price | 04/19/2011 |
| *Breakfast & Cereal* | | | |
| MCCANN'S - on any McCann's Irish Oatmeal Product | You Save $1.00 | One-Time Coupon | 11/01.2011 |
| *Condiments, Spices & Bake* | | | |
| KRUSTEAZ - Krusteaz Cornbread Mix 14.5-15oz | Your Price $1.58 | Personalized Price | 04/19/2011 |
| *Fruits & Vegetables* | | | |
| O ORGANICS - O Organics Salad Mix 5-9oz | Your Price $2.97 | Personalized Price | 04/19/2011 |

*Fig. 45B* shopping list

4504

| Product Name/Description | Price/Savings | Type | Good Thru |
|---|---|---|---|
| Beverages | | | |
| PEET'S - Peet's Special Coffee Blends 12oz SelVar | Your Price $8.58 | Personalized Price | 04/19/2011 |
| ODWALLA JUICE ORANGE 64 fl oz. | Club Price* $5.99 | Club Price* | 02/06/11-12/31/11 |
| Bread & Bakery | | | |
| THOMAS - Thomas' English Muffins 12-13oz | Your Price $1.50 | Personalized Price | 04/19/2011 |
| Breakfast & Cereal | | | |
| MCCANN'S - on any McCann's Irish Oatmeal Product | You Save $1.00 | One-Time Coupon | 11/01.2011 |
| Dairy, Eggs & Cheese | | | |
| DANNON LIGHT & FIT YOGURT SEL VAR 4-6 oz | Club Price* $1.99 | Club Price* | 04/19/2011 |

*Fig. 45C*

| Order | Category Code | Category Description | Total Annual Sales (000's) | Total Market Penetration | Partner Category |
|---|---|---|---|---|---|
| 1 | 1234 | Category 1 | 987 | 95% | yes |
| 2 | 1239 | Category 2 | 986 | 96% | yes |
| 3 | 1244 | Category 3 | 945 | 98% | no |
| 4 | 1249 | Category 4 | 887 | 92% | no |
| 5 | 1254 | Category 5 | 895 | 65% | yes |
| 6 | 1259 | Category 6 | 846 | 78% | yes |
| 7 | 1264 | Category 7 | 924 | 79% | yes |
| 8 | 1269 | Category 8 | 789 | 86% | no |
| 9 | 1274 | Category 9 | 769 | 84% | no |
| 10 | 1279 | Category 10 | 479 | 88% | yes |
| 11 | 1284 | Category 11 | 519 | 95% | yes |
| 12 | 1289 | Category 12 | 587 | 95% | yes |
| 13 | 1294 | Category 13 | 777 | 95% | no |
| 14 | 1299 | Category 14 | 769 | 95% | no |
| 15 | 1304 | Category 15 | 789 | 95% | yes |
| 16 | 1309 | Category 16 | 785 | 95% | yes |
| 17 | 1314 | Category 17 | 849 | 95% | yes |
| 18 | 1319 | Category 18 | 865 | 95% | no |
| 19 | 1324 | Category 19 | 843 | 95% | no |
| 20 | 1329 | Category 20 | 409 | 95% | yes |

*Fig. 49*

| Order | Category Code | Category Description | Total Annual Sales (000's) | Total Market Penetration | Partner Category |
|---|---|---|---|---|---|
| 1 | 2026 | Category 1 | 654 | 85% | yes |
| 2 | 2031 | Category 2 | 596 | 76% | yes |
| 3 | 2036 | Category 3 | 523 | 59% | no |
| 4 | 2041 | Category 4 | 625 | 58% | no |
| 5 | 2046 | Category 5 | 436 | 46% | yes |
| 6 | 2051 | Category 6 | 512 | 77% | yes |
| 7 | 2056 | Category 7 | 526 | 52% | yes |
| 8 | 2061 | Category 8 | 695 | 66% | no |
| 9 | 2066 | Category 9 | 685 | 54% | no |
| 10 | 2071 | Category 10 | 479 | 86% | yes |

*Fig. 50*

| | | Selected CPG Brand | | | | | | |
|---|---|---|---|---|---|---|---|---|
| | HH by EQ Vol | Loyal Brand Buyers | High Brand Buyers | Med Brand Buyers | Low Brand Buyers | 1X Excl. Buyer of Brand | Never Buy Brand | Consumer Brand Loyal |
| Category Buyer | High Buyers | | | X | X | X | X | |
| | Med Buyers | | | X | X | X | X | |
| | Low Buyers | | | X | X | X | X | |

*Fig. 51*

Thank you for shopping at Retailer Store!

Items Purchased

PRODUCT 2

PRODUCT 3

PRODUCT 4

Your current purchase does not include Product 1. There is an updated offer available for Product 1 matching the Competitor's new price! This offer is only valid for one hour.

PRODUCT 1 | NEW COMPETITOR PRICE | TIME LIMIT: 1 HOUR | ACCEPT

Welcome to Retailer Savings Program!

If there are any products for which you would like to receive an offer for a competitor's price, please enter the information below.

PRODUCT NAME

PRODUCT BRAND

COMPETITOR NAME

COMPETITOR LOCATION

COMPETITOR PRICE

Deal Match:

| In DealMatch | |
|---|---|
| Offers Added | 0 |

▸ View by category

Show All (46)
Meat and Seafood (11)
Produce (7)
Dairy (3)
Grocery (25)

▸ View by Store

Show All (46)
Foodland/Sack N Save (10)
Time Supermarkets (15)
Safeway (21)

▸ Print/E-mail Shopping List

Related Links:

FAQ deal match

We match the best deals from our competitors' ads every week!

You just click [Add] to load them to your Loyalty medium ☐

⇩ Foodland/Sack N Save

Foodland/Sack N Save —— 6704
Boneless Top Sirloin —— 6706
Steak
$3.99 lb —— 6708

[+ Add] —— 6712 unlimited —— 6710
valid 2/16-2/22/2011

6702

Foodland/Sack N Save (10)
Boneless Pork
Sirloin Chop
Value Pack.
$2.49 lb

[+ Add]

unlimited
valid 2/16-2/22/2011

Foodland/Sack N Save (10)
Farm Pack Eggs
Mianland, Grade A*
Shell Protected, Large, 18 Pk.
2 for $7.00
Lucerne 18-Pack Eggs

[+ Add]

unlimited
valid 2/16-2/22/2011

⇩ Times Supermarkets ◧ Back to top

Times Supermarkets
USDA Choise Tri-Tip
Roast
$3.99 lb unlimited
valid 2/16-2/22/2011  [+ Add]

Times Supermarkets
ST. Louis Style
Spareribs*
$3.29 lb

*Extra Meaty Pork Ribs unlimited
valid 2/16-2/22/2011  [+ Add]

Times Supermarkets
Fresh Atlantic
Salmon Fillet
$8.49 lb unlimited
valid 2/16-2/22/2011  [+ Add]

Times Supermarkets
Purity or Gouvea's
Portugese Sausage
10-oz. Selected Varieties.
2 for $4.00 unlimited
valid 2/16-2/22/2011  [+ Add]

Times Supermarkets
Bagged Apples Fuji,
Red, Gala, Green*
4lb
$2.99 eah

*Bagger Apples Fuji, red, Gala
Green 3-lb. $2.19 each unlimited
valid 2/16-2/22/2011  [+ Add]

Times Supermarkets
Whole New Zealand
Kabocha Pumpkin*
$0.79 lb

*Kabocha Squash unlimited
valid 2/16-2/22/2011  [+ Add]

Deal Match Shopping list:

| In DealMatch | |
|---|---|
| Offers Added | 5 |
| ▸ View by category | |
| ▸ View by Store | |
| ▸ Print/E-mail Shopping List | |

Related Link:
FAQ

--- deal match — shopping list — 7000

Print or E-mail for an easy reminder.

🖨 Print   ✉ E-mail

| Product Name/Description | Price/savings | Type | Good Thru |
|---|---|---|---|
| ✎ Meat and Seafood | | | |
| Rancher's Reserve Whole Tri Tip Roast Untrimmed. Or Bnlss - Trmmd Tri Tip Rst or Bnlss Tri Tip Stk at $4.99lb Stk in EVP. | $3.99lb | unlimited | 2/16/11 - 2/22/11 |
| 🍎 Produce | | | |
| Clementines 5-lb. box $6.25 each | 2 for $5.00 | unlimited | 2/16/11 - 2/22/11 |
| 🥛 Dairy | | | |
| Lucerne 1B-Pack Eggs | 2 for 7.00 | unlimited | 2/16/11 - 2/22/11 |
| 🍴 Grocery | | | |
| Safeway 100% Whole Wheat or Crushed Wheat Breads - 22-oz | $3.49 each | unlimited | 2/16/11 - 2/22/11 |
| Starkist Tuna - 5-oz. in Water/Vegetable Oil. | $0.79 each | unlimited | 2/16/11 - 2/22/11 |

🖨 Print   ✉ E-mail

*Fig. 70*

Deal Match printed Shopping List: ─── 7100 deal match
shopping list
Ingredients for life...
🖨 Print

| Product Name/Description | Price/savings | Type | Good Thru |
|---|---|---|---|
| *Meat and Seafood* | | | |
| Rancher's Reserve Whole Tri Tip Roast Untrimmed. Or Bnlss - Trmmd Tri Tip Rst or Bnlss Tri Tip Stk at $4.99lb Stk in EVP. | $3.99lb | unlimited | 2/16/11 - 2/22/11 |
| *Produce* | | | |
| Clementines 5-lb. box $6.25 each | 2 for $5.00 | unlimited | 2/16/11 - 2/22/11 |
| *Dairy* | | | |
| Lucerne 18-Pack Eggs | 2 fof 7.00 | unlimited | 2/16/11 - 2/22/11 |
| *Grocery* | | | |
| Safeway 100% Whole Wheat or Crushed Wheat Breads - 22-oz | $3.49 each | unlimited | 2/16/11 - 2/22/11 |
| Starkist Tuna - 5-oz. In Water/Vegetable Oil. | $0.79 each | unlimited | 2/16/11 - 2/22/11 |

*Fig. 71*

ADAPTABLE RETAIL PRICING ENVIRONMENT AND ELECTRONIC EXCHANGE, DELIVERING CUSTOMIZED MOBILE SHOPPER REWARDS AND DISCOUNTS

CROSS-REFERENCE TO RELATED APPLICATIONS

This application claims the benefit under 35 U.S.C. §119 (e) of the earlier filing date of U.S. Provisional Application No. 61/282,742 entitled "A Personalized Pricing System & Associated Methodology of Delivering Customized Shopper Rewards and Discounts" filed Mar. 25, 2010, the entirety of which is incorporated herein by reference.

BACKGROUND

The present advancements relate to a system, apparatus, and associated methodologies for providing individualized discounted customer pricing.

Loyalty programs are known to provide participating customers of a given retailer, such as a department or grocery store, with discounts on retail goods and/or services. Retailers may use these loyalty programs to monitor items that the retailer's customer base is purchasing or not purchasing, and provide an incentive and/or discount for a particular item. As an example, a retailer may determine that a particular snack item is not selling very well. Accordingly, the retailer may offer loyalty program customers an additional 30 cents off the snack item. Such an offer would be provided to all participating customers. Yet, different customers may have different purchasing interests and needs, and therefore, different purchasing habits. Known loyalty programs are not tailored to individual customer needs, interests, and habits.

SUMMARY

In view of the foregoing, the present advancements provide a system that generates and notifies participating customers of offers and/or rewards tailored to a given customer profile.

In exemplary embodiments, a mobile device includes one or more linked memories to store a mobile application and customer data, the mobile application downloaded from a rewards server associated with a retailer, the customer data associated with a loyalty program of the retailer. The customer data includes at least one retailer account and purchase history associated with a customer. The mobile device includes a user interface to receive customer input. The mobile device further includes a processor to display the mobile application via the user interface. The processor displays a log-in page permitting a customer to access the at least one retailer account associated with the customer and displays a purchase price, via the mobile application, for at least one product associated with the retailer. The processor further displays an option for payment, via the mobile application, of the at least one product using at least one payment account associated with the at least one retailer account. Additionally, the processor updates, upon reception of the customer input indicating selection of the payment option, the at least one retailer account to indicate a deduction of the displayed purchase price from the at least one payment account.

In exemplary embodiments, an individualized discount and reward system includes a server having one or more linked databases to store a mobile application and customer data, associated with a loyalty program of the retailer. The customer data including at least one retailer account and purchase history associated with a customer. The system includes a mobile device having one or more linked memories to store the mobile application and customer data downloaded from the server. The mobile device includes a user interface to receive customer input. The mobile device further includes a processor to display the mobile application via the user interface and display a log-in page permitting a customer to access the at least one retailer account associated with the customer. The processor displays a purchase price, via the mobile application, for at least one product associated with the retailer. The processor further displays an option for payment, via the mobile application, of the at least one product using at least one payment account associated with the at least one retailer account. Additionally, the processor updates, upon reception of the customer input indicating selection of the payment option, the at least one retailer account to indicate a deduction of the displayed purchase price from the at least one payment account.

In exemplary embodiments, a non-transitory computer readable medium having stored thereon computer executable instructions that when executed by a processor in a mobile device causes the mobile device to store, in one or more linked memories, a mobile application and customer data, the mobile application downloaded from a rewards server associated with a retailer. The customer data is associated with a loyalty program of the retailer and including at least one retailer account and purchase history associated with a customer. The computer executable instructions cause the mobile device to receive customer input via a user interface. The computer executable instructions cause the mobile device to display the mobile application via the user interface and display a log-in page permitting a customer to access the at least one retailer account associated with the customer. The computer executable instructions cause the mobile device to display a purchase price, via the mobile application, for at least one product associated with the retailer. Further, the computer executable instructions cause the mobile device to display an option for payment, via the mobile application, of the at least one product using at least one payment account associated with the at least one retailer account. Additionally, the computer executable instructions cause the mobile device to update, upon reception of the customer input indicating selection of the payment option, the at least one retailer account to indicate a deduction of the displayed purchase price from the at least one payment account.

Other objects, features, and advantages of the present disclosure will be fully understood from the following detailed description of example embodiments of the present advancements when in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

FIG. 9 illustrates an exemplary configuration for accessing a customer portal to view offers;

FIG. 12 illustrates an exemplary customer profile;

FIG. 13 illustrates an exemplary product profile;

FIG. 14 illustrates an exemplary customer purchase history profile;

FIG. 15 illustrates an exemplary offer definition file;

FIG. 16 illustrates an exemplary household allocation file;

FIG. 17 illustrates an exemplary redemption file;

FIG. 18 illustrates an exemplary reporting file;

FIG. 19 illustrates an exemplary competitor price file;

FIG. 20 illustrates an exemplary price zone association file;

FIG. 21 illustrates an exemplary transfer image file;

FIG. 22 illustrates an exemplary data elements file;

FIG. 24C illustrates an exemplary login interface;

FIGS. 26A and 26B illustrate exemplary contact information user interfaces;

FIG. 27 illustrates an exemplary registration user interface;

FIG. 28 illustrates an exemplary survey user interface;

FIGS. 30A-30C illustrate exemplary introduction user interfaces;

FIGS. 32A and 32B illustrate another exemplary offer selection user interface;

FIGS. 33A and 33B illustrate an exemplary club specials selection user interface;

FIGS. 34A and 34B illustrate an exemplary coupon user interface for displaying coupon offers;

FIGS. 35A and 35 illustrate another exemplary coupon user interface;

FIG. 36 illustrates an exemplary savings list user interface;

FIG. 38 illustrates an exemplary print savings list user interface;

FIG. 41A illustrates an exemplary email notifying a customer of new offers;

FIG. 41B illustrates an exemplary register receipt;

FIG. 43A illustrates an exemplary offer game interface; and

FIG. 43B illustrates another exemplary offer game interface.

FIGS. 44A and 44B illustrate an exemplary administrator interfaces;

FIGS. 45A-45C illustrate exemplary shopping lists;

FIG. 49 illustrates an exemplary chart showing the top selling rapid consumable categories;

FIG. 50 illustrates an exemplary chart showing the top categories having the highest share of wallet;

FIG. 51 illustrates an exemplary chart for identifying potential brand switchers for each brand in each category;

FIG. 65 illustrates an exemplary interface displayed on a POS device while a customer is making a purchase;

FIG. 66 illustrates an exemplary interface where a customer specifies a product for which the customer desires to receive a personalized offer;

FIG. 67 illustrates an exemplary competitor price matching interface;

FIG. 68 illustrates another exemplary competitor price matching interface;

FIG. 70 illustrates an exemplary shopping list;

FIG. 71 illustrates another exemplary shopping list;

DETAILED DESCRIPTION

Figure 1:
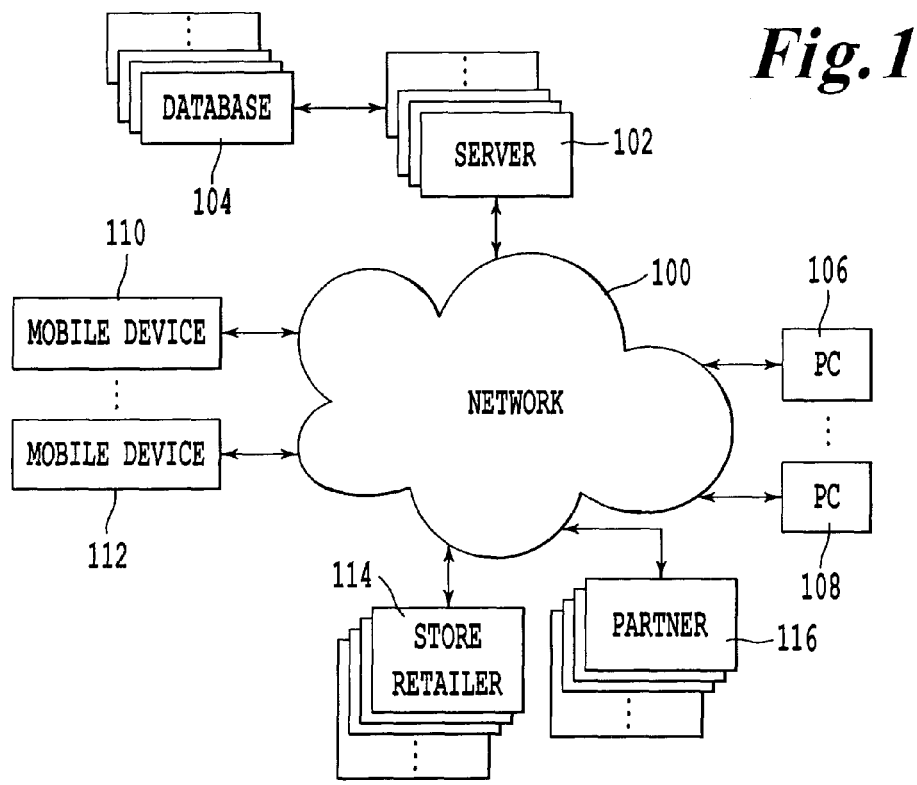
FIG. 1 illustrates an exemplary network topology using a network.

The terminology "retailer" as used herein refers to a business involved in the sale of consumer items, industrial goods, or services to the public. A "consumer packaged good" (hereinafter "CPG") as used herein includes any consumer item prepared and packaged by a manufacturer and made available for purchase by the retailer. A "CPG manufacturer" as used herein includes any manufacturer of a consumer packaged good. A "CPG partner" as used herein includes any CPG manufacturer having a business and/or contractual relationship with the retailer.

In exemplary embodiments, a customized offer includes one or more discounts and/or one or more rewards. A "discount" as used herein specifies a reduction in a general market price point of an item, or a set of items. A "reward" as used herein indicates providing value to a customer such as a free item(s), discounted price, coupon(s), targeted service(s) and targeted information. Additionally, a "coupon" as used herein specifies a reduction in a sale price of an item for a limited duration of time or number of transactions.

In exemplary embodiments, the terminology a "customer" includes individuals and households.

In exemplary embodiments, a loyalty medium is associated with a customer's loyalty account. Examples of a loyalty medium include, but are not limited to a loyalty card, fob, credit card, biometric data, PIN, and cell phones having near field communication capability (e.g., infrared, WiFi, bluetooth etc.). For example, when a customer's loyalty medium is a loyalty card, the loyalty card may be used to redeem offers when making a purchase by swiping the card or entering a unique code associated with the card at a retail store. In another example, when a customer's loyalty medium is a cell phone having near field communication capability, the cell phone may be used to redeem offers by transmitting a unique ID associated with the customer's loyalty account to a receiver located on a POS device associated with the retailer.

According to some embodiments, a customer can have any desired number of loyalty mediums. For example, the customer can have both a loyalty card and cell phone with near field communication capability as loyalty mediums. According to some embodiments, scanning a loyalty medium includes, but not limited to, scanning a barcode located on a loyalty card, swiping a magnetic strip located on the loyalty card through a card reader, using a near field communication capability of a cell phone or a fob to transmit a unique ID associated with a customer's loyalty account, or using any other desired communication device to transmit the unique ID associated with the customer's loyalty account.

The embodiments of the present advancements are related to systems and methods for generating customized offers for selected households. In embodiments, a retailer of consumer goods may utilize the exemplary customer loyalty system to deliver customized offers. Each customized offer may be based on a household's purchase history or the purchase history of a number of households in a particular geographical area. Customized offers for an item may be unique to a particular household where that household receives an offer for an item that other households do not receive.

As an example, a retailer price for a particular brand of yogurt may sell for $2.00. However, a particular household may receive an offer to buy that yogurt for $1.50. If a household chooses to accept that offer, that offer may be loaded onto any desired loyalty medium such as a loyalty card, fob, NFC cell phone, credit card, biometric, PIN associated with the household. Accordingly, when the household purchases that particular brand of yogurt and uses the loyalty medium when purchasing that brand of yogurt, the yogurt may be sold for the offer price of $1.50 even if the price of that brand of yogurt went up to $2.20 at the retailer.

According to embodiments, the price point may be determined by evaluating the following inputs by price area for customers within that price area: retailer cost, retailer regular retail price, retailer average retail price, retailer promoted price, and shelf price of key competitors. In further embodiments, any additional funding available from CPG partners that will be provided in return for incremental unit volume may also be included when determining a price point. Additional embodiments take into account the price elasticity of the item for retailer customers (i.e., how many incremental units the retailer expects customers to purchase for a given reduction in price). Also, embodiments may take into account any information indicating how important each particular item is in terms of trip driving behavior (i.e., how important the item is to customers in deciding where to shop—where the retailer would be more likely to provide a lower price point than might otherwise be warranted for an item that is a critical driver of trip behavior). The above non-exclusive list of inputs may be used to determine the price point that will be most optimal for customers, CPG partners and the retailer.

Topology/Architecture

In embodiments, any desired network configuration, hardware, programming architecture, or a combination of both may be used to implement a system to perform a retailer's customized offers savings program. FIG. 1 illustrates an example network topology using a network 100. In embodiments, the network 100 may be any desired network such as the internet, a local area network (LAN), a wide area network (WAN), etc.

In embodiments, one or more servers 102 may be connected to one or more databases 104, and interfaced with the network 100. The one or more servers 102 may be utilized as a central hosting site for a retailer to manage the retailer's customized offers savings program. According to some embodiments, an enterprise system run by the retailer may be implemented on the one or more servers 102. The enterprise system may be used to implement the customized offers savings program.

In embodiments, the network configuration illustrated in FIG. 1 may further include personal computers (PC) 106 and 108 and mobile devices 110 and 112. As illustrated in FIG. 1, any desired number of PCs and mobile devices may be connected to the network 100. Users of the PCs 106 and 108 and mobile devices 110 and 112 may access the customized offers savings program on the one or more servers 102 via network 100. Accordingly, the servers 102 may notify households of the customized offers savings program through the network 100 to the households' PCs or mobile devices. Additionally, one or more store retailers 114 may access the server 102 via network 100. As an example, a retailer may be a regional or national chain having a plurality of retailers associated with that retailer. Accordingly, each store retailer 114 associated with the retailer may access the customized offers savings program using a PC or point of sale device (POS). Additionally, one or more CPG partners 116 may access the customized offers savings program on the server 102 via the network 100. As an example, one or more CPG partners 116 may receive reports from the server 102 via the network 100 to help the CPG partners 116 to receive reports to help the CPG partners 116 develop offers.

Figure 2:
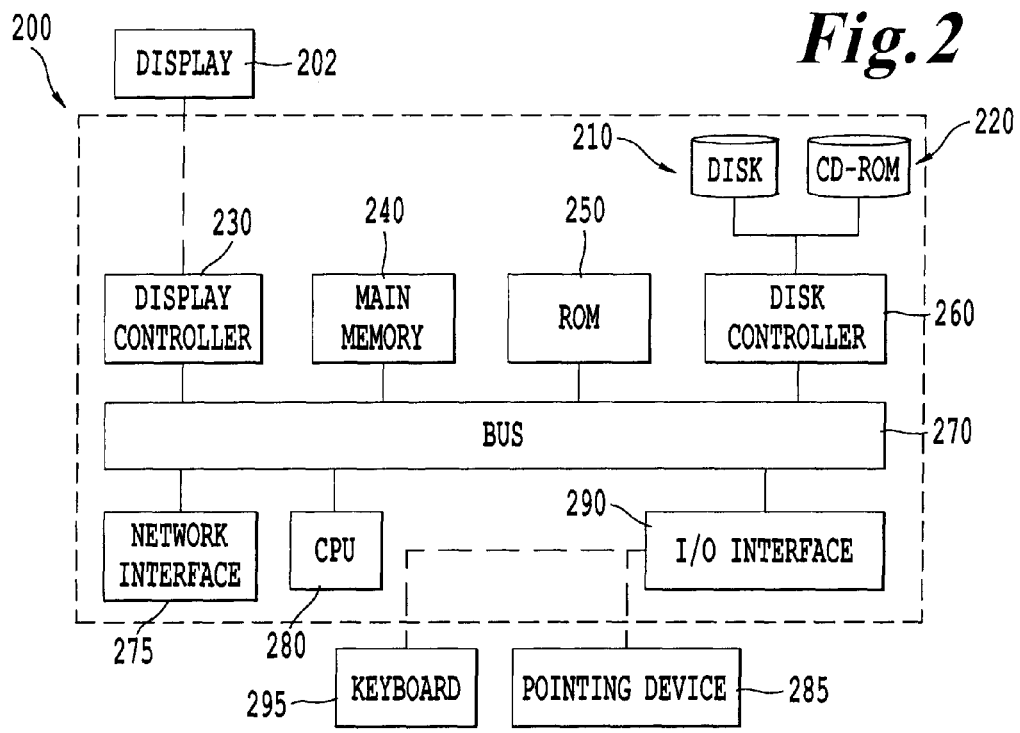
FIG. 2 is a block diagram of an exemplary server that may be utilized to implement an enterprise system.

FIG. 2 is a block diagram of a server 200 that may be utilized to implement the enterprise system. According to some embodiments, one or more servers 200 operating in parallel with each other may be utilized to implement the enterprise system.

In embodiments, the server 200 includes a CPU 280 which processes data and instructions stored in main memory 240 and/or ROM 250. The CPU 280 may also process information stored on the disk 210 or CD-ROM 220. As an example, the CPU 280 may be an IBM System 4690 from IBM of America employing at least one Xenon processor from Intel of America or an Opteron processor from AMD of America. Thus, instructions corresponding to a process in a mobile device may be stored on any one of the disk 210, CD-ROM 220, main memory 240 or ROM 250.

In embodiments, the server 200 also includes a network interface 275, such as an Intel Ethernet PRO network interface card from Intel Corporation of America, for interfacing with the network 100 (FIG. 1); a display controller 230, such as a NVIDIA® GeForce® GTX graphics adaptor from NVIDIA Corporation of America for interfacing with a display 202, such as a Hewlett Packard HP L2445w LCD monitor. The server 200 may also include an I/O interface 290 for interfacing with a keyboard 295 and pointing device 285, such as a roller ball or mouse. According to some embodiments, the disk controller 260 interconnects disk 210, such as a hard disk drive or FLASH memory drive, and CD-ROM 220 or DVD drive with bus 270, which may be an ISA, EISA, VESA, PCI, or similar for interconnecting all of the components of the server 200. A description of the general features and functionality of the display 202, keyboard 295 and pointing device 285, as well as the display controller 230, disk controller 260, network interface 275 and I/O interface 290 is also omitted for brevity as these features are well known. Of course, other processor and hardware vendors and types are known in the art such as Freescale, ColdFire®, i.MX and ARM processors from Freescale Corporation of America.

The example server 200 of FIG. 2 may therefore be a hardware platform of a computing device, such as a PC, and CPU 280 may for example be an Intel Pentium Processor, or any other desired processor known in the art. The computer-readable instructions stored on any one of the main memory 240, ROM 250, disk 210 or CD-ROM 220 may be provided as a utility application, background daemon, or component of an operating system, or combination thereof, executing in conjunction with CPU 280 and an operating system such as Microsoft Windows® VISTA, UNIX®, Solaris®, LINUX®, Apple® MAC OS® and other systems known to those skilled in the art.

Main memory 240 and/or ROM 250 support registries and the like features of the server 102. As such, main memory 240 may be a random access memory (RAM), FLASH memory, EEPROM memory, or the like, while ROM 250 is Read Only Memory, such as PROMs. Further descriptions of the main memory 240 and the ROM 250 are omitted for brevity as such memory is well known.

Savings Program

Offers may be generated to maximize profits and savings where a price for an item is chosen that would increase profit for the retailer and also increase a household's savings on that item. The retailer may partner with a CPG manufacturer for the purpose of building market share for both the CPG manufacturer and the retailer. In embodiments, the retailer may utilize the exemplary customer loyalty system disclosed herein in a direct marketing effort to provide everyday prices that are best in the market loaded onto a loyalty medium. The retailer may utilize the exemplary customer loyalty system to target households and deliver the most relevant offers to each customer.

Additionally, the retailer may utilize the exemplary customer loyalty system to monitor a customer's purchase history, where the retailer and CPG partners can utilize an aggregated view of collected information to develop prices for customized offers. Particularly, upon receiving information from the retailer indicating that certain customers are only willing to buy the CPG partner's product at a reduced price, the CPG partner may agree to provide funding to the retailer that will allow the retailer to fully or partially offset the cost of the incremental price reduction to the consumer.

Particularly, the retailer may build profitable market share despite low everyday prices because the CPG partner may fund a portion or all of the incremental markdowns to support incremental business. The CPG partner may have the incentive to fund the markdowns because the CPG partner may continue to make a strong margin against its own marginal cost. Additionally, the CPG partner may have the incentive to provide free goods to encourage trials with target consumers and build incremental demand.

Embodiments are related to identifying brand switchers and providing CPG partners exclusive access to brand switchers. A brand switcher may be any consumer that may switch brands if offered a particular price. Upon identifying a potential brand switcher, a CPG partner may have the opportunity to provide an offer to the potential brand switcher. Additionally, CPG partners may have the opportunity to offer free and deeply discounted new items that fit the target consumer profile of the CPG partner.

According to some embodiments, a customized offers savings program may be supported by any desired marketing and advertising methodology. As an example, customers of the retailer may learn of the customized offers savings program through print advertising, in-store signage, radio/TV, online advertising, social media, customer specific messaging, customer specific checker and management interaction, and targeted emails, SMS/text messages, or any other targeted form of communication.

According to some embodiments, based on a customer's demonstrated propensity to purchase an item, the customer is allocated a high-buyer reward offer. The purchase of the offer is not based on the quantity of an item the customer purchases since the customer already buys this item often. Therefore, the high-buyer offer is allocated as a reward to the customer and builds loyalty by giving a highly relevant offer to the customer. Additional embodiments include affinity offers where an offer is allocated upon purchase of an affinity item (e.g., an item that is frequently bought with another item). Affinity offers may be provided in the form of "you bought X, so we suggest you try Y."

Some embodiments are related to personalized information related to deals available at the retailer, which may include a personalized list of the items on sale at the retailer (whether included in the ad or not) that the customer will be interested in. According to embodiments, the personalized list includes a list of the items in a retailer ad each week that each customer buys from the retailer with the items sorted by relevance (e.g., item quantity, amount spent, etc.) as well as items that are on deal each week (loyalty medium specials) that are not included in the retailer ad. The benefit to the customer is a savings in time from having to create their own personalized list of the items they typically buy from the retailer that is on deal for the current week. Further embodiments extend the personalized list to include recommended items (e.g., items that the customer doesn't currently purchase, but that customers like the customer typically purchase and they may want to consider).

Further embodiments are directed to manufacturer digital coupons. The manufacturer digital coupons may be sorted according to customer/household relevance. Embodiments are related to a site that aggregates all of the digital coupons available on the web, where coupons are sorted by relevance to each shopper, which helps save the customer time. Embodiments are related to sorting coupons based on relevance (e.g., item quantity, amount spent, discount value, customer purchase history, etc.). Further embodiments include print coupons that can be assorted by relevance as discussed above for digital coupons.

Selection of Households

Embodiments are related to the ability to pinpoint households that have the highest probability of engaging in a customized offers savings program. Household selection may be based on a geographical location such as an entire retailer division, a retailer district, a city, etc. Household selection may also be based on households who are loyal retailer shoppers, households who are not loyal retailer shoppers, households who are declining in spending, households who are new to the retailer, or any other group or segment of households that the retailer would be interested in engaging in a customized offers savings program. Additional embodiments include allocation of offers based on customer segment data, which specifies customer preferences. Customer segment data can be derived by the system of the present invention from observational, behavioral, demographic and other segmentation methodologies. Examples of customer segments include family lifestyles such as baby and/or toddler. Additional customer segments can specify preferences such as pets, household goods, electronics, office supplies, etc. Therefore, offers can be tailored to these segments.

Offer Creation

Embodiments are related to creating an offer bank that identifies the most relevant offers to retailer shoppers. In embodiments, offers can take any desired form. As an example, an offer may be a price point that is a $X.XX price for an item that may be for unlimited use over a brief or extended period of time. As another example, an offer may be in coupon form that is a $X.XX off an item that may be a one time use over a brief or extended period of time. The offer may be in a continuation form where a consumer may spend $X.XX or purchase a specific quantity over a period of time and save $Z.ZZ. The offer may also take a total basket form that may be discount (% or $) off of an entire basket of a consumer. Offers may further be in the form of if "you buy X, you will receive Y." Offers may also specify a % off a purchase price. Offers may also specify that a customer needs to change purchasing behavior to receive an offer (e.g., if the customer purchases an item at least once a week for one month, the customer receives a customized offer for the item.)

Offers in the offer bank may include offers for any desired item in any desired category. As an example, offers may be directed to high penetration items, which may be items that are most popular in the marketplace, and therefore items that households are most likely to compare across retailers. High penetration items may be highly relevant to customers for targeted offers. Offers may be directed towards items with high relevance to particular household segments. Offers in the offer bank may be directed towards items in categories with a high rest of market gap (e.g., categories that may align a retailer's actual performance with the retailer's potential performance). Offers may be directed towards items in categories with a unique or special relevance to the retailer. Offers may also be directed towards items from participating CPG partners.

Offers may further be revised based on input from retailer internal stakeholders, CPG stakeholders, or from conditions from the competitive landscape. As an example, the retailer may have the ability to make a targeted offer on any item within the store. Unique items may be items that only the retailer carries such as retailer signature soup, which may be only available at the retailer. Accordingly, offers can be on any item that the retailer carries and would be relevant to a customer in the form of a targeted offer.

According to some embodiments, an offer may include any desired offer verbiage such as the wording of an offer or the form of the offer. Offers may include any desired price point, which may be based on competitive price checks and/or an internal cost structure of the retailer. An internal cost structure may include predetermined price points specified by the retailer. Offers may further be embodied in offer files defining the specifics of an offer. Additionally, offers may be associated with any desired branding and/or templates based on a communication channel used to notify a consumer of the offer.

Embodiments are related towards allocating offers that are most relevant to a household while also representing incremental sales to the retailer. In embodiments, offer allocation may be based on an allocation strategy that balances relevance to a household and incremental sales potential to the retailer and CPG partners. The allocation strategy may utilize any desired methodology for determining which households should receive an offer. Further, the allocation strategy may use point of sale (POS) data upon creation of an offer.

Offer Communication Channels

Embodiments are related towards delivering offers using any desired communication channels. Embodiments may use any desired data mining methodology to enable the retailer to determine the manner of communication that a customer is most likely to receive an offer. In embodiments, the retailer can identify a communication channel by asking the customers how they would like to receive offers. During registration, the customer may select from a picture drop down list any desired method of communication: direct mail, printed receipt coupons, online, e-mail, mobile phone, in store, etc. In other embodiments, the data provided by customers and how the customers have responded in the past may be evaluated. For example, if the customer provided the retailer with their e-mail and has responded to e-mails in the past, future communications will use e-mail because this form of communication is relevant, low cost, and has a short lead time.

An example communication channel may be a customized web page. The customized web page may be tailored to give a customer easy access to the information that is most relevant to that customer. On the customized web page, customized content and customized offers may be presorted by relevance. Particularly, the customized web page may deliver a unique display presentation of content on that web page based on the customer viewing the web page. The customized web page may further allow a customer to choose additional sorting and to state preferences unique to that customer. Further, the customized web page may be connected to a retailer loyalty medium allowing a household to opt in to an offer and download offers to the household's retailer loyalty medium.

A desired offer communication channel may be email. Email may be used to announce a customized savings offer program, notify a household of a customized website, and provide updates that new offers or special offers are available to the customer on their customized website. Another desired communication channel may be a SMS message sent to any desired mobile device such as a smart phone or tablet device. The mobile device may be used to notify consumers of offers via email or text messages.

A desired communication channel may include direct mail. Direct mail may be used to announce the customized offers savings program, notify a household of a customized website, or notify the household of offer delivery. Another desired communication channel may be retailer interaction. As an example, when a loyalty medium is scanned at a POS device (e.g., register), a message may appear on the POS device indicating that the consumer associated with that loyalty medium may be a potential candidate for the customized offers savings program or has failed to view and accept an offer upon receiving notification of the offer via email or text message. In embodiments, upon receiving the prompt on a POS device, retailer personnel may engage the consumer regarding the customized savings offer program or any outstanding offers. Further, offers may be communicated to the consumer via a message placed on the consumer's receipt tape after the consumer makes a purchase at the retailer. Additionally, customers may be provided with printed receipt coupons including reminders to join the customized offers savings program, new offers available, the customer's shopping list, etc. In further embodiments, in-store kiosks may be used to access the customized offers savings program. Also, tags communicating offers or advertisements may be placed on retailer store shelves and on POS devices. Additionally, communication of new offers or other customer relevant messages may be included within a mobile application, where new offers etc. for each customer will show up as an alert or other type of customer communication when the customer opens their mobile application on their smart phone, tablet or other mobile device.

Reporting

Embodiments may be related to any desired reporting tools to enhance the retailer's learning and strategy development regarding the customized offers savings program. An example reporting tool may be used to capture key statistics regarding the use of the program such as the number of households registered, the number of households redeeming offers, etc. The reporting tool may further be used to provide post-analysis reports to indicate, as an example, how much a particular offer is being used or how much profit an offer is generating. Additionally, the reporting tool may be used to keep track of offer redemption data to generate bills to CPG partners for program funding.

In further embodiments, a CPG generates a Notice of Promotional Allowance (NOPA). NOPA's may represent a contract between the CPG and retailer. For example, the NOPA specifies an agreement between the CPG and the retailer denoting the amount of allowance the CPG will provide to fund a targeted promotion, which helps retailers determine price points for offers.

System Diagrams

Figure 3:
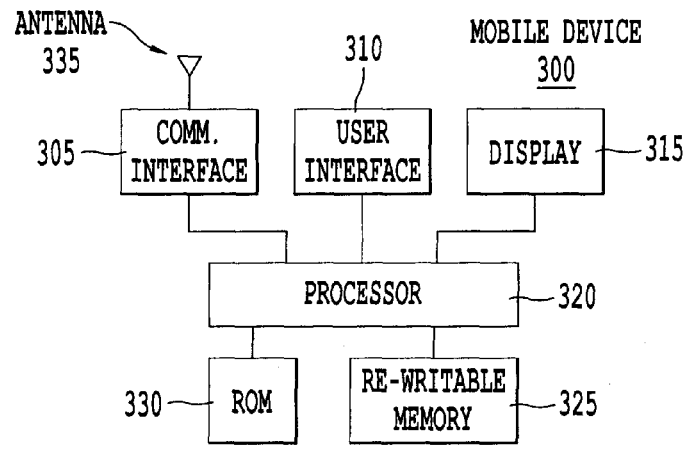
FIG. 3 is a block diagram of an exemplary mobile device.

FIG. 3 is a block diagram of a mobile device 300. In embodiments, the mobile device 300 is identical to the mobile devices 110 and 112 (FIG. 1). The mobile device 300 may be any desired smart phone such as an iPhone® from Apple®, Inc. The mobile device may be any desired tablet device such as an iPad®, Motorola Xoom™, etc. Mobile device 300, includes a processor 320 used to control the functions of mobile device 300 and to run applications thereon, such as an electronic address book, interne browser, etc. Processor 320 may be an ARM processor or a processor such as a Core 2 Duo from Intel Corporation of America. Alternatively, Processor 320 may be implemented on an FPGA, ASIC or using discrete logic circuits, as one of ordinary skill will recognize.

A user interface 310, which may include a microphone, speaker, touch screen, keyboard or any combination thereof, allows the processor 320 to receive input from a user of the mobile device 300, and a display 315 provides feedback to the user. Display 315 may be a color or monochrome LCD display or any other display that is known.

In embodiments, mobile device 300 also includes a communication interface 305 and antenna 335 to communicate with other devices, such as the server 102 (FIG. 1) another mobile device 300. Further, mobile device 300 may communicate with these other devices wirelessly using the cellular network (including EDGE, 3G, 4G, etc.) a WiFi connection, a Bluetooth connection or any other wireless form of communication that is known. Mobile device 300 may also communicate through a wired connection to communication interface 305, such as a USB connection.

In embodiments, mobile device 300 includes read-only memory, ROM 330, to store low-level functions and processes necessary to support core functionality, and re-writable memory 325, which stores an operating system, drivers, applications, application data and user data. Re-writable memory 325 may be dynamic or static random access memory (RAM), FLASH memory, EEPROM memory, and the like. Further, portions of the re-writable memory 325 may be removable.

For example, re-writable memory 325 may store an application for communicating with server 102 (FIG. 1) to identify mobile device 300 and to provide the server 102 with access to data stored therein. Such application may be downloaded, via any of the communication methods described above, from the server 102, from a software repository or from an online store, such as the App Store from Apple®, Inc. of America. Further, such an application may be an electronic address book, or electronic personal information manager (PIM). However, the application may also be a plug-in for an electronic address book or PIM already installed on mobile device 300, a background application, driver and the like.

As one of skill in the art would recognize, the above descriptions of the server 200 and mobile device 300 are merely examples and other server configurations and mobile devices may be used without departing from the scope of the present advancements.

According to some embodiments, a "module" refers to hardware architecture or one or more programming architectures, or a combination of both, configured to perform one or more designated functions.

Figure 4:
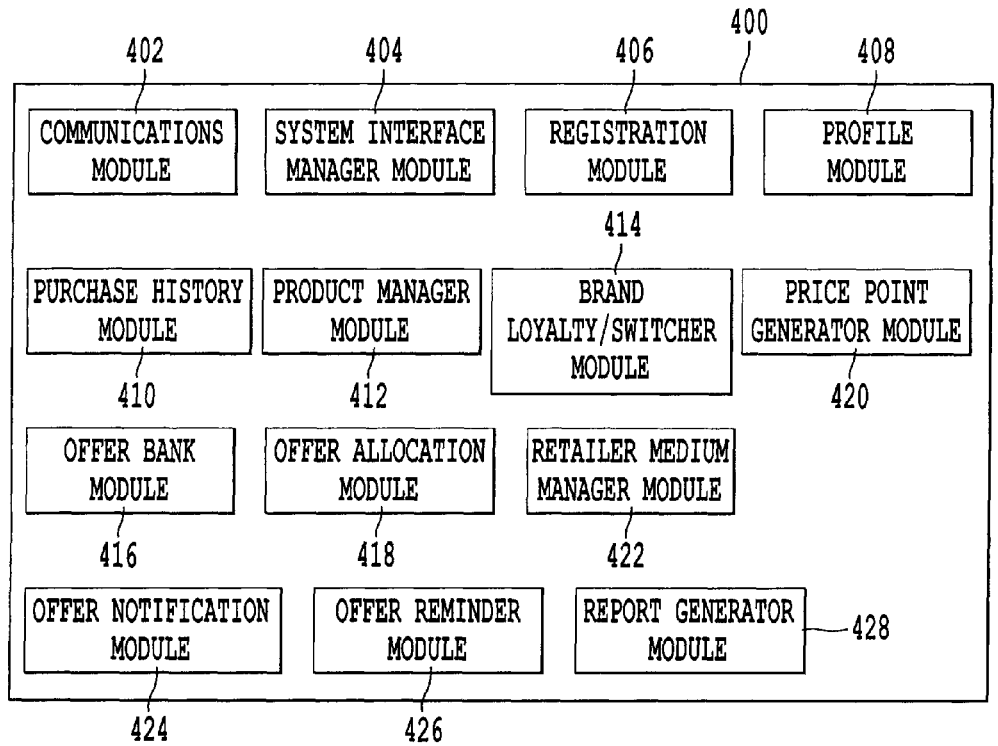
FIG. 4 illustrates an exemplary system including one or more modules.

FIG. 4 illustrates an example system 400 including one or more modules. In embodiments, the system 400 may be incorporated within the server 102 (FIG. 1). In embodiments, the system 400 includes a Communications Module 402, a System Interface Manager Module 404, a Registration Module 406, a Profile Module 408, a Purchase History Module 410, a Product Manager Module 412, a Brand Loyalty/Switcher Module 414, an Offer Bank Module 416, an Offer Allocation Module 418, a Price Point Generator Module 420, a Retailer Medium Manager Module 422, an Offer Notification Module 424, an Offer Reminder Module 426, and a Report Generator Module 428.

According to embodiments, the Communications Module 402 may include any desired networking and/or communication functionality to permit the server 102 to communicate with any desired device. As an example, if an e-mail is available for a consumer notifying that consumer of an available offer, the Communications Module 402 includes the logic to send the e-mail to the consumer.

According to embodiments, the System Interface Manager Module 404 includes any desired logic to provide an interface to the enterprise system that runs the customized offers savings program. As an example, the System Interface Manager Module 404 may be configured to provide one or more websites that allows users to view and select offers. Additionally, the System Interface Manager Module 404 may be configured to allow CPG partners to access the enterprise system and retrieve reports.

According to embodiments, the Registration Module 406 may be configured to provide a registration process for consumers who desire to sign up for the customized offers savings program. In embodiments, the Profile Module 408 may be configured to manage profiles of individual consumers that are created in the registration process.

According to embodiments, the Purchase History Module 410 may be configured to keep track of all purchases by each household. In embodiments, the Product Manager Module 412 may be configured to keep track of the products and brands sold at the retailer and also keep track of offers associated with those products and brands. The Brand Loyalty/Switcher Module 414 may be configured to keep track of any data used to determine if a consumer is loyal to a brand or a potential brand switcher.

According to embodiments, Offer Bank Module 416 may be configured to determine which items should be included in the offer bank. The Offer Bank Module 416 may be further configured to keep track of all available offers in the offer bank (e.g., list of offers available to customers). Offer types may include price point, coupon, continuity, total basket, etc. In embodiments, each offer can include one or more items. As an example, an offer may include any flavor of a particular brand of yogurt of a particular size.

In embodiments, the Offer Allocation Module 418 may be configured to allocate offers to households. As an example, the Offer Allocation Module 418 may be configured to implement any desired allocation strategy to identify offers that are most relevant for each household and allocate those offers to each household. In embodiments, the Price Point Generator Module 420 may be configured to generate a price point for an offer. As an example, when a household has an allocated offer, the Price Point Generator Module 420 may be configured to determine the price for that offer. According to some embodiments, price points are determined independently of offer allocation. For example, price points can be set at various levels for a variety of pricing strategies: to entice a non-buyer to buy the product, to entice a low-buyer to buy more of the product, to entice a brand-switcher to switch brands, etc. Once an offer is allocated to a customer, the price point generator module can be configured to determine which of the pricing strategies is best suited for that customer for that particular offer. Therefore, in some embodiments, allocation includes at least matching the customer to the right offers and then matching the right price points to the offers already allocated.

According to embodiments, the Retailer Medium Manager Module 422 may be configured to load selected offers onto a loyalty medium and keep track of which offers have been redeemed. In further embodiments, when a customer is purchasing a product at a POS device associated with the retailer store and swipes or scans his/her loyalty medium, the POS device may send a purchase notification to the enterprise system specifying a retailer account associated with the loyalty medium and the product the customer is purchasing. Accordingly, upon receiving this purchase notification, the Retailer Medium Manager Module 422 may retrieve the retailer account specified in the purchase notification and redeem any offers selected by the customer and associated with the product specified in the purchase notification.

In embodiments, the Offer Notification Module 424 may be configured to notify each household that a new offer is available. As an example, when a new offer is allocated to a household, the Offer Notification Module 424 may prepare an email notifying the household of that offer. In embodiments, the Offer Reminder Module 426 may be configured to generate a reminder that an offer has not been selected or redeemed. According to embodiments, the Report Generator Module 428 may be configured to generate one or more reports that enable the retailer or CPG partners to determine at least the success of an offer.

Figure 5:
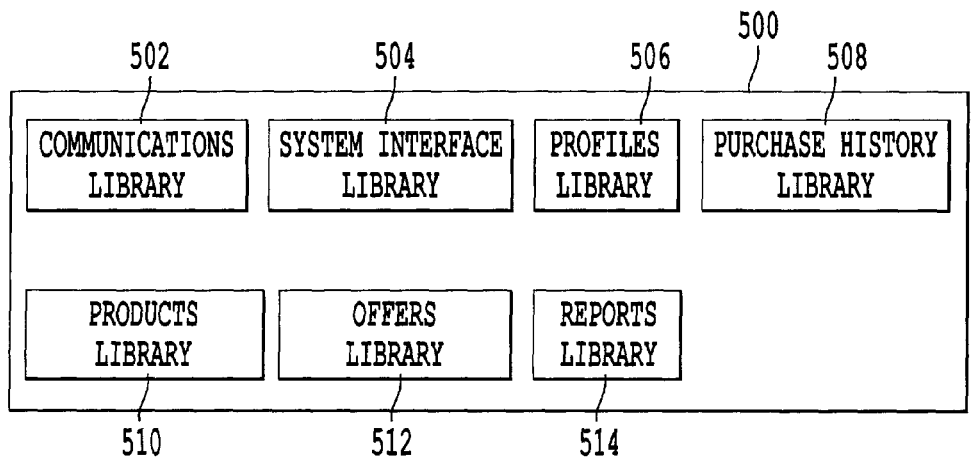
FIG. 5 illustrates an exemplary database library system.

FIG. 5 illustrates an example Database Library System 500. According to some embodiments, the Database Library System 500 is incorporated in database 104 (FIG. 1). In embodiments, the system 500 includes a Communications Library 502, a System Interface Library 504, a Profiles Library 506, a Purchase History Library 508, a Products Library 510, an Offers Library 512, and a Reports Library 514.

According to embodiments, a Communications Library 502 may include any desired communication protocols to communicate over a desired network such as the IP protocol for the Internet. In embodiments, the System Interface Library 504 may include any system formats, logos, and files to implement an interface such as a web user interface.

According to embodiments, the Profiles Library 506 may include the profiles of consumers who are registered to use the customized offers savings program. In embodiments, the Purchase History Library 508 may include the purchase histories of each household.

According to embodiments, the Products Library 510 may include any files that indicate products and brands sold at the retailer and offers associated with those products and brands. In embodiments, the Offers Library 512 may operate as the offer bank and store all offers allocated by the Offer Allocation Module 418. Items included in the Offers Library 512 may be designated as an offer item (e.g., items that are available to receive offers). Further, categories included in the Offers Library 512 may be designated as an offer category (e.g., categories that are available to receive offers). In embodiments, the Reports Library 514 may include all generated reports generated by the Report Generator Module 428.

Figure 6:
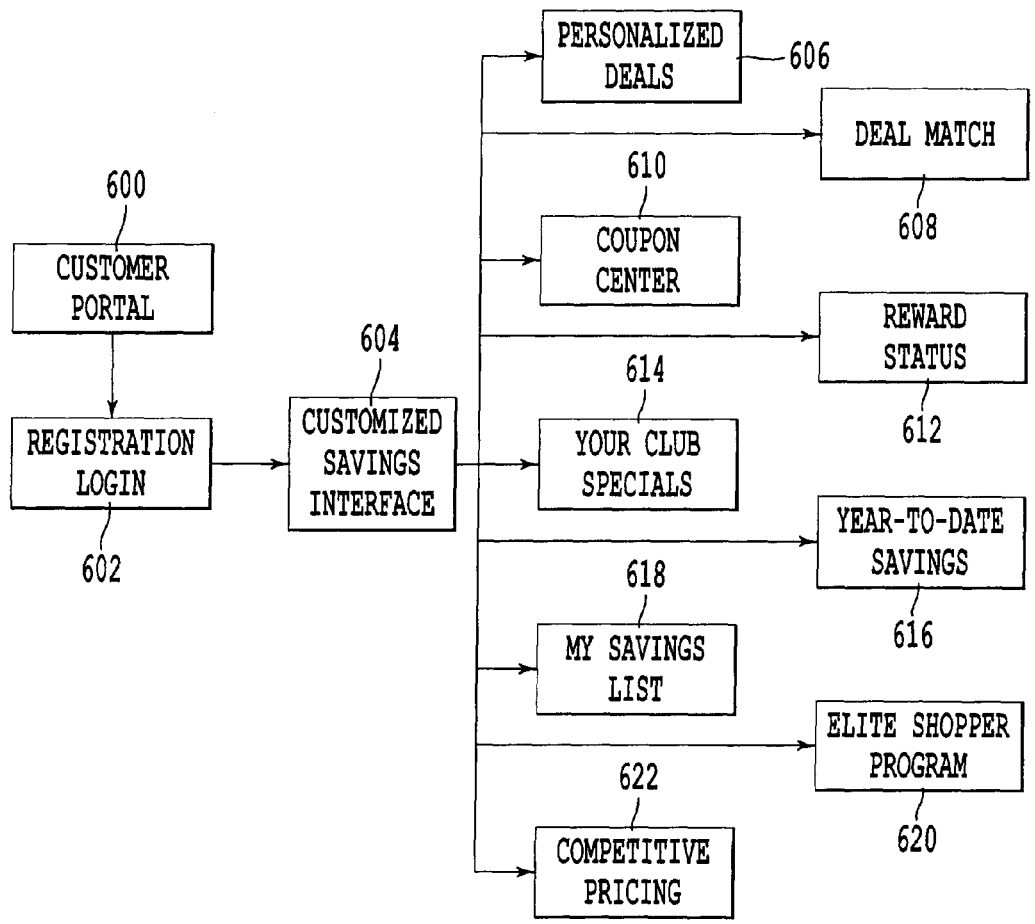
FIG. 6 illustrates an exemplary overview of the enterprise system.

FIG. 6 illustrates an example overview of the enterprise system that implements the customized offers savings program. In embodiments, the enterprise system may include a customer portal 600 that permits consumers to access the customized offers savings program via a registration/login process 602. In embodiments, the customer portal 600 and all interfaces associated by the customer portal 600 are implemented by the System Interface Manager Module 404. Upon logging into the enterprise system, according to some embodiments, consumers may then have access to a customized savings interface 604. In embodiments, the customized savings interface 604 may further include personalized deals 606. According to some embodiments, personalized deals include one or more customized offers for loyalty customers. The customized savings interface 604 may further include a deal match 608 providing offers that match or improve upon competitor prices that are promoted within the competitor's store for a specified period of time. The customized savings interface 604 may further include a coupon center 610 providing an aggregated view of available print or digital coupons available to each customer.

In embodiments, the customized savings interface 604 may include an internal award status 612 indicating available rewards for the consumer logged onto the enterprise system.

In embodiments, the customized savings interface includes "Your Club Specials" 614. Such specials target specific products that correspond to a customer's purchase history or system perceived lifestyle/demographic. For example, "Your Club Specials" provides a list of all ad items and non ad items that the customer has purchased in the past. In embodiments, the customized savings interface 604 may further include to year-to-date savings 616 showing the savings that the consumer has accumulated by using the customized offers and/or manufacturer offers. The customized savings interface 604 may also provide access to a "My Savings" list 618 showing offers that have been selected for the customer logged onto the enterprise system. In further embodiments, the customized savings interface may include a preferred shopper program that provides deeper discounts and/or additional services. These discounts and/or services may be provided to preferred loyalty customers exceeding a loyalty threshold (e.g., month-to-month purchase amount) and are not available to all loyalty customers. In additional embodiments, the customized savings interface 604 may include information about competitive pricing 622 showing competitive prices for products and brands offered by the retailer.

Figure 7:
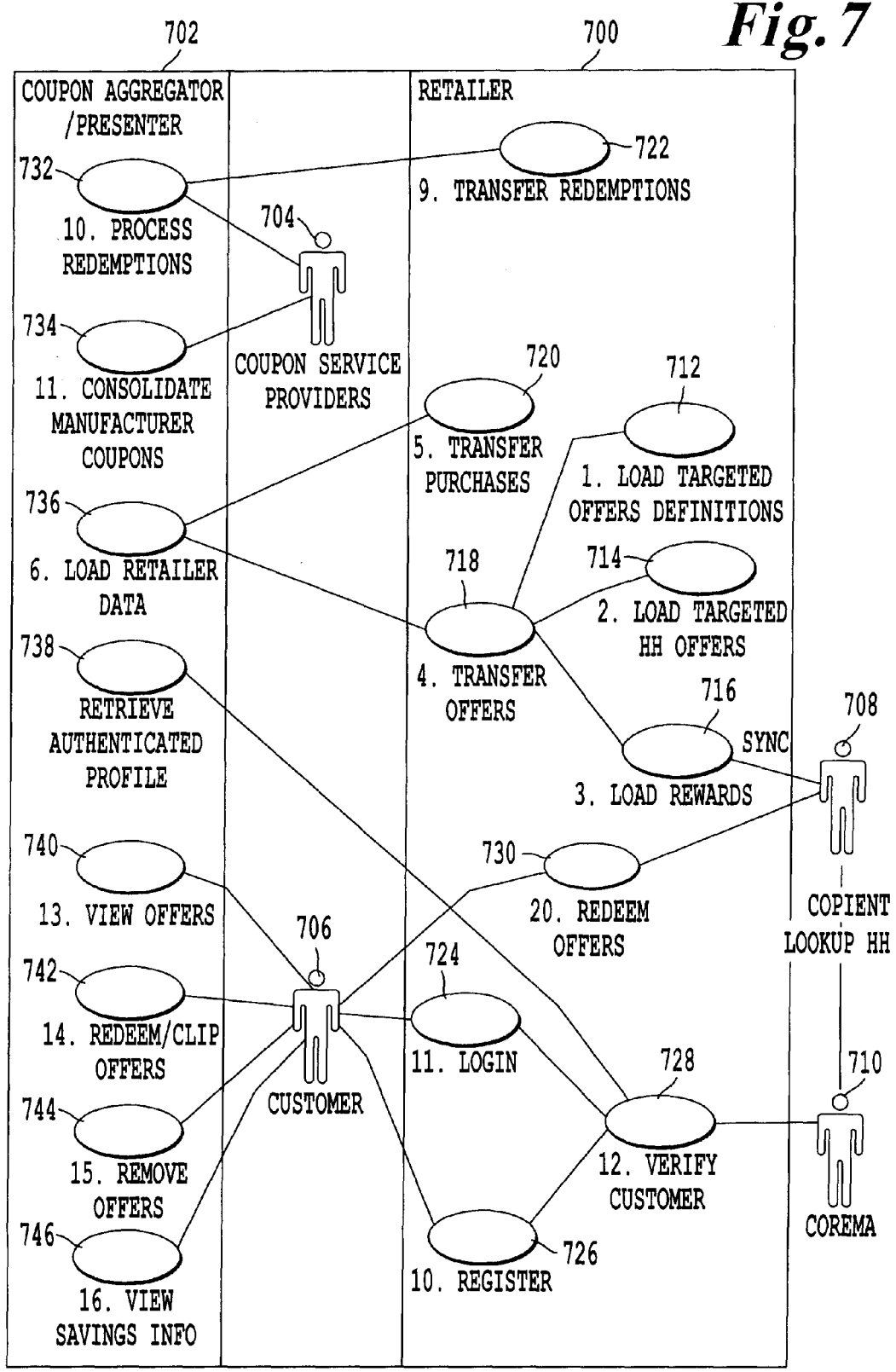
FIG. 7 illustrates an exemplary configuration between the enterprise system and a coupon aggregator server.

In embodiments, the enterprise system may distribute one or more functions to applications run on one or more servers. In embodiments, the applications may be run on a server that is operated by the retailer but separated from the enterprise system. FIG. 7 illustrates an example of distribution of functionality between the enterprise system 700 and a coupon aggregator server 702. In embodiments, the coupon aggregator server 702 may run a coupon presentation application such as Coupon Aggregator/Presenter. Advantages of distributing functionality of the customized offers savings program between the enterprise system and coupon aggregator server 702 may include the ability to prevent the enterprise system from being slowed down by diverting traffic for the customized offers savings program to the coupon aggregator server 702.

According to some embodiments, Coupon service providers 704 may be a coupon provider that has access to the coupon aggregator server 702 to upload coupons. The customer 706 may have access to the enterprise system 700 and the coupon aggregator server 702. In embodiments, the enterprise system 700 may be linked to any desired offer or account management system such as Copient 708. In further embodiments, the enterprise system 700 may be linked to any desired verification system such as Corema 710.

According to embodiments, functions on the enterprise system 700 may include aggregating retailer data related to the customized offers savings program such as target offer definitions 712, loading target household offers 714, and loading rewards (716). Additionally, the enterprise system 700 may transfer the aggregated data as offers 718 and transfer data associated with household purchases 720 to the coupon aggregator server 702. Additionally, the enterprise system 700 may transfer offer redemptions to the coupon aggregator server 702. In further embodiments, the enterprise system 700 may handle customer log in 724, and if the customer 706 is not registered to use the customized offers savings program, the enterprise system 700 may register the customer 726.

According to some embodiments, functions on the coupon aggregator server 702 may include processing redemptions 732 transferred from the enterprise system 700. The coupon aggregator server 702 may also consolidate manufacturer coupons 734 where one or more decision rules are used to determine which coupons (or offers) can be presented to customers to load to the loyalty medium, or if multiple offers have been loaded, to determine which offers can be redeemed within a single transaction. These decision rules may be used avoid the situation where a customer can redeem multiple offers on the same item within a single transaction.

According to some embodiments, the determination of which offers can be redeemed within a single transaction will be made within the retailer's point of sale system. This is particularly important where coupons are available from more than 1 coupon aggregator, which requires the rules regarding which offers should be presented to be made by the retailer's enterprise system and/or the decision for which offers can be redeemed within a single transaction to be made by the retailer's point of sale system.

The coupon aggregator server 702 may further be configured to load retailer data 736 such as offers and purchases transferred from the enterprise system 700. Further, the coupon aggregator server 702, upon verification of a customer log in, may retrieve an authenticated profile 738 of the customer. Once the customer is logged in, the coupon aggregator server 702 may provide one or more interfaces to allow the customer to view offers 740. Additionally, the coupon aggregator server 702 may provide one or more interfaces for the customer to select/clip offers 742 or remove offers 744. Further, the one or more interfaces may allow the customer 706 to view savings info 746.

Figure 8:
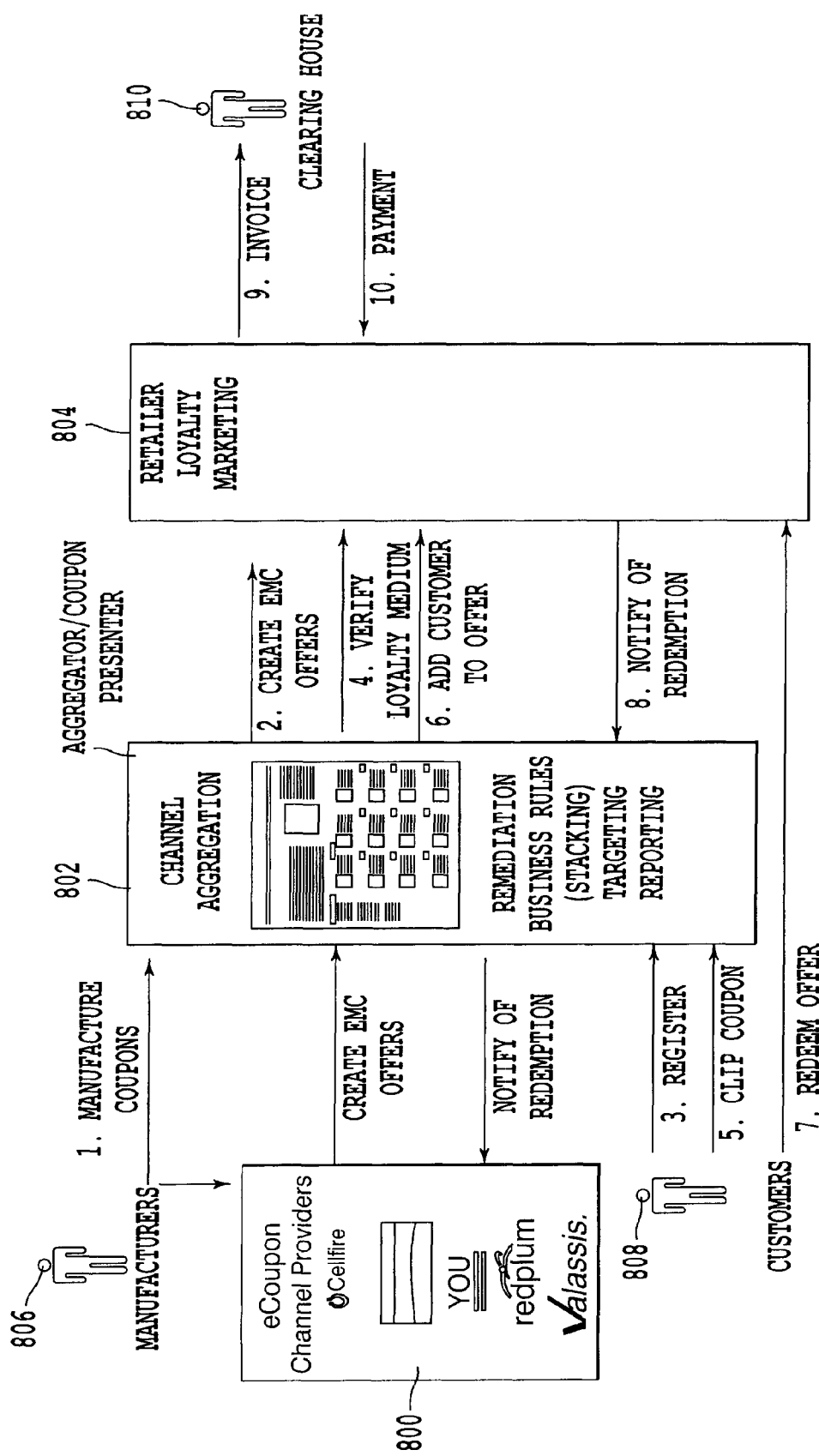
FIG. 8 illustrates an exemplary configuration for operating manufacturer coupons using a coupon application.

FIG. 8 illustrates an example configuration for operating manufacturer coupons using a coupon presentation application. The configuration includes e-coupon channel providers 800, a coupon presentation application such as Coupon Aggregator/Presenter 802, and a retailer loyalty marketing system 804. According to some embodiments, the Coupon Aggregator/Presenter 802 is run on one or more servers. In embodiments, the retailer loyalty marketing system 804 may be incorporated within the enterprise system of the retailer. According to embodiments, one or more manufacturers 806 may issue coupons and load the coupons onto the e-coupon channel providers 800 and/or the coupon presentation application 802. A customer 808 may be able to register with the retailer, where the retailer forwards the customer information to the coupon presentation application 802 permitting the customer to clip offers. In some embodiments, the third party application 802 handles displaying allocated offers and recording and sending clip information (i.e. virtual clipping of system offer data) back to the retailer loyalty marketing system 804, which performs loading of the clipped offer onto the customer's loyalty medium. Additionally, according to embodiments, the loyalty marketing system 804 may be configured to notify the coupon presentation application 802 of offer redemptions, while the coupon presentation application 802 may be configured to notify the e-coupon channel providers 800 of offer redemptions. In embodiments, the loyalty marketing system 804 may be configured to send invoices to clearinghouse 810 to receive payment.

FIG. 9 illustrates an example configuration for accessing a customer portal to view offers. In embodiments, a customer portal 900 may interface with an identity management system 902 and a coupon presentation application 906 such as a Coupon Aggregator/Presenter. According to embodiments, the customer portal 900 and identity management system 902 may be comprised of one or more components incorporated within the enterprise system. A customer 908 may access the customer portal 900 via a browser of a computer 910 or a mobile application on any desired mobile device 911 (represented by dashed lines).

According to embodiments, the customer portal 900 may provide a sign-in page 912 to the customer 908 via the browser 910. The customer 908 may submit a user ID and password information where an access manager 916 retrieves user information from a database 918 running a lightweight directory access protocol (LDAP) to retrieve user information. If the customer 908 is authenticated to access the customized savings program, the customer portal 900 may return a sign-in success page 920 to the customer 908 via the browser 910. Once the customer 908 is authenticated, the customer portal 900 may generate and save a token associated with the customer's session 908 in the database 914.

In embodiments, the customer portal 900 may utilize a web service 922 to contact the coupon presentation application 906. The coupon presentation application 906 may provide a targeted offers page 924 to the customer 908 via the browser 910.

Figure 10A:
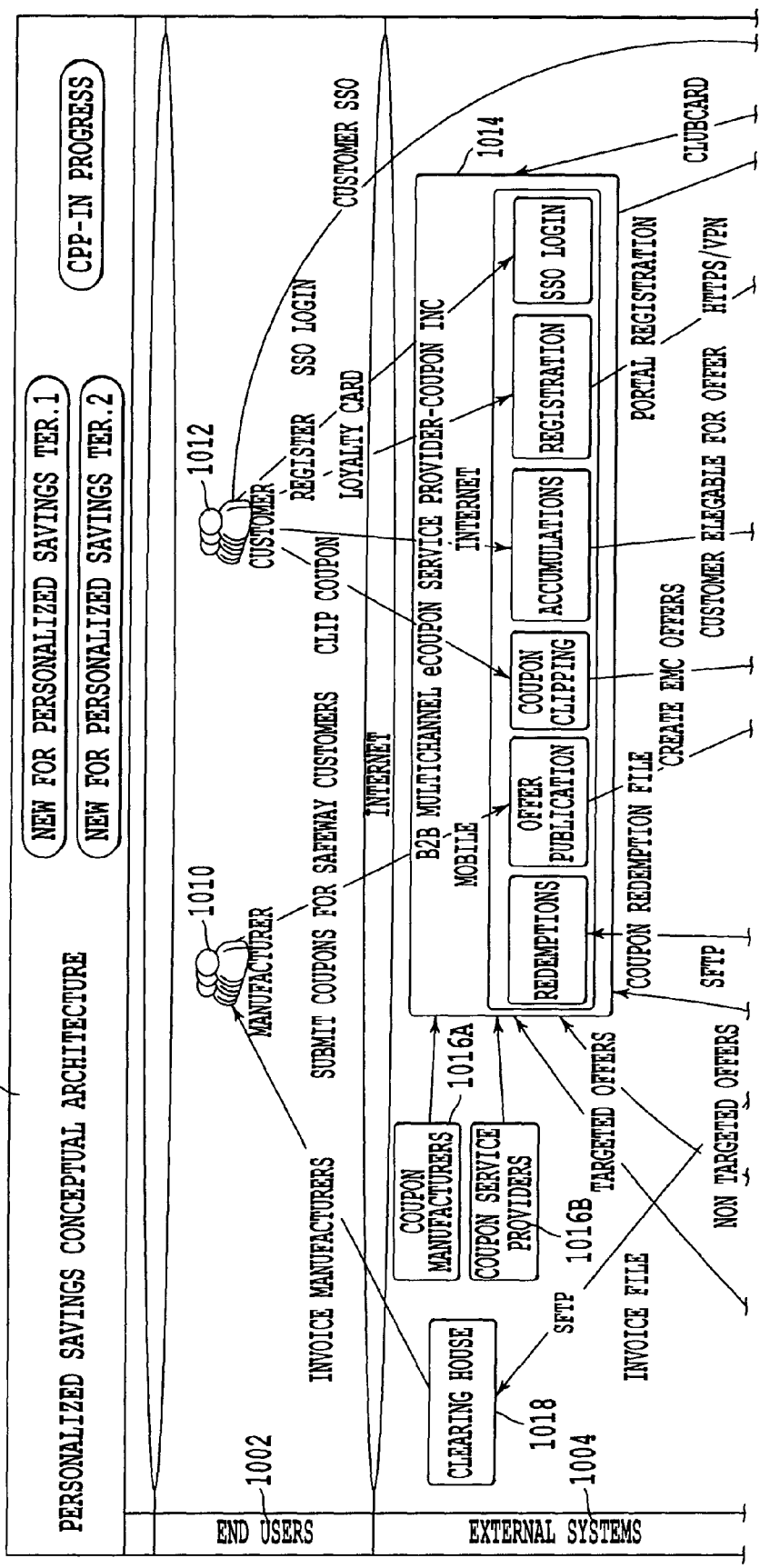
FIGS. 10A and 10B illustrate an exemplary architecture for implementing a customized offers savings program.
Figure 10B:
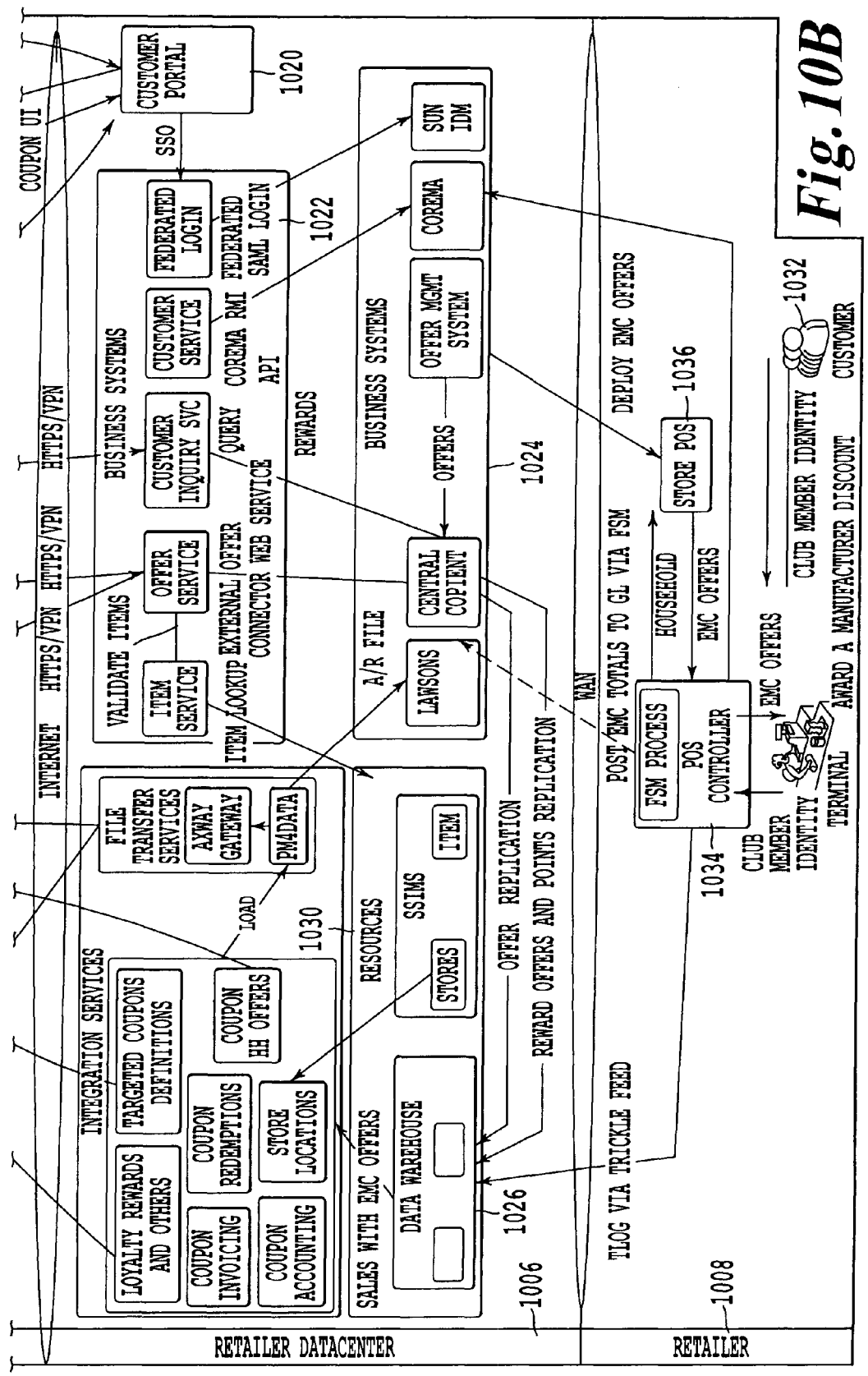

FIGS. 10A and 10B illustrate an example architecture 1000 for implementing the customized offers savings program. According to embodiments, the architecture 1000 may be composed of one or more layers including an end user's layer 1002, an external systems layer 1004, a retailer data center layer 1006, and a retailer layer 1008.

According to embodiments, an end user's layer 1002 may include one or more manufacturers 1010 and one or more customers 1012 that interface with systems in the external systems layer 1004. In embodiments, the external systems layers 1004 may include a third party application 1014, coupon manufacturers 1016a and coupon service providers 1016b, and a clearing house 1018. The coupon manufacturer 1016a may be a CPG manufacturer. The coupon service provider 1016b and clearing house 1018 may be any party that manages tracking and paying for coupon redemptions.

According to embodiments, the retailer data center layer 1006 may include the customer portal 1020 and a business services system 1022. The business services system 1022 may be configured to provide customer services such as providing login services and handling customer inquiries regarding the customized offers savings program. The retailer data center layer 1006 may further include business systems 1024, which may include any desired business service systems such as an identity management system, an offer management system, Corema, Central Copient, etc. The retailer data center layer 1006 may also include a resource system 1026 that may have a data warehouse and a safeguards and store single image solution (SSIMS) to provide information to one or more systems in the example architecture 1000. The retailer data center layer 1006 may further include an integration services system 1028 that may be configured to keep track of information associated with offers and handle file transfers to the third party application 1014 and the external systems layer 1004.

According to embodiments, the retailer layer 1008 may include a customer 1032 that presents a loyalty medium to a POS controller 1034. The POS controller 1034 may be configured to utilize the data warehouse in the resources system 1026 to retrieve customer information and identify the loyalty medium associated with a customer 1032. Additionally, the POS controller 1034 may utilize the offer management system in the business systems 1024 via a retailer POS system 1036 to identify offers associated with the loyalty medium of the customer 1032.

Figure 11A:
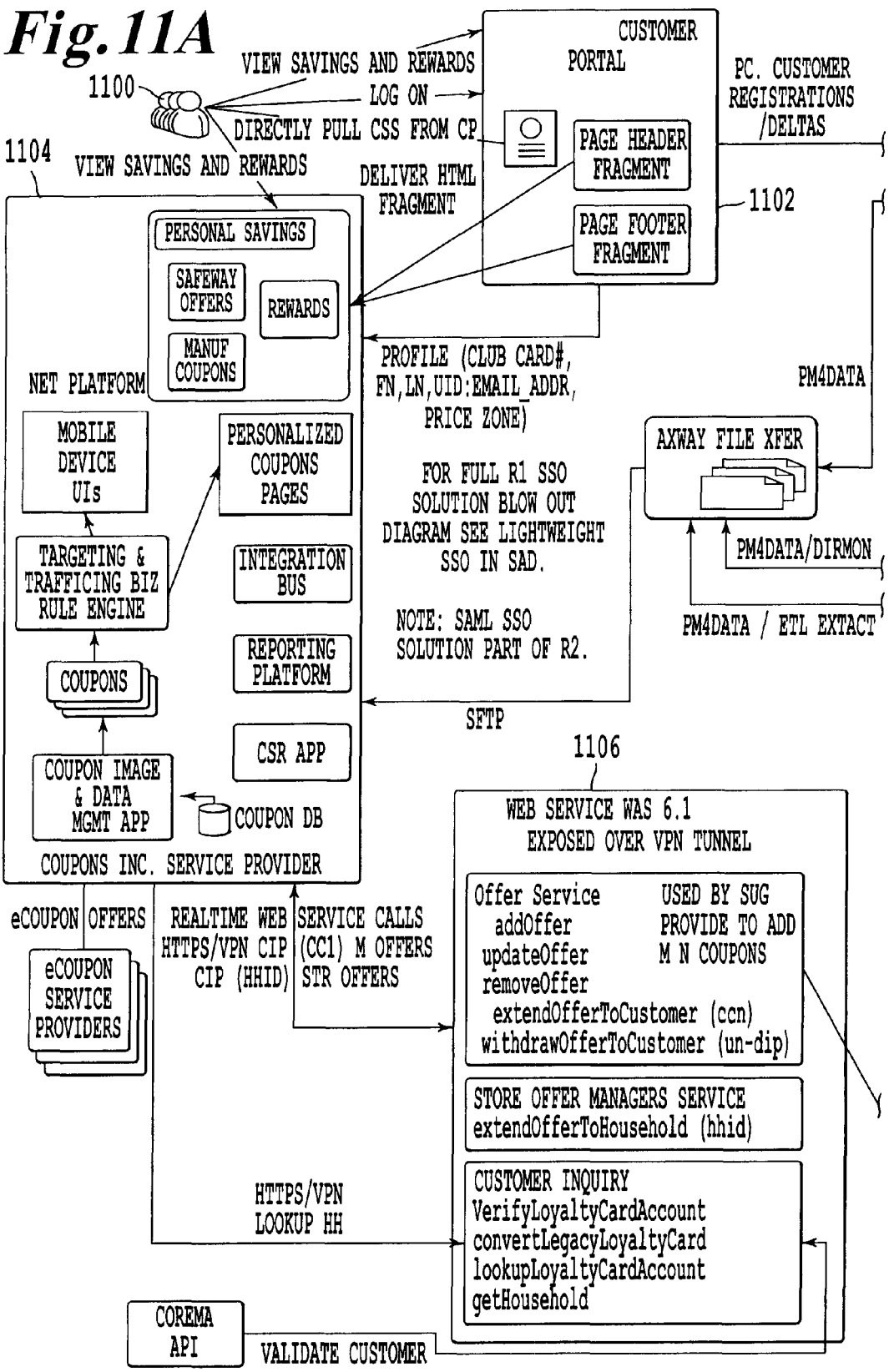
FIGS. 11A-11C illustrate an exemplary network architecture for implementing the customized offers savings program.
Figure 11B:
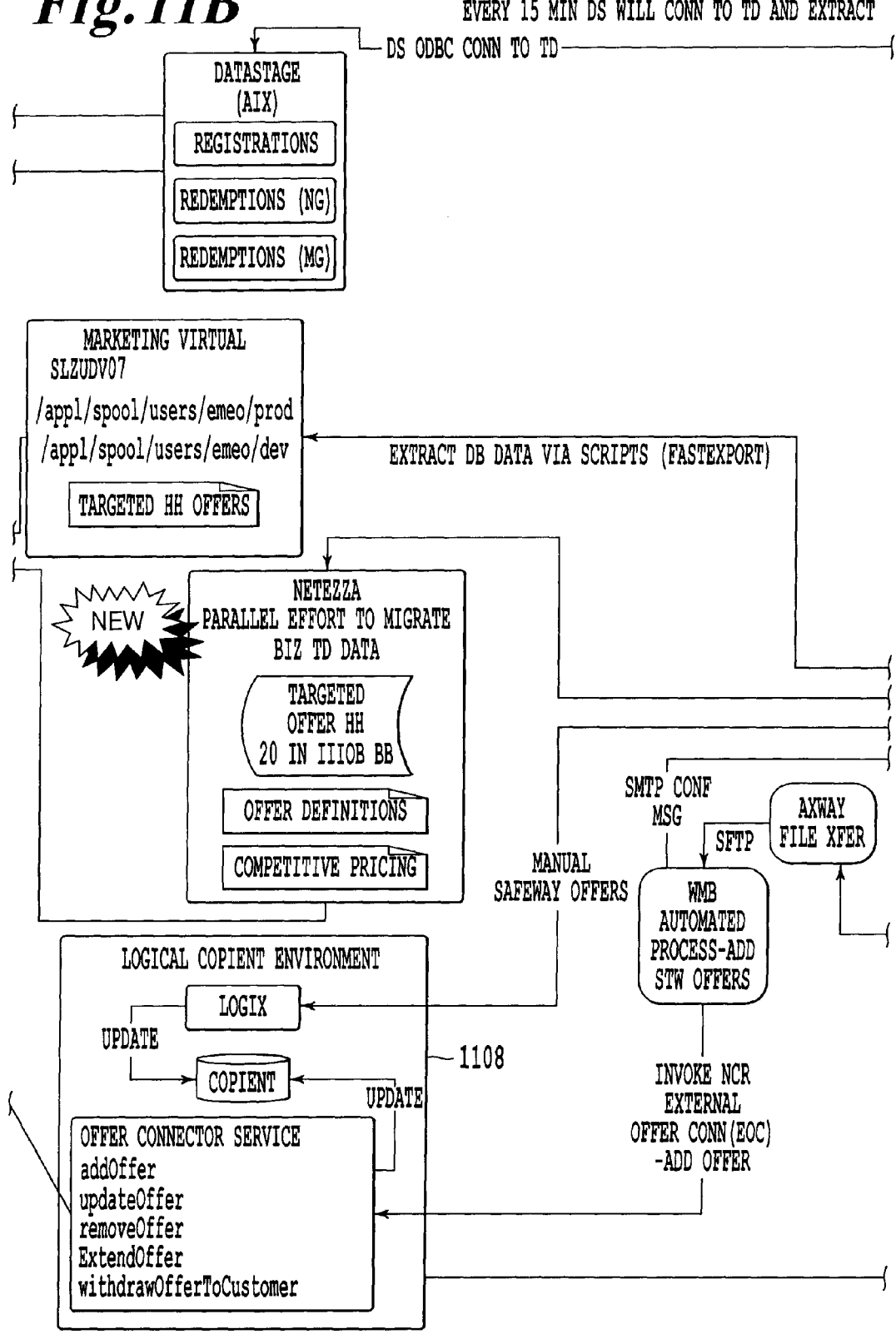
Figure 11C:
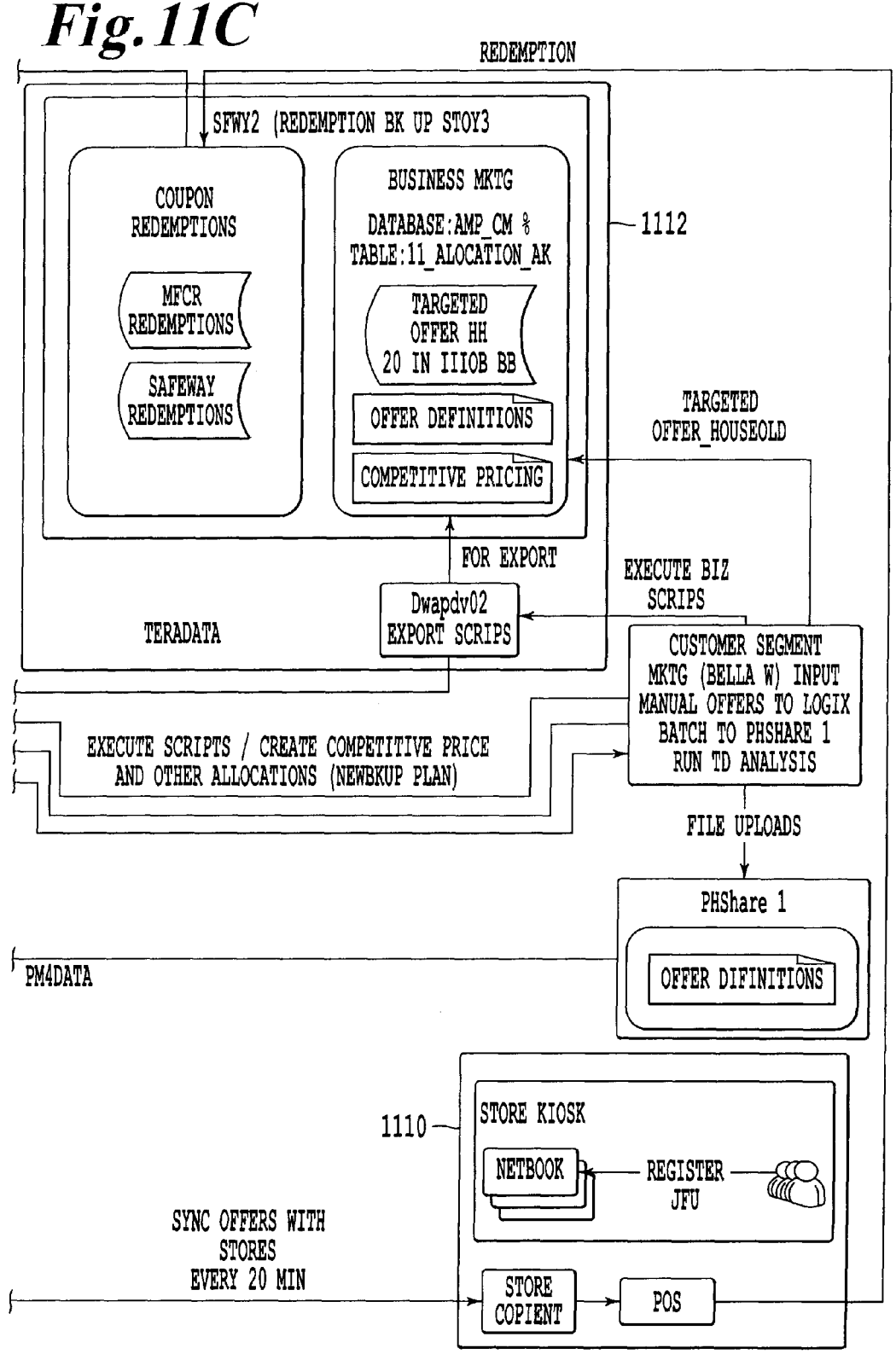

FIGS. 11A-11C illustrate an example network architecture for implementing a customized offer savings program using a third party application. In embodiments, the network configuration illustrated in FIGS. 11A-11C includes the customer portal 1102 and a third party application 1104. As illustrated in FIGS. 11A-11C, one or more customers may log onto the customer portal 1102. Once the one or more users 1100 are logged on, the customer portal 1102 may contact the third party application 1104 to retrieve the customized offers for the one or more customers 1100. The third party application 1104 may use a web services system 1106 to provide clipping and verification services. Further, the web service system 1106 may be in communication with a logical Copient environment 1108 for any desired accounting and clipping services. In embodiments, the network configuration illustrated in FIGS. 11A-11C may include a logical retailer environment 1110 which may include a retailer kiosk and a point of sale device. The logical retailer environment 1110 may be in communication with a redemption system 1112 that keeps track of offer redemptions. In embodiments, any desired allocation strategy implemented through the network configuration illustrated in FIGS. 11A-11C may be run using SQL code on Teradata and Netezza platforms.

Data Collection

According to embodiments, the enterprise system may keep track of information associated with customer purchases, products, and offers. In embodiments, one or more files may be created by the modules illustrated in system 400 and stored in any one of the libraries illustrated in the Database Library System 500.

According to embodiments, when a customer registers with the enterprise system via a customer portal, a customer profile may be created for that customer. Table 1 of FIG. 12 illustrates an example customer profile that may be created upon registration of a customer. In embodiments, the Profile Module 408 may create the profile illustrated in Table 1 of FIG. 12 and store and retrieve the profile in the Profiles Library 506 (FIG. 5). As illustrated in Table 1, the customer profile includes a customer name and a user ID and password used for login information. The customer profile may further include a field indicating whether the customer may be reminded at the retailer of any offers. As an example, if this field has a "yes" indicator, then the customer may be reminded of any offers the customer has not viewed or selected while purchasing items at the retailer. As an example, when a customer is purchasing an item, a POS device may prompt a POS clerk that the customer currently making a purchase has received an e-mail notifying the customer of new offers, but the customer has not logged into the enterprise system via the customer portal to view the new offers. Accordingly, upon receiving this prompt, the POS clerk may interact with the customer to remind the customer of the new offers.

The customer profile may further include a medium ID, where a unique medium ID (e.g., card ID) is associated with each loyalty medium for each customer. Additionally, the customer profile may indicate a customer price zone. In embodiments, the customer price zone may be associated with the geographic location of the customer. A customer price zone may be used for determining price points of offers that the customer receives. As an example, a customer in price zone 1 may receive an offer for eggs for $1.50. However, a customer in price zone 2 may receiver an offer for the same brand of eggs but at a price of $1.75. Furthermore, the customer profile may indicate a survey location and a purchase history location. As an example, the survey location may be a pointer to a file in the Profiles Library 506 (FIG. 5) that has a survey the customer filled out upon registration indicating the types of products for which the customer would prefer to receive offers. As another example, the purchase history location may be a pointer to a purchase history file located in the Purchase History Library 508 (FIG. 5).

Table 2 of FIG. 13 illustrates an example product profile. A product profile may be utilized to keep track of the products and brands associated with the products sold at the retailer. In embodiments, the product profile illustrated in Table 2 may be created and modified by the Product Manager Module 412 (FIG. 4). In embodiments, the product profile illustrated in Table 2 keeps track of all products sold at the retailer including each individual chain associated with the retailer. As an example, if the retailer has chains in Virginia and Washington D.C., the product profile illustrated in Table 2 keeps track of the products sold at each of the chains in Virginia and Washington D.C. In other embodiments, an individual product profile may be created for each chain associated with the retailer.

As illustrated in Table 2, the example product profile keeps track of each product and a brand associated with each product. As an example, product 1 may be associated with brands B1 and B2. Product 2 may be associated with brands B3, B4, and B5. Additionally, the example product profile keeps track of the date and price for which each brand of each product was available. As an example, the product profile in Table 2 illustrates that brand B1 of product 1 was sold at a price of $1.50 from Jan. 1, 2010 to Jan. 6, 2010. However, brand B2 of product 1 was sold during that same time period at a price of $1.40. Accordingly, the product profile illustrated in Table 2 may be used in conjunction with a customer history purchase profile to determine what brands and products were available when customers make purchases.

Table 3 of FIG. 14 illustrates an example customer purchase history profile. In embodiments, the customer purchase history profile illustrated in Table 3 is created by the Purchase History Module 410 (FIG. 4) and stored in the Purchase History Library 508 (FIG. 5). In embodiments, a customer purchase history profile is created for each customer having a loyalty medium. As illustrated at Table 3, a customer purchase history profile is associated with a customer based on the medium ID included in the customer purchase history profile. As an example, based on the medium ID included in the purchase history profile illustrated in Table 3, the medium ID is associated with the customer John Smith based on the customer profile illustrated in Table 1. As illustrated in Table 3, the customer purchase history profile may keep track of the date, price, quantity, and markdown amount (e.g., amount purchase price has been reduced by an offer) of each product and brand the customer purchases. As an example, Table 3 illustrates that the customer John Smith purchased brand 1 of product 1 three times between Jan. 1, 2010 and Jan. 22, 2010 at three different prices. Table 3 also illustrates that as the markdown amount decreased, causing the price to increase, the quantity of brand 1 of product 1 purchased decreased. Table 3 further illustrates that between Jan. 1, 2010 and Jan. 28, 2010 John Smith bought product 2 three different times at the same price but with a different brand for each purchase.

Accordingly, the customer purchase history profile in Table 3 and the product profile in Table 2 may both be used to determine a customer's preference for a particular brand product, a customer's preference for a product at a particular price, and the quantity purchased according to the purchase price. As an example, Table 3 illustrates that on January 1, John Smith bought brand 1 of product 1 at a price of $1.50 when brand 2 of product 1 was available for $1.40 as illustrated in Table 2. Additionally, Table 3 illustrates that on Jan. 7, 2010, John Smith bought brand 1 of product 1 at a price of $1.75 even though brand 2 of product 1 was available for $1.50 as illustrated in Table 2. Further, Table 3 illustrates that on Jan. 22, 2010, John Smith purchased brand 1 of product 1 again at a price of $2.00 when brand 2 of product 1 was available for $1.50. Thus, since Table 3 illustrates that John Smith consistently buys brand 1 of product 1 at a higher price than brand 2 of product 1, John Smith most likely has a preference for brand 1 of product 1 independent of the price of brand 1. Accordingly, if the CPG manufacturer of brand 1 is a partner (e.g., CPG partner) with the retailer, the CPG partner may be provided with an opportunity to provide a customized offer to John Smith to buy brand 1, if the retailer and CPG manufacturer believe there is an opportunity to sell more of brand 1 to John Smith by giving him a better price than will be available to other customers at the retailer. In further embodiments, a customized offer is not provided unless both the CPG partner and retailer believe there are incremental purchases available on brand 1. Further, Table 3 may be used to ascertain the price point that maximizes the profit for brand 1 of product 1. For example, when the purchase price is $1.50 or $1.75, John Smith shows a tendency to purchase the same amount. Therefore, if John Smith is provided an offer for brand 1 product 1, the price point of the offer may be $1.75.

As another example, Table 3 illustrates that on Jan. 1, 2010, John Smith bought brand 3 of product 2 at a price of $1.50 when brand 4 of product 2 was available for $1.75, and brand 5 of product 2 was available for $2.00 on the same date. Table 3 further illustrates that on Jan. 15, 2010, John Smith bought brand 4 of product 2 for a price of $1.65 when brand 3 of product 2 was available for $2.00, and brand 5 of product 2 was available for $1.75 on the same date. Table 3 also illustrates that on Jan. 28, 2010, John Smith bought brand 5 of product 2 at a price of $1.50 when brand 3 of product 2 was available for $2.00, and brand 4 of product 2 was available for $1.75 on the same date. Additionally, Table 3 illustrates that while John Smith did not purchase product 2 on Jan. 7, 2010, Table 2 illustrates that the minimum price of product 2 was $1.75.

Accordingly, since John Smith purchases different brands of product 2, John Smith most likely does not have a particular brand preference for product 2. Additionally, since Tables 2 and 3 illustrate that John Smith did not purchase product 2 when the minimum price for product 2 was $1.75, and the highest price that John Smith paid for product 2 was $1.65, John Smith is most likely not willing to pay a price for product 2 above $1.65. Accordingly, if the CPG manufacturer of brand 3 is a partner with the retailer, whereas the CPG manufacturers of brand 4 and brand 5 may not be partners with the retailer, the CPG manufacturer for brand 3 may be provided the opportunity to provide a customized offer for brand 3 of product 2 to John Smith at a price of $1.65.

If John Smith redeems this customized offer, the retailer has an opportunity to increase revenue because the retailer has the ability to ensure that at least one brand of product 1 is priced at the level that John Smith prefers. Thus, the retailer has a higher probability of capturing an additional sale in product 1. The retailer also has an opportunity to minimize the loss of profit through this transaction because the CPG partner for brand 3 may be willing to cover all or a portion of the incremental costs. The CPG manufacturer of brand 3 has the opportunity to increase profits because the CPG manufacturer has information of the highest price a customer is willing to buy the product the CPG manufacturer produces. Additionally, if John Smith accepts the customized offer, John Smith has the opportunity to increase his savings because if the minimum price of product 2 is above $1.65, John Smith is guaranteed that product 2 will be available to him at $1.65 as long as his customized offer has not expired.

According to some embodiments, the Brand Loyalty/Switcher Module 414 performs the analysis described above for with respect to Tables 2 and 3. In further embodiments, the Price Point Generator Module 420 determines the price points for the customized offers discussed above with respect to Tables 2 and 3.

Table 4 of FIG. 15 illustrates an example offer definition file. In embodiments, the offer definition file is prepared by the Offer Bank Module 416 and stored in the Offers Library 512. The offer definition file may include a unique offer ID for each offer stored in the Offers Library 512. Additionally, an offer may be associated with a group of offers where the group is identified by a group offer ID. As an example, two or more offers may be categorized in a particular group.

As illustrated in Table 4, the offer definition file may indicate an offer type. For example, the offer type illustrated in Table 4 is price point. In other embodiments, one or more other offer types discussed above may be specified in this field. The offer definition file may include a CPG and brand. As an example, the CPG illustrated in Table 4 is ConFoods with brand 2. Additionally, the offer definition file may specify a category type for the offer, where offers for similar products may be grouped under the same category type. As an example, offers for butter and milk may be grouped in a dairy category. The offer illustrated in Table 4 is for a product in the condiments and sauces category.

An offer definition file may also be associated with an image number. As an example, an image number may point to an image associated with the product being offered. The offer definition file may further include a price point, which may represent the price for the offer. In other embodiments, the offer may specify a dollar value off a retailer price for an item. Further, the offer definition file may specify offer verbiage. Offer verbiage may be text and/or descriptions describing the offer. As illustrated in Table 4, the offer verbiage in the offer definition file indicates that the offer is a customized price for a 24-pack 10 oz. steak sauce barbeque style. The offer definition file may further specify the limits of an offer. As an example, the offer illustrated in Table 4 is for unlimited quantity through a particular date. The offer definition file may also specify any other desired information associated with the file such as promo start and end dates, a regular price for the offer, a specific list of items or UPC IDs that are included as part of the offer, a specific list of items or UPC IDs that are not included as part of the offer, a disclaimer associated with the offer, etc.

Table 5 of FIG. 16 illustrates an example household allocation file. In embodiments, the household allocation file is generated by the Offer Bank Module 416 and stored in the Offers Library 512. The household allocation file may associate a unique household ID for each household that is registered with the customized offers savings program. Additionally, as illustrated in Table 5, more than one loyalty medium (e.g., household medium number) may be associated with a household. As an example, a household may have a loyalty medium for each family member in the household. The household allocation file may further specify the offers associated with that household by including the unique group and rank offer IDs.

Table 6 of FIG. 17 illustrates an example redemption file. In embodiments, the redemption file is created by the Retailer Medium Manager Module 422 and stored in the Offers Library 512. A redemption file may be used to identify the customers, via a unique loyalty medium number, redeeming offers that are associated with a unique offer ID. As illustrated in Table 6, the redemption file may specify a loyalty medium number and household medium number redeeming an offer. The redemption file may further specify the offer ID of the offer being redeemed. The redemption file may also include information associated with redeeming an offer including at least the date the offer was redeemed, the time the offer was redeemed, the particular retailer where the offer was redeemed via a store ID, a transaction ID, the POS device that was used to redeem the offer via a register number, and the particular product that was purchased via a UPC ID.

Table 7 of FIG. 18 illustrates an example reporting file. In embodiments, the reporting file is created by the Report Generator Module 428 and stored in the Reports Library 514. A reporting file may be created for each loyalty medium number. The reporting file may keep track of a customer's activities including at least the first time the customer logs onto the customer portal, the number of times the customer has visited the customer portal, the number of offers the customer has clipped (e.g., selected), etc.

Table 8 of FIG. 19 illustrates an example competitor price file. In embodiments, the competitor price file is generated by the Offer Bank Module 416 and stored in the Offers Library 512. A competitor price file may be associated with each offer stored in the offer bank (e.g., Offers Library 512) by specifying an offer ID. The competitor price file may specify a price zone. As an example, a price zone may be associated with a geographic area. The competitor price file may further specify a competitor name and a competitor price in the specified price zone. Additionally the competitor price file may specify a capture date. As an example, as illustrated in Table 8, the offer ID specified in the competitor price file is for the offer specified in the offer definition file of Table 4. As discussed above, Table 4 specifies an offer for ConFoods Steak Sauce Barbeque Style. Accordingly, the competitor price file illustrated in Table 8 indicates that the XYZ retailer on Feb. 10, 2010 is selling the same item in price zone 1 for $3.49. Accordingly, the information in the competitor price file may be provided to customers to compare customized offers with competitor prices.

Table 9 of FIG. 20 illustrates an example price zone association file. In embodiments, the price zone association file is generated by the Offer Bank Module 416 and stored in the Offers Library 512. The price zone association file may associate one or more loyalty medium numbers with a price zone. Accordingly, the price zone association file may be used when determining a price point for an allocated offer to a particular loyalty medium number, the price zone associated with that loyalty medium number.

Table 10 of FIG. 21 illustrates an example transfer image file. In embodiments, the transfer image file is generated by the System Interface Manager Module 404 and stored in the System Interface Library 504. The transfer image file may be used to associate images used in offers with a unique image number. As an example, an offer for milk may use an image of a milk carton, which is the dairy_milk.jpg image and associated with image 707009. In additional embodiments, the transfer image file may be used for images sent by e-mail.

Table 11 of FIG. 22 illustrates an example data elements file. In embodiments, the data elements file is generated by the Offer Bank Module 416 and stored in the Offers Library 512. The data elements file may indicate the number of offers a customer (e.g., John Smith) has received and activated the dollar value of the activated offers, and the dollar value of all the received offers. The data elements file may provide similar information for digital coupon offers and a personalized price. In embodiments, a digital coupon offer is for one time use and a personalized price offer is a price point that can be redeemed multiple times until an expiration date. The data elements file may also specify a year to date savings for the customized offers, digital coupons, and personalized price offers. The data elements file may be used to determine the percentage of received offers that a customer activates, and the customer's year to date savings on those offers that were activated.

User Interfaces

FIGS. 23-41 illustrate example interfaces for a customer portal. In embodiments, when a customer accesses the customer portal, the System Interface Manager Module 404 retrieves an interface from the System Interface Library 504 corresponding to a particular view requested by the customer. In embodiments, an interface is a page including browser executable code that may be displayed in any desired browser, including a mobile application available on a smart phone, tablet or equivalent device. In embodiments, an interface may include one or more input areas, which may be any desired mechanism, such as a text box, for receiving customer data and/or selection(s).

Figure 23:
FIG. 23 illustrates an exemplary customer portal interface.

FIG. 23 illustrates an example customer portal interface 2300. As illustrated in the user interface 2300, the user may click a register button 2302. The user may further access a coupon center 2302 to view coupons, personalized deals 2304, club specials 2306, deal match 2308 or loyalty rewards 2310.

Figure 24A:
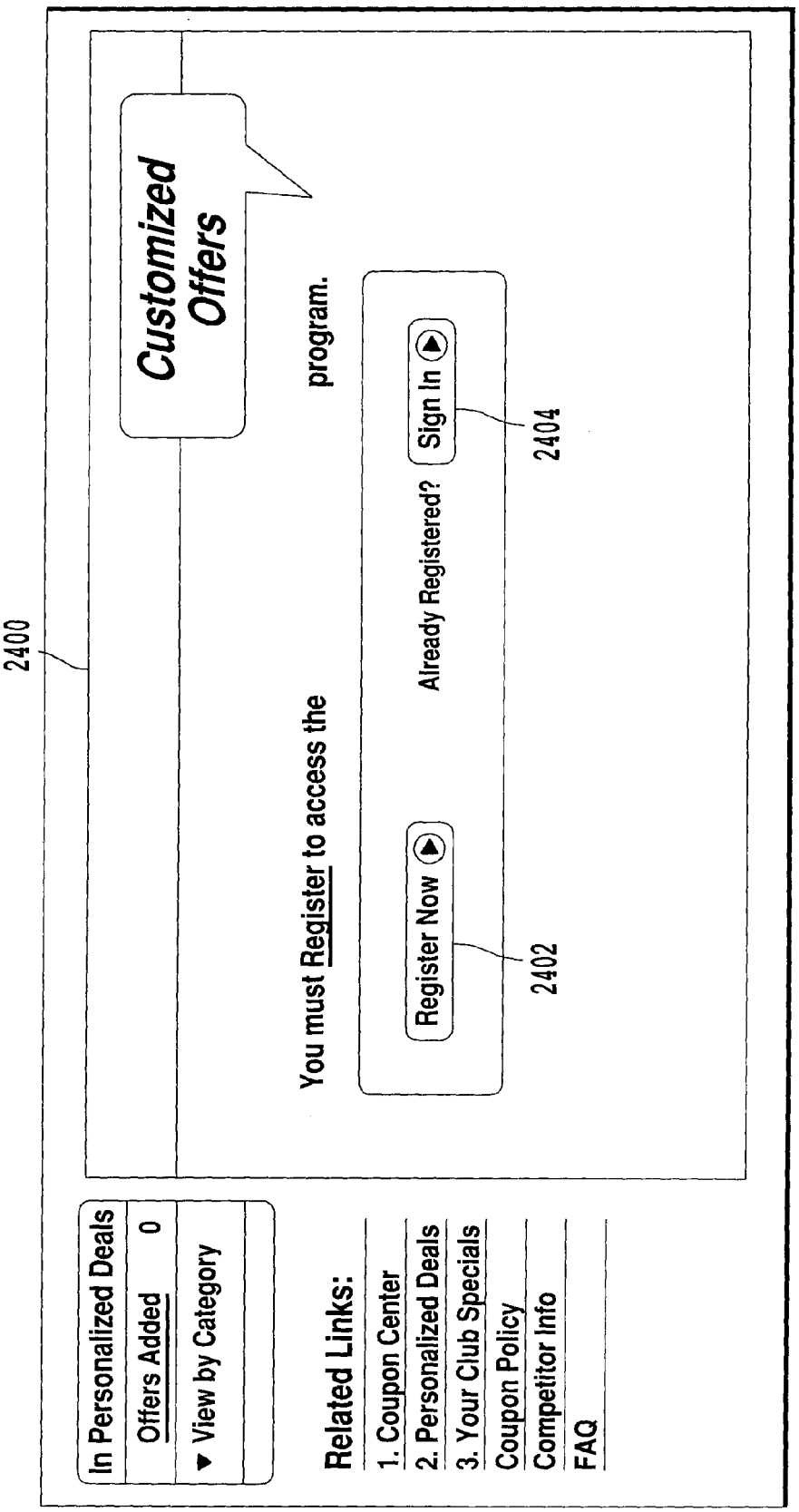
FIGS. 24A and 24B illustrate exemplary sign-in/registration interfaces.
Figure 24B:
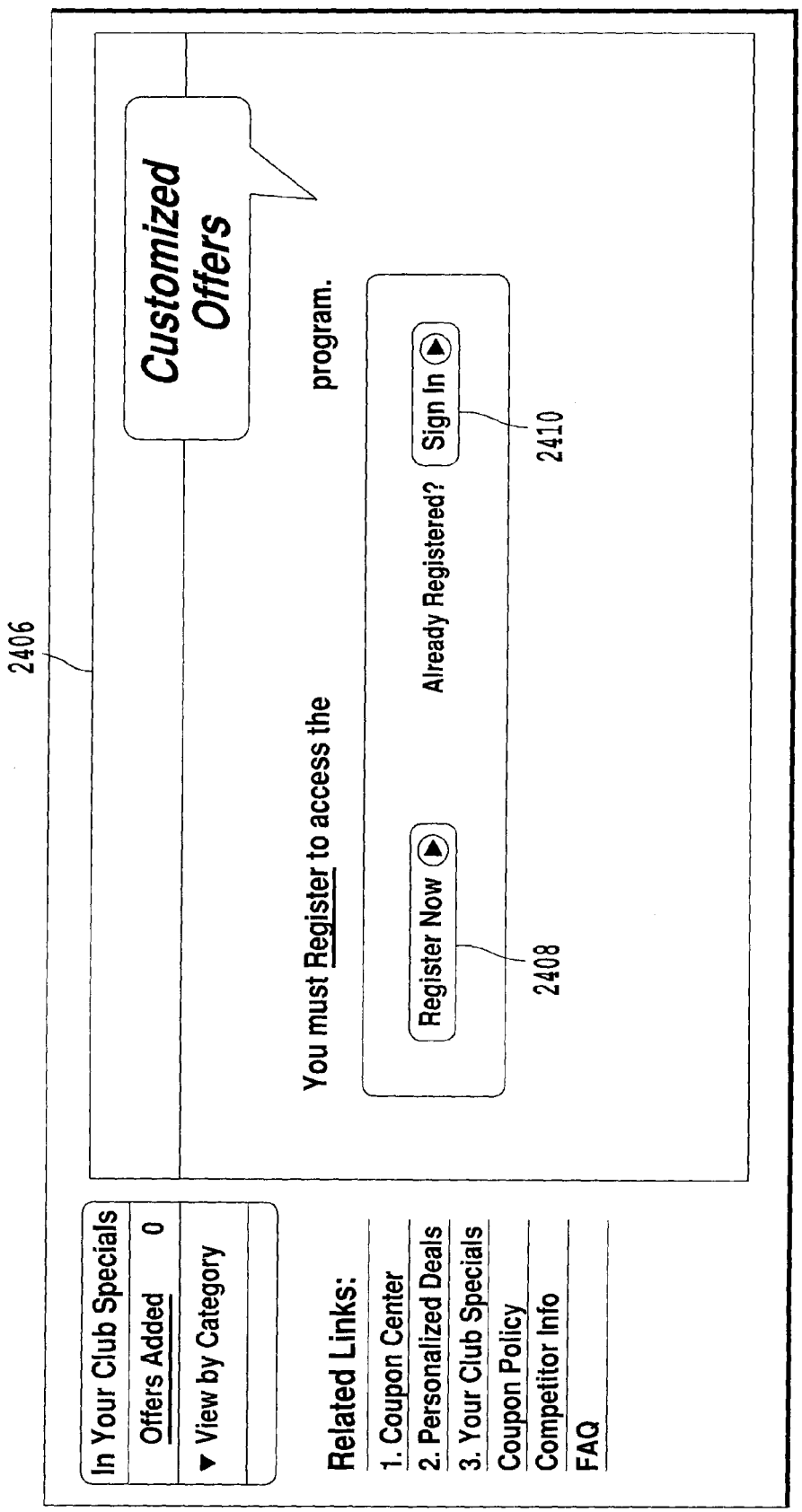

FIG. 24A illustrates an example sign-in/registration interface 2400 including registration 2402 and sign in buttons 2404. As an example, the sign-in/registration interface 2400 is accessed by selecting the personalized deals 2304 from the customer portal interface 2300. FIG. 24B illustrates an example sign-in/registration interface 2406 including registration 2408 and sign in 2410 buttons. As an example, the sign-in/registration interface 2406 is accessed by selecting the your club specials 2306 from the customer portal interface 2300.

FIG. 24C illustrates an example login interface 2412. The login interface 2412 may be accessed by selecting any one of sign in buttons 2404 and 2410 from sign-in/registration interfaces 2400 and 2406 respectively. A user may log into the enterprise system via the customer portal by entering login information in a login area 2414. If a user does not desire to log into the enterprise system but wants to see a sampling of offers that are available to users, the user may select a view offers button 2416. If the user is not a member and desires to register with the enterprise system, the user may select a register button 2418.

Figure 25:
FIG. 25 illustrates an exemplary registration user interface.

FIG. 25 illustrates an example registration user interface 2500 for registering with the enterprise system. The registration user interface 2500 may include one or more input areas to enter identification information such as an e-mail address 2502, password information 2504, a security question 2506, and location information such as a zip code 2508. Upon entering the desired information for registration, a user may click the register button 2510 to submit the registration information.

Figure 26B:

FIG. 26A illustrates an example contact information user interface 2600. The contact information user interface may include one or more input areas for entering a phone number 2602 or a loyalty medium number 2604, which may be linked to a user's account. The contact information user interface 2600 may further include one or more input areas 2606 to enter contact information such as a name and address. Additionally, the contact information user interface 2600 may include one or more input areas 2608 for entering household information for additional savings for the household. Upon entering the desired information in the contact user information interface 2600, the user may select a save changes button 2610 to save the changes to the user's account. FIG. 26B illustrates another example contact information user interface 2612 that is substantially similar to user interface 2600 except for an area to enter a referral code 2614. A referral code may be used to identify any other loyalty customer that referred the customer registering with the savings program. For example, upon entering the referral code, the loyalty customer associated with the referral code may receive additional offers or extra discounts.

FIG. 27 illustrates an example registration user interface 2700 for registering for the user with the customized offers savings program. The registration user interface 2700 may include one or more input areas 2702 for entering identification information and loyalty medium information to be linked to the user's account. If the user does not have a loyalty medium, the user may select an "apply" button 2704 to apply for a loyalty medium. Upon entering the desired information in the register user interface 2700, the user may click the select button 2706 to link the entered information to their account.

According to embodiments, one or more surveys may be provided to users who desire to enter information regarding products for which the user would like to receive offers. FIG. 28 illustrates an example survey user interface 2800. A survey user interface 2800 may include one or more input areas 2802 for selecting products for which the user would like to receive offers. The survey user interface 2800 may further include one or more input areas 2804 for entering information for which the user would like to receive offers. Upon entering the desired information in the survey user interface 2800, the user may select the submit button 2806 to link the entered survey information to their account.

According to some embodiments, customer survey information is used for segment marketing, where customers get specialized targeted offers based on need or preference such as baby offers, pet (dog, cat, both, etc.) offers, wine offers, and offers related to dietary restrictions or health oriented preferences (gluten free, sugar free, etc.) For example, the customer can specify in a survey that the customer desires to obtain offers for particular items. Additionally, segment marketing may be based on a customer's previous purchase history for an item or category.

According to some embodiments, offers are provided around lifestyles or life stages such as healthy lifestyle (fresh produce), an athletic lifestyle (health drinks, vitamins, power bar), new family life stage (baby products) etc. As an example, the survey user interface 2800 can include a category such as "Healthy Lifestyle" where the customer selects from a variety of health related products (e.g., multivitamins) for which the customer desires to receive a personalized offer. In another example, the customer information may be used for nutrition based targeting where gluten free offers are provided to customers who have indicated a preference for gluten free items. In other examples, the nutrition based targeting provides offers that are tailored to meet any desired diet (e.g., Atkins diet, South Beach diet, etc.), dietary restriction (e.g., low sodium, fat free, etc.), or health condition/disease state (e.g., heart healthy items).

Further embodiments include "U Pick offers," where the customer informs the retailer what offers they want from a pre-populated drop down list prepared by the retailer and presented to the customer. In some embodiments the U Pick list will include the price that the retailer is willing to provide to the customer as part of the offer. In other embodiments the U Pick list will allow the customer to specify the price they are willing to pay for the item, and the retailer will then decide based on cost and other factors whether they want to offer the item to the customer at the desired price.

The U Pick list is pre-populated with items of particular relevance to the customer. Each selected item from the drop down list will be added to the customer's loyalty medium. In an alternative embodiment, the "U Pick Offers" will only present offers to the customer that will lead to an incremental sale at the retailer (i.e., a sale above and beyond a normal purchase habit). In some embodiments, the U Pick list permits the customer to select the price associated with an offer. In other embodiments, the customer is not provided the ability to select the price associated with an offer.

Figure 29:
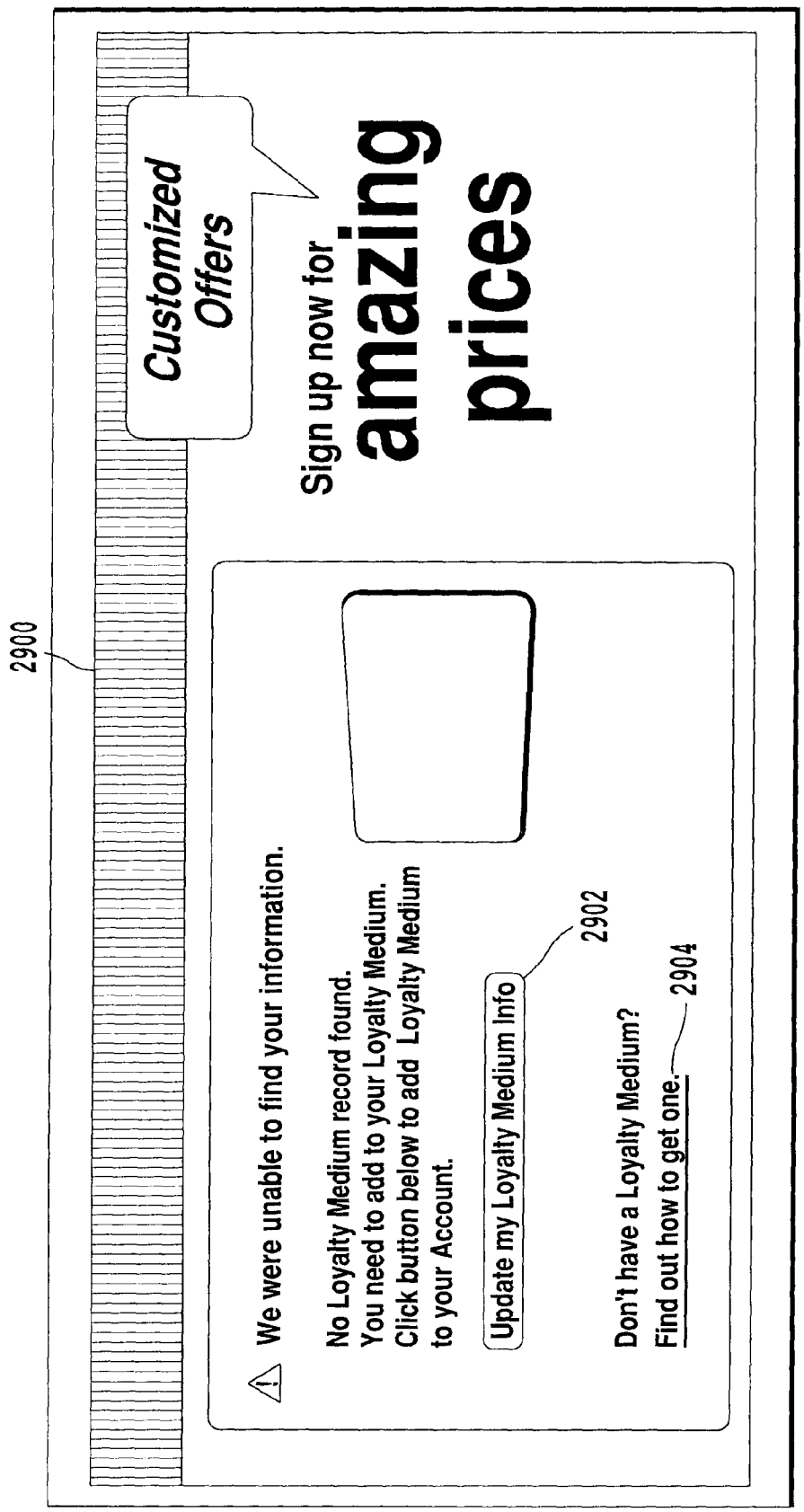
FIG. 29 illustrates an exemplary notification user interface.

In embodiments, a user cannot register for a customized offers savings program without applying for a loyalty account. If a user does not have a loyalty medium linked to the user's account, the user portal may display a page to indicate that the enterprise system does not have any information regarding the user's loyalty medium. FIG. 29 illustrates an example notification user interface 2900 that indicates that there is no loyalty medium information on record for the user. If the user has a loyalty medium and only needs to update their account information, the user may select the update my loyalty medium info button 2902. If the user does not have a loyalty medium, the user may select the link 2904 to apply for a loyalty medium.

FIG. 30A illustrates an example introduction user interface. As illustrated in FIG. 30, upon registering for the customized offers savings program, the introduction user interface 3000 may be displayed to the user. FIG. 30B illustrates another introduction user interface 3002 for the coupon center showing a sampling of coupons (3004, 3006) available to the user. The user may select the save now button 3008 to view and select coupons. According to embodiments, the coupon center presents coupons sorted for relevance according to a customer's purchase history. For example, if the customer purchase history indicates a preference for a particular product or brand, then any coupons for that particular product or brand will be presented first in the interface 3002. FIG. 30C illustrates another introduction user interface 3010 for personalized deals showing a sampling of personalized deals (3012, 3014) available to the user. The user may select the save now button 3016 to view and select personalized deals.

Figure 31:
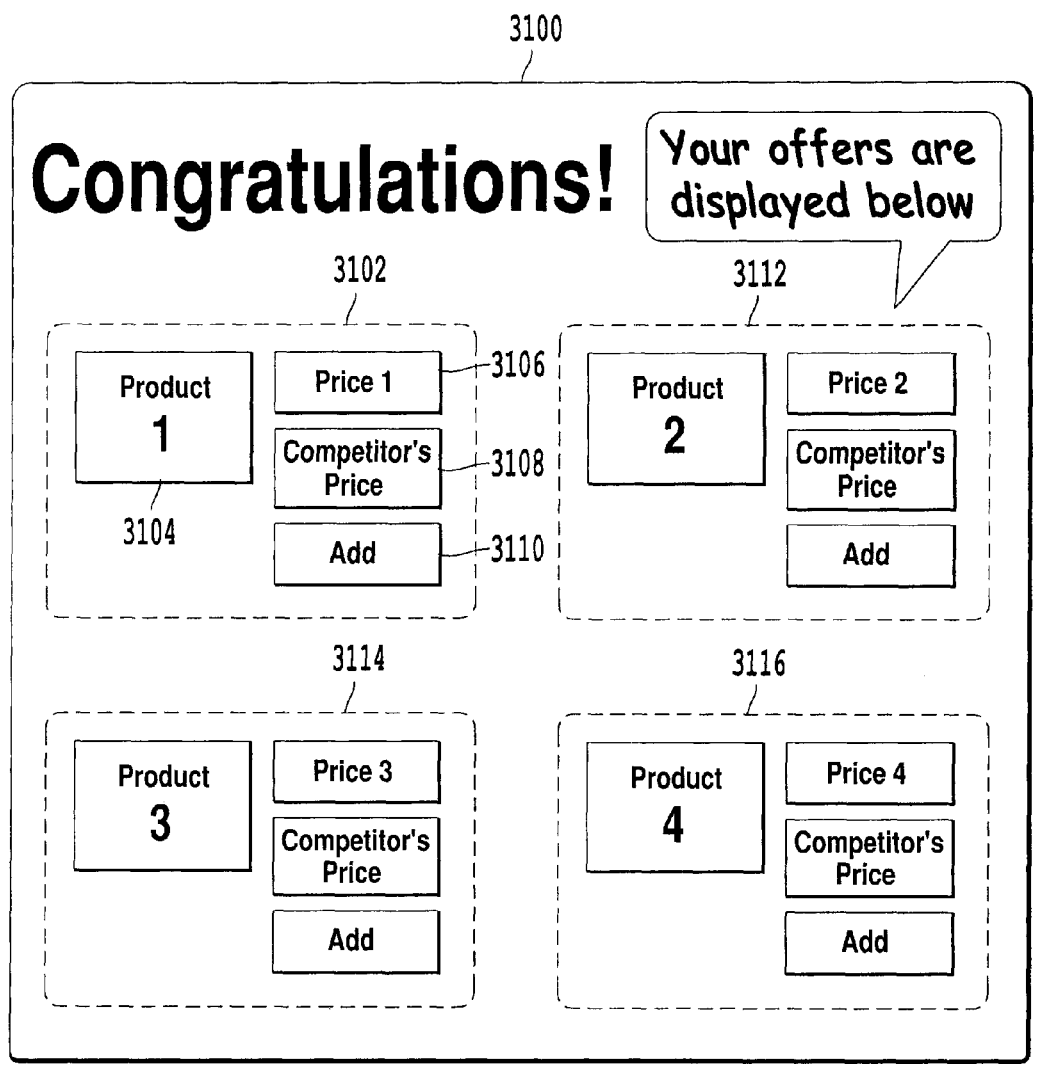
FIG. 31 illustrates an exemplary offer selection user interface.

FIG. 31 illustrates an example offer selection user interface 3100. The offer selection user interface may display one or more offers 3102, 3112, 3114, and 3116. As illustrated in the offer selection user interface 3100, each offer may include a product, an offer price for that product, a competitor's price for that product, and an option to add that offer to the user's account. For example, the offer selection user interface 3100 shows that for offer 3102, the user has received an offer for Product 1 3102 at an offer price of Price 1 (3106). Additionally, the offer selection user interface 3100 shows that a competitor's price 3108 for Product 1 (3104). If a user desires to add offer 3102 for Product 1 (3104) to the user's account, the user may select the add button 3110.

Figure 32B:

FIGS. 32A and 32B illustrate another example offer selection user interface 3200. The offer selection user interface 3200 may be associated with a navigation pane 3202 permitting a user to select links to one or more other user interfaces such as a savings list, an offer view by category, or an offer view by brand. The offer user selection interface 3200 may include a related links area 3204 to guide the user to other offers allocated to the user. The user may select a print/e-mail shopping list button 3206 to print or email any of the user's shopping lists. The offer selection user interface 3200 may further include a scroll feature 3208 to view more offers on another page.

According to some embodiments, the offer selection user interface 3200 illustrates one or more offers such as offer 3210. As an example, the offer 3210 may include a product image 3212, an offer price 3214A, a regular price 3214B, and offer verbiage 3216. The offer 3210 may further include an offer limit 3218. As an example, the offer limit may specify a purchase quantity limit and/or an expiration date. As an example, the offer limit 3218 included in the offer 3210 specifies that for the product displayed in 3212, the user may purchase an unlimited amount of the product until Apr. 19, 2011. If the user desires to add offer 3210 to the user's loyalty medium, the user may select the add button 3220.

Figure 33A:
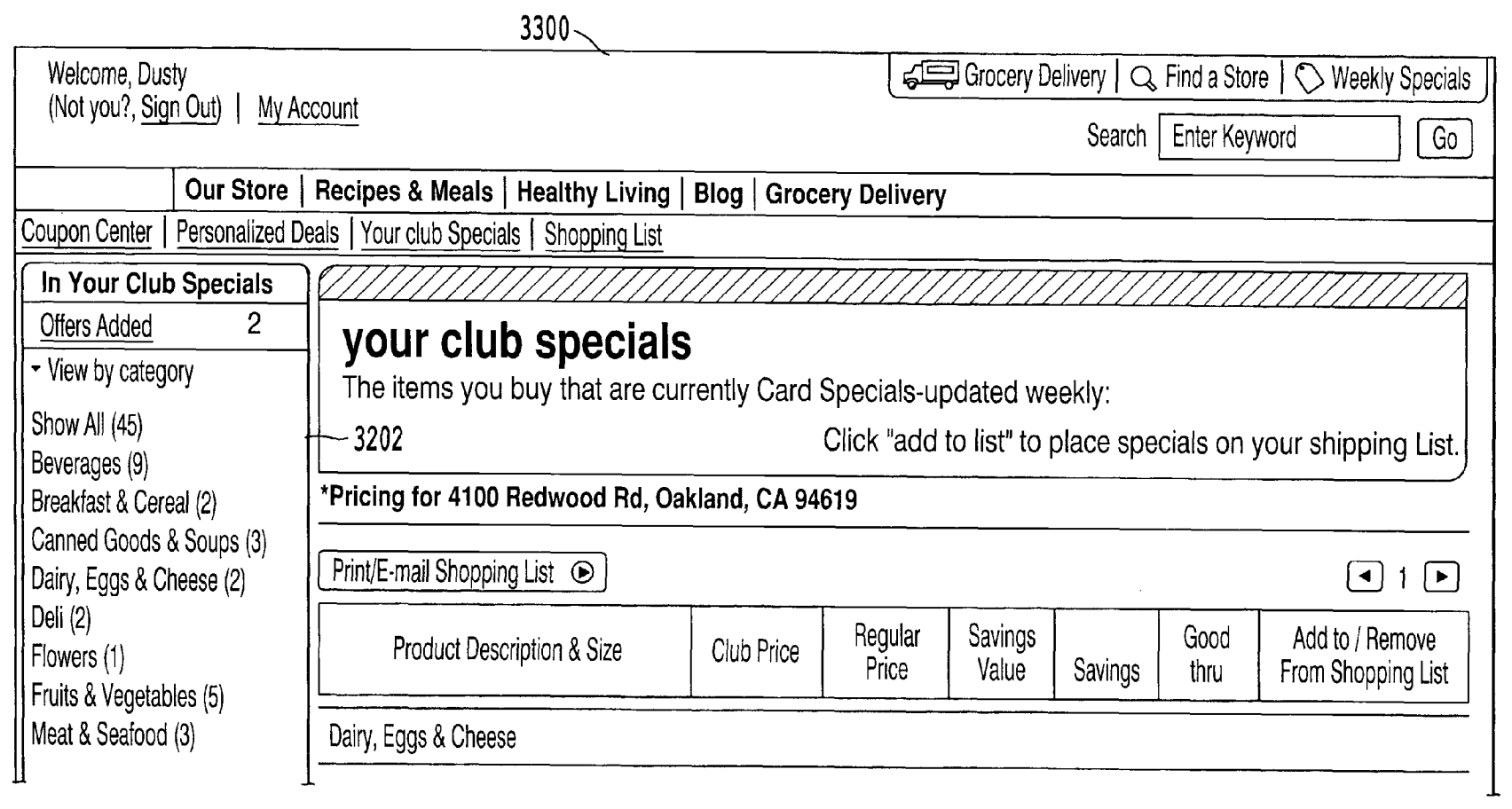
Figure 34A:
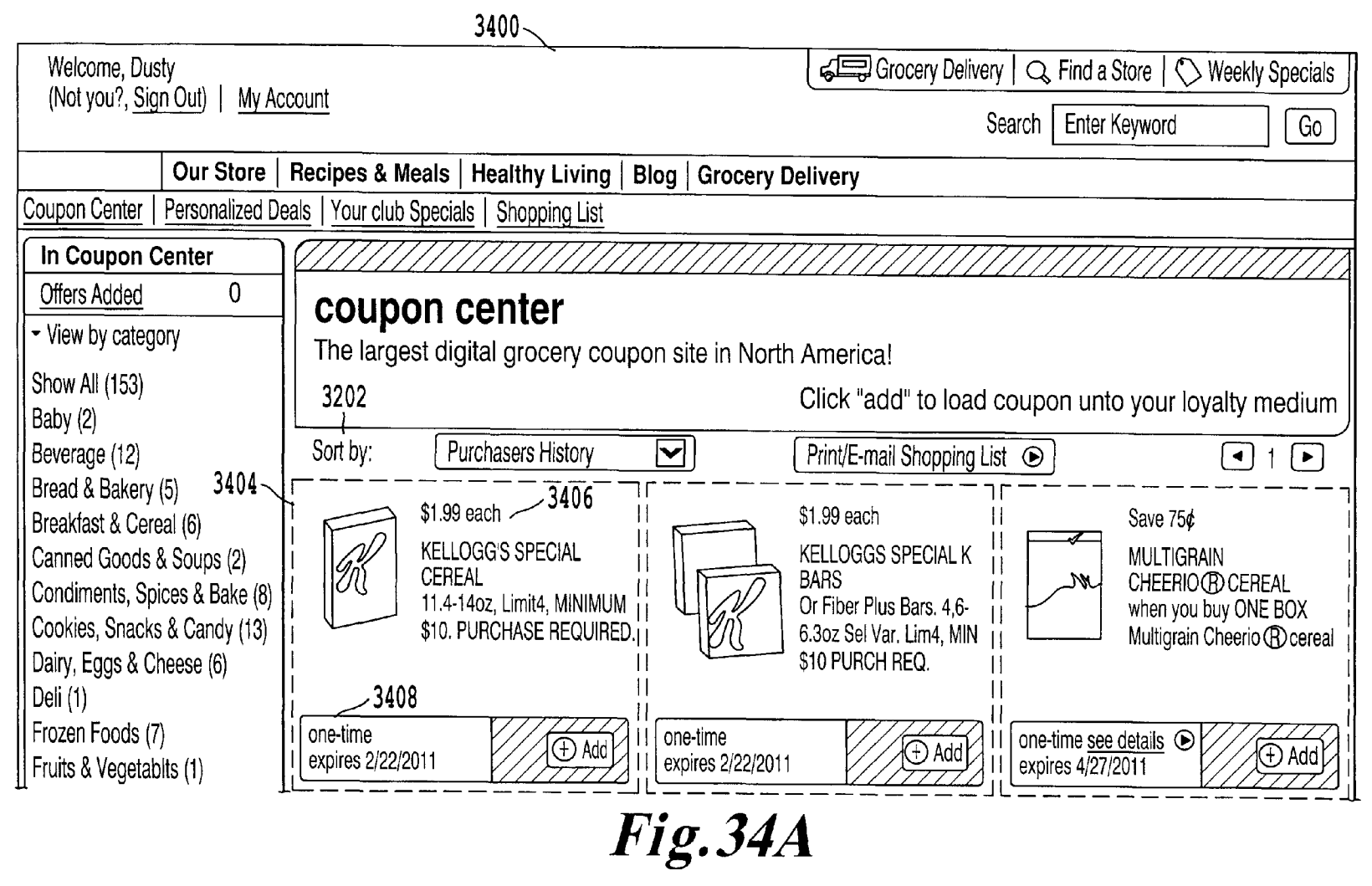

FIGS. 33A and 33B illustrate an example club selection user interface 3300 that displays club specials available to the user such as club special 3302. FIGS. 34A and 34B illustrate an example coupon selection user interface 3400 including a sorting pane 3402 permitting the user to sort the user's coupons by any desired category. For example, as illustrated in FIGS. 34A and 34B, the user can sort coupons according to the user's purchase history where coupons for the user's most frequently purchased items are displayed first.

Figure 35A:
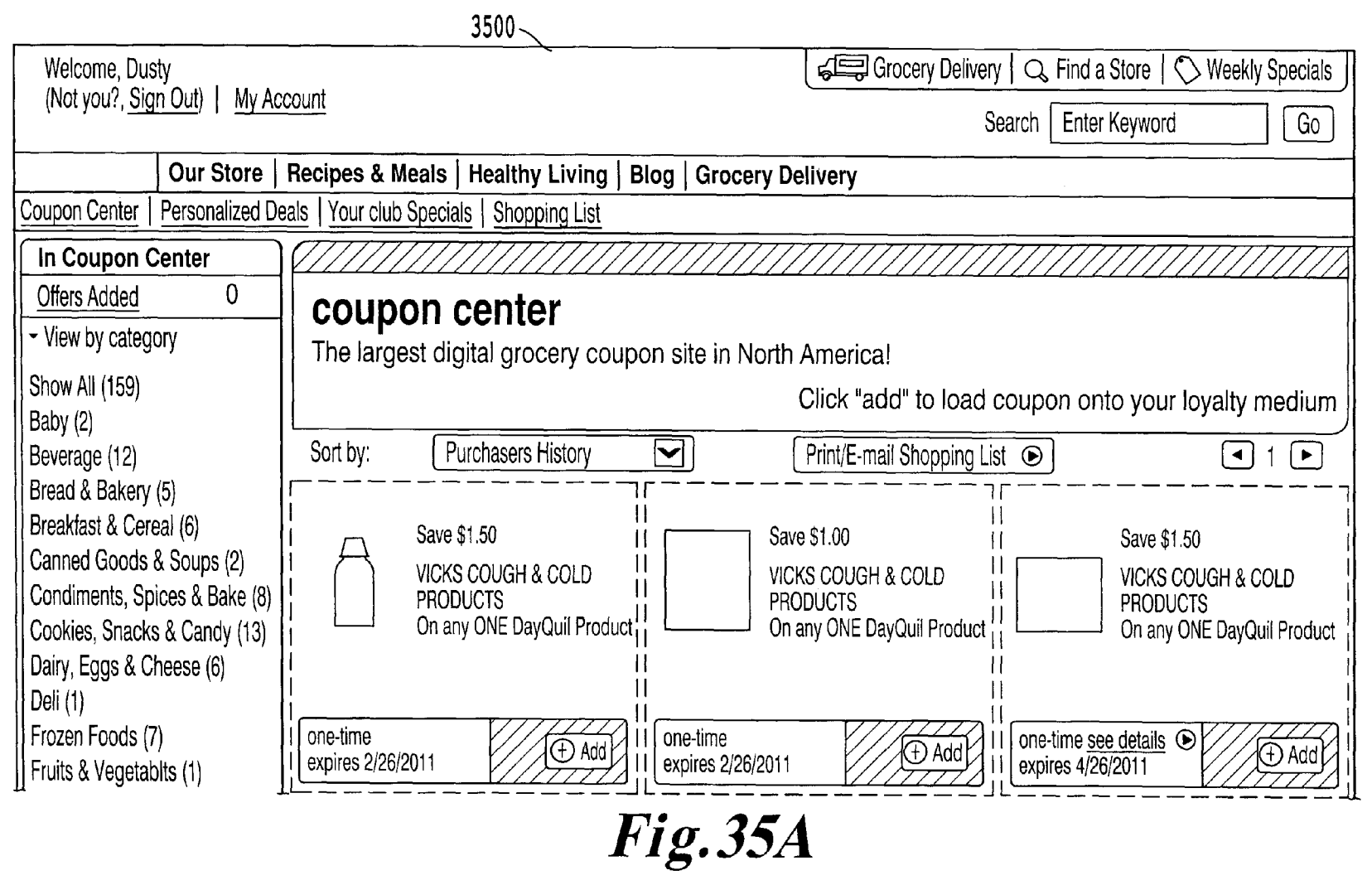

The coupon interface includes one or more coupon offers such as coupon offer 3404, which may include a coupon price 3406 and a coupon limit 3408. In embodiments, the coupon price 3406 may be a general price that is provided to one or more users independent of the price of the product at the retailer. The coupon limit 3408 may specify that the coupon is available one time and expires on a particular date. FIGS. 35A and 35B illustrate another example coupon interface 3500.

FIG. 36 illustrates an example savings list user interface 3600. A savings list may display the offers the user has selected and loaded onto the user's loyalty medium. As an example, the savings list user interface 3600 includes a savings chart 3602 that shows that the user has selected Product 1 at Price 1 for an unlimited quantity that expires on Jan. 31, 2010.

Figure 37A:
FIGS. 37A and 37B illustrate exemplary additional savings list user interfaces.
Figure 37B:
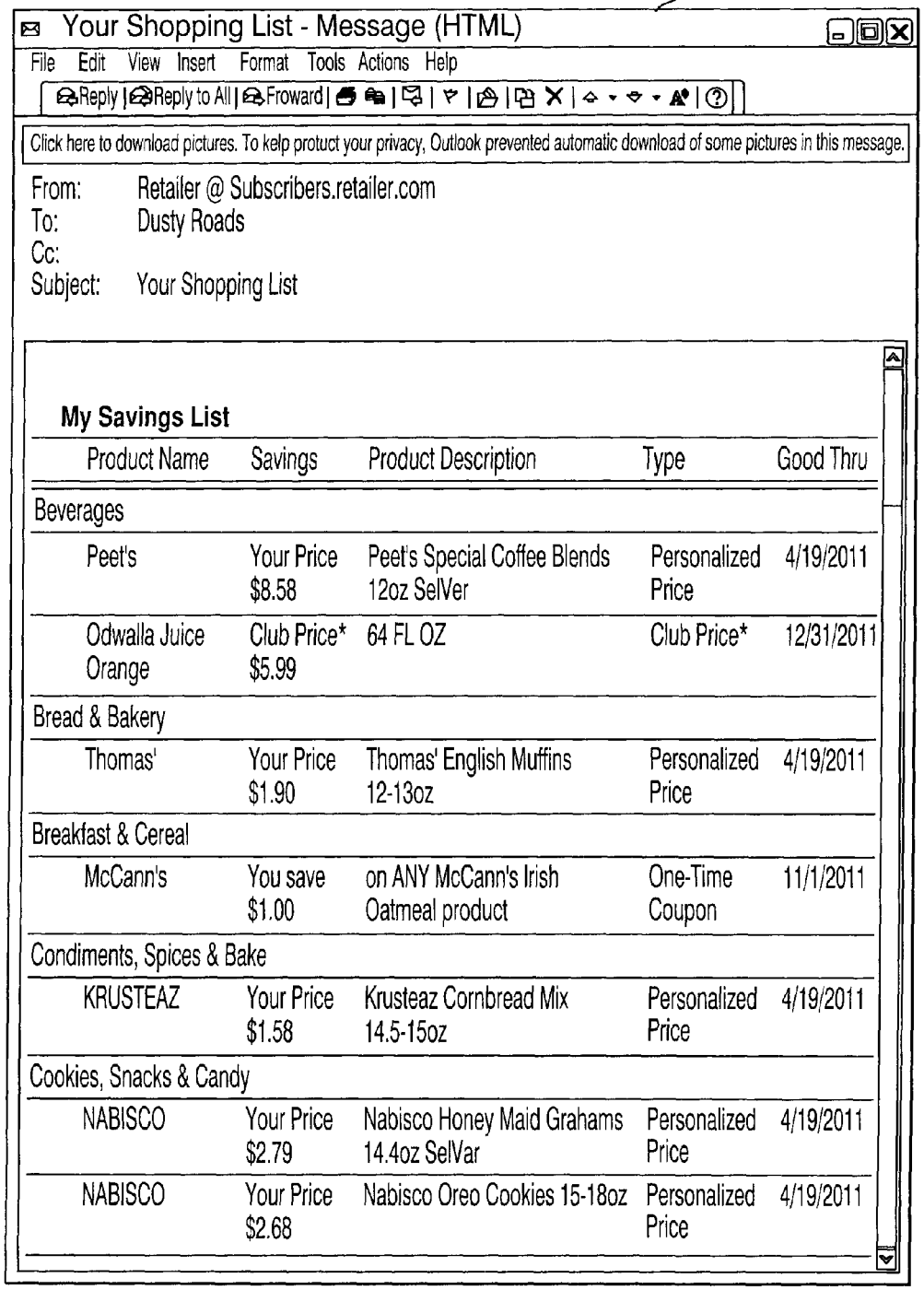

FIG. 37A illustrates another example savings list user interface 3700 displaying a savings list 3702. Each product listed in the savings list 3702 may specify a product name, savings price, a product description, a purchase quantity limit, and an expiration date. The user may have the option of e-mailing 3704, transmitting to a mobile device 3706, or printing 3708 the user's savings list. FIG. 38 illustrates an example print savings list user interface 3800, which shows a printable form of the user's savings list 3702 (FIG. 37). FIG. 37 illustrates an example savings list user interface 3710 that is provided to the user's email registered with the user's account.

Figure 39A:
FIG. 39A illustrates an exemplary rewards user interface.

FIG. 39A illustrates an example rewards user interface 3900 displaying the status of a rewards program. In embodiments, a rewards program may be any program that rewards a user after a predetermined number of purchases for a particular product have been made. As an example, the rewards user interface 3900 shows that the user is part of a rewards program called "Coffee Club" where the user needs two more purchases of coffee to get one coffee free.

Figure 39B:
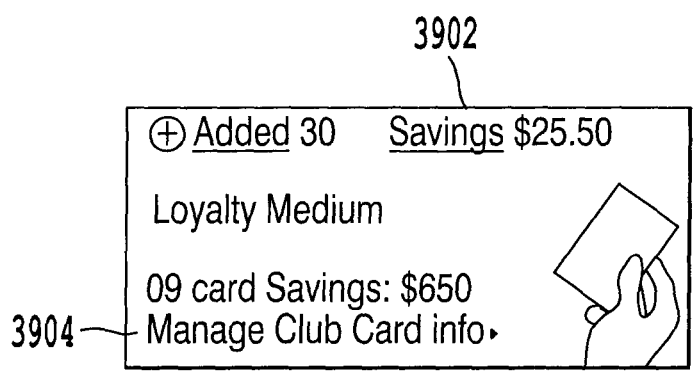
FIG. 39B illustrates an exemplary savings user interface.

FIG. 39B illustrates an example savings user interface 3902 displaying the user's year-to-date savings for the customized offers program. The savings user interface 3902 may include a link 3904 that permits the user to manage the user's loyalty medium info.

Figure 40:
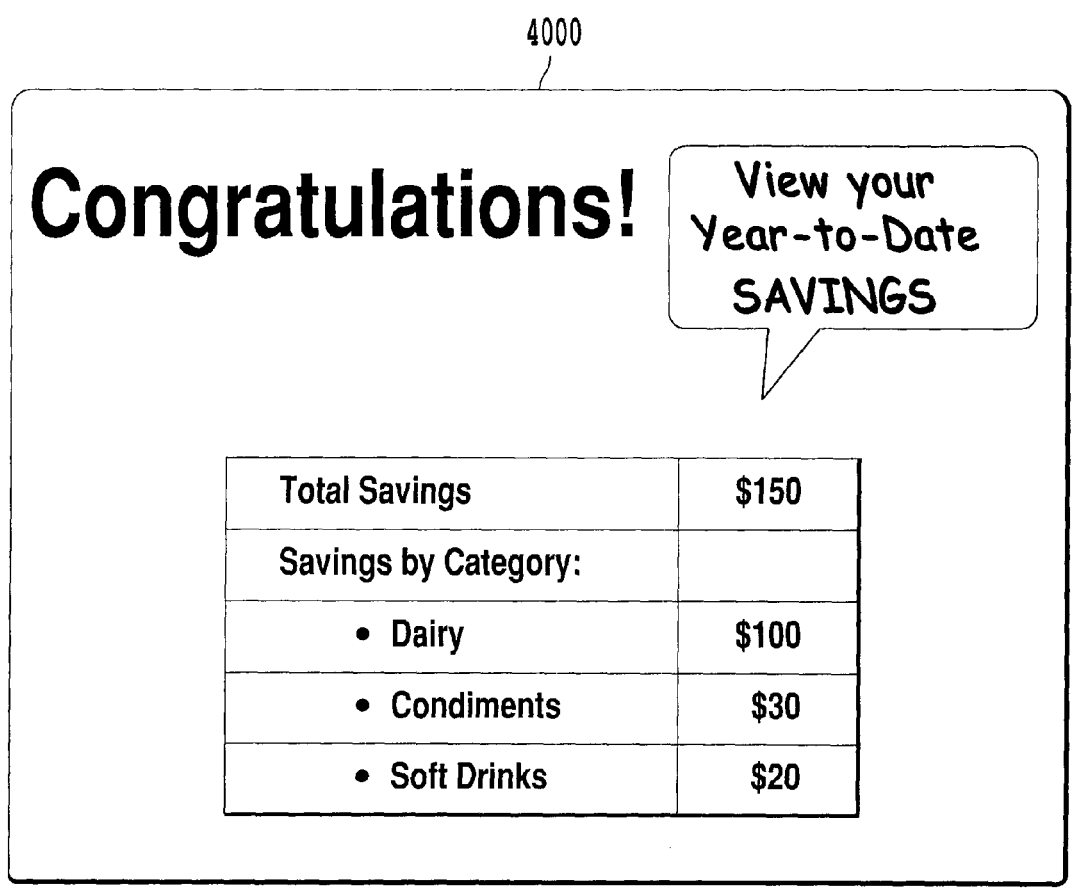
FIG. 40 illustrates an exemplary savings reports user interface.

FIG. 40 illustrates an example savings reports user interface 4000 that displays a savings report associated with the user. In embodiments, the savings report illustrated in FIG. 41 is prepared by the Report Generator Module 428 (FIG. 4) and retrieved from the Reports Library (514). The savings reports user interface 4000 may display the user's year-to-date savings and the user's savings by category. As an example, the savings reports user interface 4000 shows that the user has saved a total of $150 with $100 in products in the dairy category, $30 in products in the condiments category, and $20 in products in the soft drinks category.

In embodiments, when the Offer Allocation Module 418 allocates one or more new offers to a customer, the Offer Notification Module 424 may prepare and send an email to the customer informing the customer to log into the enterprise system via the customer portal to view the one or more new offers. FIG. 41A illustrates an example email 4100 notifying the customer of new offers.

Further embodiments include a notification of discount savings on a register receipt. For example, after a customer completes a purchase and receives a receipt, the receipt may indicate the customer's savings. Embodiments present a summary of savings received in each transaction from personalized offers so that customers can see their savings during each shopping trip. FIG. 41B illustrates an example receipt 4102 displaying the customer's savings for the customer's purchase.

Additional embodiments include a notification of savings the customer could have received if they loaded items to their loyalty medium. For example, items that are offered to each customer that they could have loaded to their loyalty medium but didn't are flagged. Therefore, when the customer purchases one of those items, the retailer can tell the customer on the register receipt the level of savings they could achieve if they had selected the offer.

Specialized Programs

According to some embodiments, a loyalty rewards savings program is provided to customers and/or households, where rewards are provided to the customers and/or households according to incremental spending over a period of time. As an example, the loyalty rewards program can provide benefits (e.g., discounts, savings, rewards, etc.) to the customer in return for a household's incremental spending at a retailer above a base level of spending. In some embodiments, the base level of spending is measured for a period of time prior to the customer being eligible for loyalty rewards. As an example, when a household signs up for the loyalty rewards program, the household's spending at the retailer is measured over a predetermined time period (e.g., two months) before the household is eligible for any rewards under the loyalty rewards program. In further embodiments, prior to allocation of any rewards to any household under the loyalty rewards program, the base level of spending for each household registering with the loyalty rewards program is measured for the predetermined period of time (e.g., two months).

According to some embodiments, upon determination of the base level of spending for each household, a promotion period starts where the retailer compares the total eligible spending for the household to the base level spending of the household to determine the amount of incremental spending the household has spent with the retailer during the promotion period. In embodiments, the level of incremental spending is subsequently compared to a matrix that plots the benefit level associated with the level of incremental spending by the household. As an example, the level of benefit to the household (e.g., discounts, savings, rewards, etc.) can increase as the household reaches higher levels of incremental spending at the retailer.

Figure 42:
FIG. 42 illustrates an exemplary loyalty rewards interface.

FIG. 42 illustrates an example loyalty rewards program interface 4200 showing a matrix that plots the benefit level associated with the level of incremental spending. As illustrated in FIG. 42, when the user spends at least $50 per week at the retailer for three months, the user starts receiving incremental rewards based on the amount the user is spending. For example, if the user spends at least $50 per week during April through June, the user starts receiving incremental rewards in July where, if the user spends at least $70 a week, the user receives at least 1% savings off their total spend with the retailer on every transaction during the month of July. Further, as illustrated in FIG. 42, the level of rewards provided to the user may be increased as the user continues meet the requirements of the loyalty rewards program. For example, as illustrated in FIG. 42, the user receives at least 3% in savings during the month of August if the user continues to spend at least $70 a week for a second consecutive month, and 4% in savings during the month of September if the user continues to spend at least $70 per week for a third consecutive month.

According to some embodiments, the retailer rewards the household for the level of incremental spending following the promotion period as a lump sum amount, a percentage savings on every transaction with the retailer, a percentage savings within a certain type of product category within the retailer (e.g., fuel station, pharmacy, etc.), or in any other desired way that provides benefit to the customer. In further embodiments, the benefits (e.g., discounts, savings, rewards, etc.) are applied directly to a payment card, such as a retailer payment card, any type of debit or credit card the customer has registered with the retailer, or any other desired form of payment such as a digital wallet, re-loadable gift card, etc. In further embodiments, the retailer has the capability to identify certain areas of the store where the benefit is rewarded at a higher level. For example, an incremental dollar spent on food may be worth X benefit, while an incremental dollar spent on pharmacy may be worth X+Y benefit.

Therefore, the loyalty rewards savings program provides a broad based reward only to incremental spending at the customer or household level. Therefore, the loyalty rewards program provides a personalized reward program that is focused on incremental spending. According to embodiments, offers are based on a preferred customer program that identifies "Preferred" customers and delivers customized special services or offers. As an example, a "Preferred" customer may be a customer that spends at least a specific dollar amount over a predetermined time period (e.g., $1000 a month). Special services or offers provided under the preferred program may include the opportunity to have direct access with a store manager upon request while shopping or an exclusive customer service number not provided to the general public to provide faster service. Other special services can include a special pharmacy call in telephone number, a wine concierge call in line, or any other type of special service that is only available to preferred customers. According to some embodiments, preferred customers will receive additional offers or special offers that would not otherwise be provided to the customer. An example would be an additional 10 cents off fuel discount on every fuel transaction, or any other type of benefit (savings, reward, discount) that would be available to the preferred customer as a special offer.

According to embodiments, the retailer loyalty program can provide targeted hot offers to customers engaged in the loyalty program. These offers are extra "hot", meaning they will have deeper discounts than are typically available in the marketplace, including some offers that may be free. As an example, a "hot" offer can provide an additional 50% discount to an offer that has been allocated to the customer. Alternatively, if an offer has not already been allocated to the customer, a "hot" offer can provide the additional 50% discount prior to allocation of the offer to the customer. Hot offers may be provided in conjunction with CPG partnership and create an additional ability to drive loyalty behavior. For example, a hot offer would be an offer beyond a current or expected level of discount. In some embodiments, the customer can only receive the extra hot offer by loading the offer from the retailer website or mobile application. In further embodiments, offers are based on a specialized global hot offers program that provides extra hot offers to all households in a certain operating area. In some embodiments these hot offers will be targeted, meaning that out of a set of all potential available hot offers, each customer in the operating area will get the offer that is most relevant for that individual customer. Targeted hot offers are particularly valuable in driving trial and awareness of new products available within the retail store, or in driving trial and awareness of existing products available within the retail store that have an opportunity to reach a new set of customers. In some embodiments, the retailer can partner with a CPG manufacturer to provide a targeted hot offer to a targeted set of customers, where the target is exactly the segment of customers the CPG partner wants to reach. In return for being able to target the unique segment of customers, the CPG partner may be willing to pay for some or all of the cost associated with providing the hot offer to the targeted set of customers.

According to some embodiments, offers are based on a deal of the day/meal of the day program. As an example, a deal of the day/meal of the day offer may expire after a short period of time (e.g., good for one day) and may be provided in limited quantity (e.g., only the first X hundred or thousand customers receive the specialized offer). Therefore, these specialized offers provide additional incentive for customers to be loyal to the retailer and visit the retailer's website or mobile device application on a daily basis.

According to some embodiments, offers are based on a nutrition based targeting program. For example, nutrition based targeting offers may be based on a customer's specific nutritional needs (e.g., gluten free items) specified by the customer. As another example, nutrition based targeting offers may be based on a customer's purchase behavior (e.g., customer demonstrates preference for a certain type of item).

According to some embodiments, a retailer can provide a game that permits customers to vote on offers. An offer game is provided as a Facebook application or any other desired social media networking application. In further embodiments, the offer game can be provided on the iPhone®, Android™, Blackberry®, or any other desired mobile platform. In additional embodiments, the offer game is accessible from any personal computer or terminal/kiosk.

In some embodiments, the offer game permits users to vote on offers the retailer selects in regular intervals. For example, the retailer provides one game per day and selects ten offers in each game. Any registered users of the game can select/vote for five offers in each game. The aggregate result of voting is displayed the day after the game is provided. The five offers with the most votes may be provided as offers to customers who voted in the game, where the users can add offers to their loyalty mediums. The five offers with the least votes may not show prices, and users that choose them can see the offers and can also add those offers to their loyalty mediums. FIG. 43A illustrates an example offer game interface 4300 permitting game participants to vote for product offers. FIG. 43B illustrates another example offer game interface 4302 showing the offers that are available to be loaded on the game participants' loyalty mediums based on the voting results.

In further embodiments, users earn points and badges based on their votes. Users can further suggest offers based on competitors ads, invite friends, and display their badges in game play status on the user's social network account (e.g., Facebook).

The offer game benefits the users by providing an exciting and engaging experience with the retailer, where the user can receive additional offers. Further, the offer game provides the retailer with information on the users' preferences, so that the retailer can understand the users better. The offer game further provides the retailer with information on a competitors pricing and offers. Further, the offer game provides advertising opportunities for CPGs and therefore, provides the CPGs with additional opportunities for increasing revenue.

Convenience Programs

According to some embodiments, loyalty medium specials offers are provided according to current specials provided by the retailer. For example, the retailer sorts the current specials running in the store based on the customer's most likely preferences. Therefore, upon logging onto the customer's account, the customer has the ability to sort and view the loyalty medium offers that are currently on special (i.e., have a reduced price). In further embodiments, when a coupon is available to use in addition to a personalized offer or loyalty medium special, the retailer communicates the availability of the coupon to the customer.

According to some embodiments, the retailer determines the net price the Customer pays when using a coupon. As an example, if a customer prints out a coupon for $1.00 off an item, and the item purchase price is $10.00, the coupon indicates that the purchase price is $9.00 upon redemption of the coupon. Therefore, the customer does not need to know the regular purchase price for an item and perform the calculation to determine the net price.

Administrative Tools

FIG. 44A illustrates an example administrator interface 4400. In embodiments, an administrator may input a loyalty medium number in the number input area 4402 to see loaded and unloaded offers for the entered loyalty medium number. FIG. 44B illustrates another example administrator interface 4404.

My Shopping List

Figure 45A:
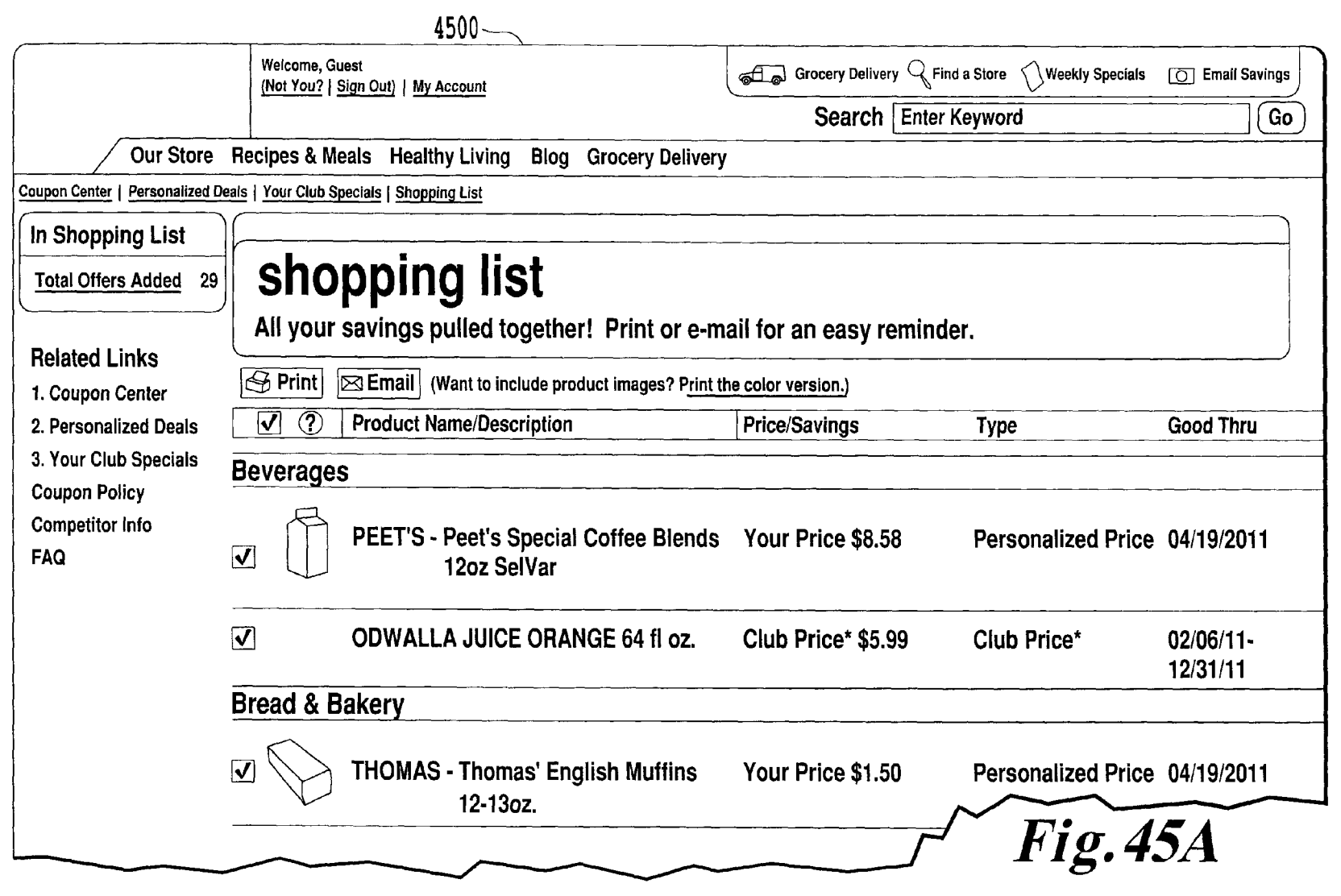

Additional embodiments include a My Shopping List, which is an aggregated list that includes personalized deals, coupons, club specials, deal match items and other targeted offers or reward elements that have been added to the shopping list—that is sorted by category, and includes the relevant info so that the customer can easily shop the store and receive their discounts. FIGS. 45A-45C illustrate example shopping lists 4500, 4502, and 4504, respectively.

In Store List Printing

According to some embodiments, customers registered with the retailer can print their shopping lists in a retailer's store via a terminal/kiosk. For example, a customer creates a shopping list on their computer. When the customer goes to their local retailer store, the customer swipes their loyalty medium at an in-store shopping list terminal/kiosk. In an alternative example, the customer uses their mobile device number or pin to log in to the shopping list terminal/kiosk. The shopping list terminal/kiosk system retrieves the customer's shopping list from the retailer's database and prints the customer's personal shopping list. As an example, any of the shopping lists illustrated in FIGS. 45A-45C or any other desired shopping list is available at the shopping list terminal/kiosk.

In some embodiments, the content of the personal shopping list includes sections organized by aisle number, items of the customer's shopping list in each section, additional retail offers based on the customer's personal shopping history, additional manufacturer coupons and local advertisement at the back of the printout, and/or additional retailer corporate marketing messages. Thus, the customer may use the shopping list to guide the customer shopping through the aisles.

Registration, Offer Selection, and Offer Redemption Flow Charts

Figure 46:
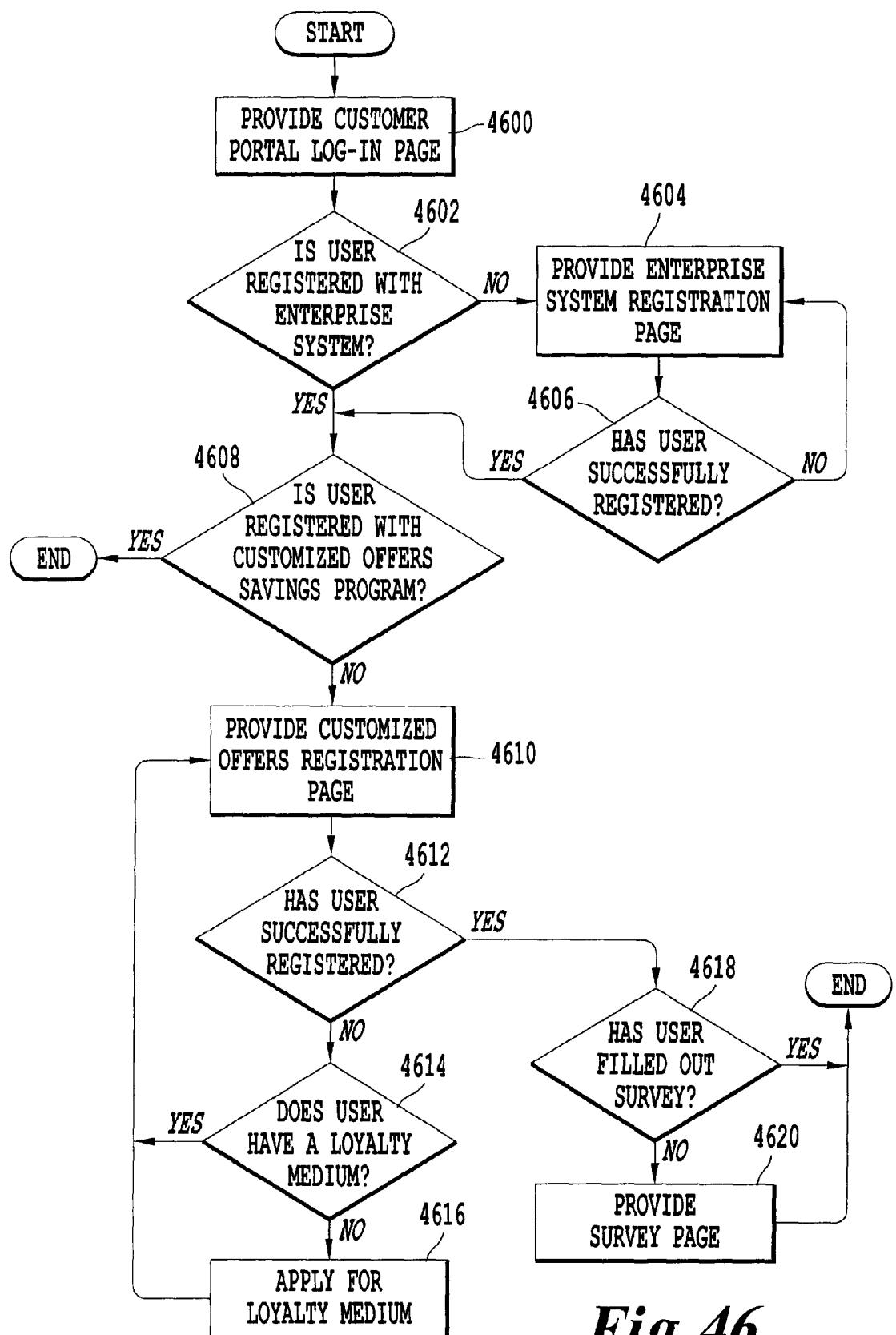
FIG. 46 illustrates an exemplary process for registering a user with the enterprise system and the customized offers savings program.

FIG. 46 illustrates an example process for registering a user with the enterprise system and the customized offers savings program. In embodiments, the process illustrated in FIG. 46 may be performed by the Registration Module 406. The process may generally start at 4600 where a customer portal log-in page is provided to a user attempting to log in to the enterprise system. Process flow proceeds to 4602 to determine if the user is registered with the enterprise system. If the user is not registered with the enterprise system, process flow proceeds from 4602 to 4604 to provide the user with the enterprise system registration page such as the registration page illustrated in the registration user interface 2500. Process flow proceeds to 4606 to determine if the user has successfully registered with the enterprise system. If the user has not successfully registered with the enterprise system, process flow returns from 4606 to 4604. If the user has successfully registered with the enterprise system, process flow proceeds from 4606 to 4608 to determine if the user is registered with the customized offers savings program. Additionally, if the user is registered with the enterprise system at 4602, process flow proceeds from 4602 to 4608.

If the user is registered with the customized offers program, the process illustrated in FIG. 46 ends. If the user is not registered with the customized offers savings program, process flow proceeds from 4608 to 4610 to provide the customized offers registration page to the user such as the registration page illustrated in the registration user interface 2700.

Process flow proceeds to 4612 to determine if the user has successfully registered with the customized offers savings program. As an example, the user may not have successfully registered if the user entered an invalid loyalty medium number. If the user has not successfully registered with the customized offers savings program, process flow proceeds from 4612 to 4614 to determine if the user has a loyalty medium. If the user does not have a loyalty medium, process flow proceeds from 4614 to 4616 to apply for the loyalty medium. Process flow returns from 4616 to 4610 upon applying for the loyalty medium. If the user does have a loyalty medium but has not successfully registered (e.g., the user entered incorrect information in the registration page), process flow returns from 4614 to 4610 to permit the user to try to register for the customized offers savings program again.

If the user has successfully registered with the customized offers savings program, process flow proceeds from 4612 to 4618 to determine if the user has filled out a survey such as the survey page displayed in the survey user interface 2800. If the user has not filled out the survey, process flow proceeds to 4620 to provide the survey page to the user. After the user has filled out the survey page, the process illustrated in FIG. 46 ends. If the user has already filled out the survey at 4618, the process illustrated in FIG. 46 ends.

Figure 47:
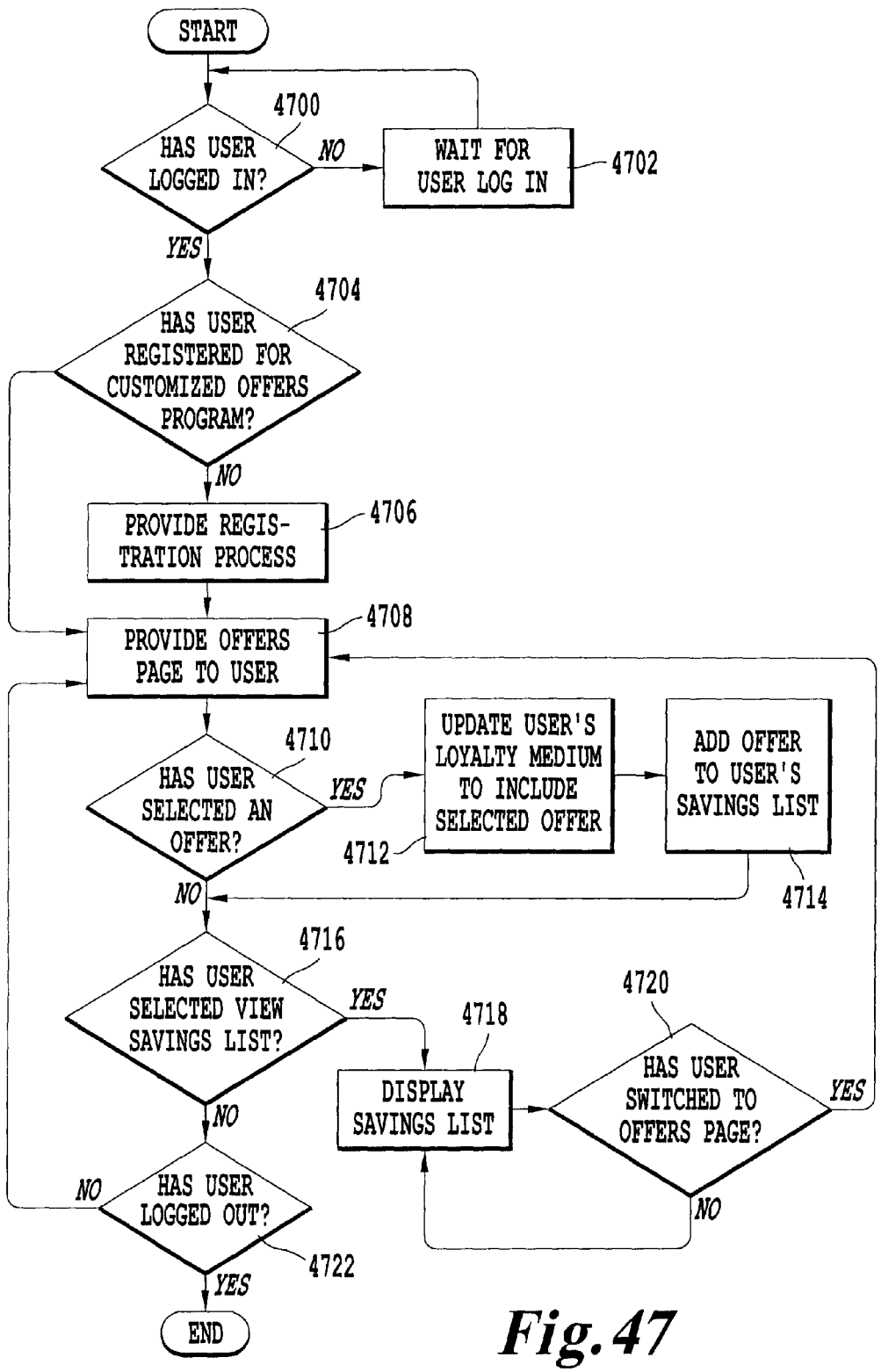
FIG. 47 illustrates an exemplary process for displaying an offer selection user page to a user.

FIG. 47 illustrates an example process for displaying an offer selection user page to a user. The process may generally start at 4700 to determine if a user has logged into the enterprise system via the customer portal. If the user has not logged into the enterprise system, process flow proceeds from 4702 to wait for a user.

If the user has logged into the enterprise system, process flow proceeds from 4700 to 4704 to determine if the user has registered for the customized offers savings program. If the user has not registered for the customized offers savings program, process flow proceeds from 4704 to 4706 to provide the user with the registration process such as the registration process illustrated in FIG. 46. Upon registering with the customized offers savings program, process flow proceeds form 4706 to 4708 to provide an offers page to the user such as the offers page illustrated in the offer selection user interface 3200. In some embodiments, if this is the first time the user is logging into their account, all offers will be available to select to load onto their loyalty medium. If the user has already selected offers in a previous session this information is saved and displayed upon the user re-entering the site. Additionally, if the user is already registered for the customized offers savings program, process flow proceeds from 4704 to 4708.

Process flow proceeds to 4710 to determine if a user has selected an offer. If a user has selected an offer, process flow proceeds from 4710 to 4712 to update the user's loyalty medium to include the selected offer. In embodiments, the Retailer Medium Manager Module 422 updates the user's loyalty medium as functionally described above. Process flow proceeds to 4714 to update the user's savings list with the selected offer. Process flow proceeds to 4716 to determine if a user has selected the view savings list. Additionally, if a user has not selected an offer, process flow proceeds from 4710 to 4716.

If the user has selected the view savings list, the process flow proceeds from 4716 to 4718 to display the savings list such as the savings list illustrated in the savings list interface 3700. Process flow proceeds from 4720 to determine if the user has switched to the offers page. If the user has switched to the offers page, process flow returns from 4720 to 4708. If the user has not switched to the offers page, process flow returns from 4720 to 4718.

If the user has not selected the view savings list, process flow proceeds from 4716 to 4722 to determine if the user has logged out. If the user has not logged out, process flow returns from 4722 to 4708. If the user has logged out, the process illustrated in FIG. 47 ends.

Figure 48:
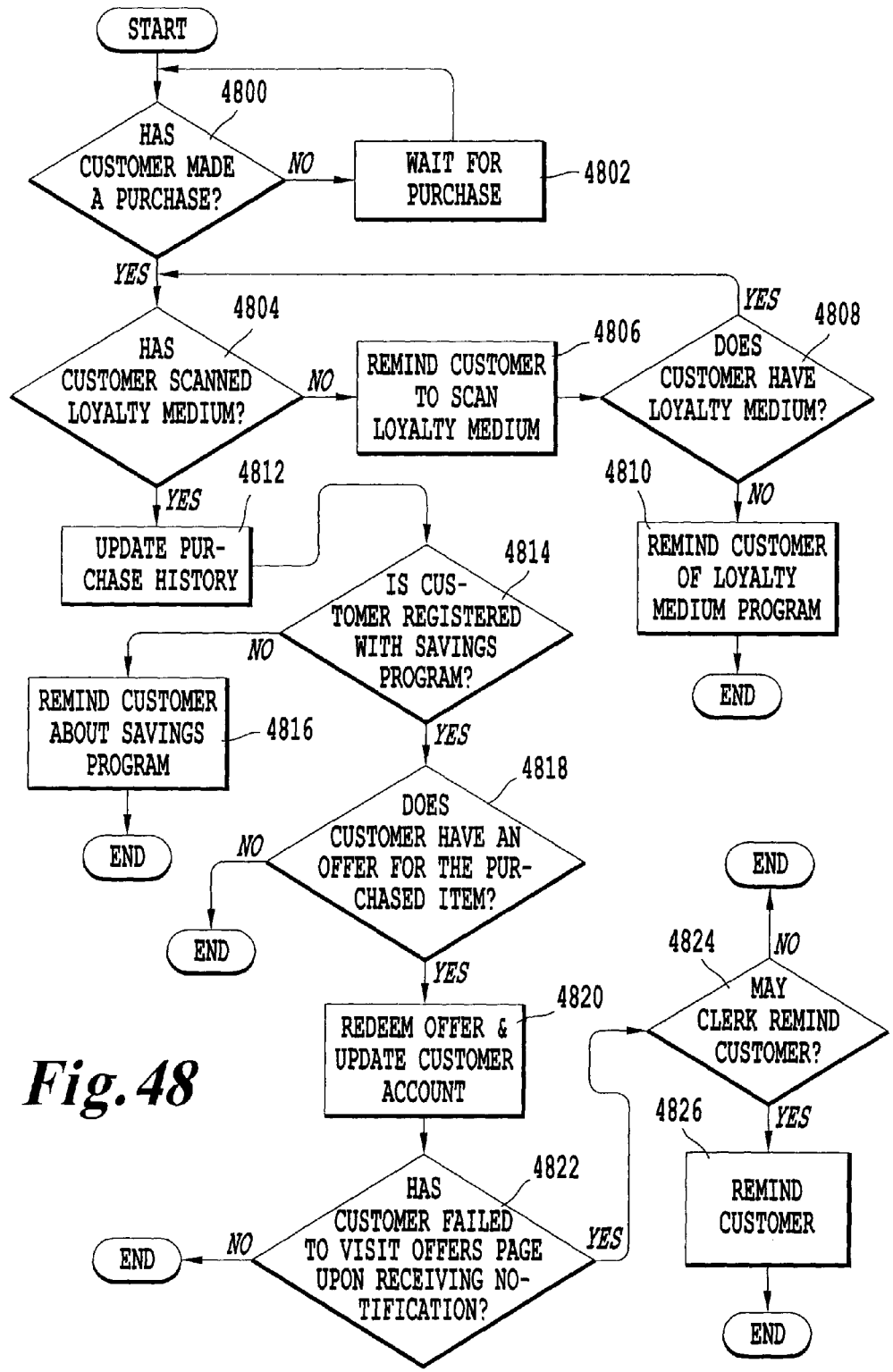
FIG. 48 illustrates an exemplary customer purchase flow chart.

FIG. 48 illustrates an example customer purchase flow chart. In embodiments, the process illustrated in FIG. 48 is performed when a customer makes a purchase. The process may generally start at 4800 to determine whether a customer has made a purchase. If the customer has not made a purchase, process flow proceeds to 4802 to wait for a customer purchase. If the customer has made a purchase, process flow proceeds from 4800 to 4804 to determine if the customer has scanned a loyalty medium. If the customer has scanned the loyalty medium, process flow proceeds from 4804 to 4812 to update the customer's purchase history profile as functionally described above.

If the customer has not scanned the loyalty medium, process flow proceeds from 4804 to 4806 to remind the customer to scan the loyalty medium. If the customer indicates they do not have a loyalty medium, process flow proceeds from 4808 to 4810 where the customer is reminded that the retailer offers a loyalty medium program. The process ends after the customer is reminded of the retailer's loyalty medium program. If the customer has a loyalty medium, process flow returns from 4808 to 4804.

If the customer has swiped a loyalty medium, process flow proceeds from 4806 to 4814 to determine if the customer is registered with the customized offers savings program. If the customer is not registered with the customized offers savings program, process flow proceeds from 4814 to 4816 where the customer may be informed of the customized offers savings program. The process ends after the customer is informed of the customized offers savings program.

If the customer is registered with the customized offers savings program, process flow proceeds from 4814 to 4818 to determine whether the customer has an offer for the item the customer is purchasing. If the customer does not have an offer for the purchased item, the process illustrated in FIG. 48 ends. If the customer has an offer for the purchased item, process flow proceeds from 4818 to 4820 to redeem the offer and update the customer's account to indicate that the offer has been applied to the purchased item. Process flow proceeds to 4822 to determine if the customer has failed to visit the offers page upon receiving a notification. If the customer has not received any new offers or has viewed any new offers, the process illustrated in FIG. 48 ends. If the customer has failed to visit the offers page upon receiving notification of a new offer, process flow proceeds from 4822 to 4824 to determine if the retailer clerk may remind the customer of the new offer. If the clerk cannot remind the customer of the new offer, the process illustrated in FIG. 48 ends. If the clerk may remind the customer of the new offer, process flow proceeds from 4824 to 4826 where the clerk reminds the customer about the new offer.

As an example, if a customer has received an email regarding a newly allocated offer, and the customer has not viewed that offer, the Offer Reminder Module 426 may generate a reminder that appears on a POS device informing the retailer clerk to remind the customer of the new offer. However, if the customer's profile, such as the profile illustrated in Table 1 of FIG. 12, indicates that the customer may not be reminded, no reminder is generated.

Allocation Strategy

In embodiments, an offer allocation strategy may be based on allocating offers to provide incentives to make extra trips to the retailer or purchase additional products. An offer allocation strategy may further be directed towards increasing retailer sales by identifying relevant non-buyer opportunity gaps and incremental category spend opportunities.

FIG. 49 illustrates an example chart showing 20 of the top selling rapid consumable categories. As illustrated in FIG. 49, 13 of the 20 categories include a brand switching partner in the category. FIG. 50 illustrates an example chart showing the top ten categories having the highest share of wallet (SOW). As an example, the share of wallet may serve as a performance indicator of how much business the retailer gets from specific customers. In embodiments, the top selling rapid consumable categories and categories having the highest share of wallet may be given higher priority when allocating offers.

FIG. 51 illustrates an example chart for identifying potential brand switchers for each brand in each category. As an example, each category buyer for a particular brand is classified as a low category, medium category, or high category buyer. In embodiments, the classification of category buyers may be based on the amount of money the category buyer spends on the category compared to the total amount the category buyer spends on all other categories. As illustrated in FIG. 51, each category buyer may be classified as a particular brand buyer such as never buying the brand or as a 1× exclusive buyer of the brand. Category buyers may further be classified as low brand buyers (e.g., buying the brand less than 20% of the time the user buys an item in the category), as medium brand buyers (e.g., buying the brand between 20%-60% of the time the user buys an item in the category); as high brand buyers (e.g., buying the brand between 60%-80% of the time the user buys an item in the category), and as loyal brand buyers (e.g., buying the brand between 80-100% of the time the user buys an item in the category).

According to some embodiments, category buyers classified in the portion of the chart containing an "X" may be identified as potential brand switchers. As an example, category buyers that rarely buy a brand (e.g., one time brand buyer or low brand buyer) may be considered as a potential brand switcher since these category buyers may be more likely to switch to another brand if provided an offer. However, category buyers that almost exclusively buy a brand (e.g., high brand buyer or loyal brand buyer) may not be considered as a potential brand switcher since these category buyers may be less likely to switch to another brand if provided an offer. In alternative embodiments, each category buyer illustrated in FIG. 51 is identified as a potential brand switcher regardless of how often the category buyer purchases a particular brand.

Figure 52A:
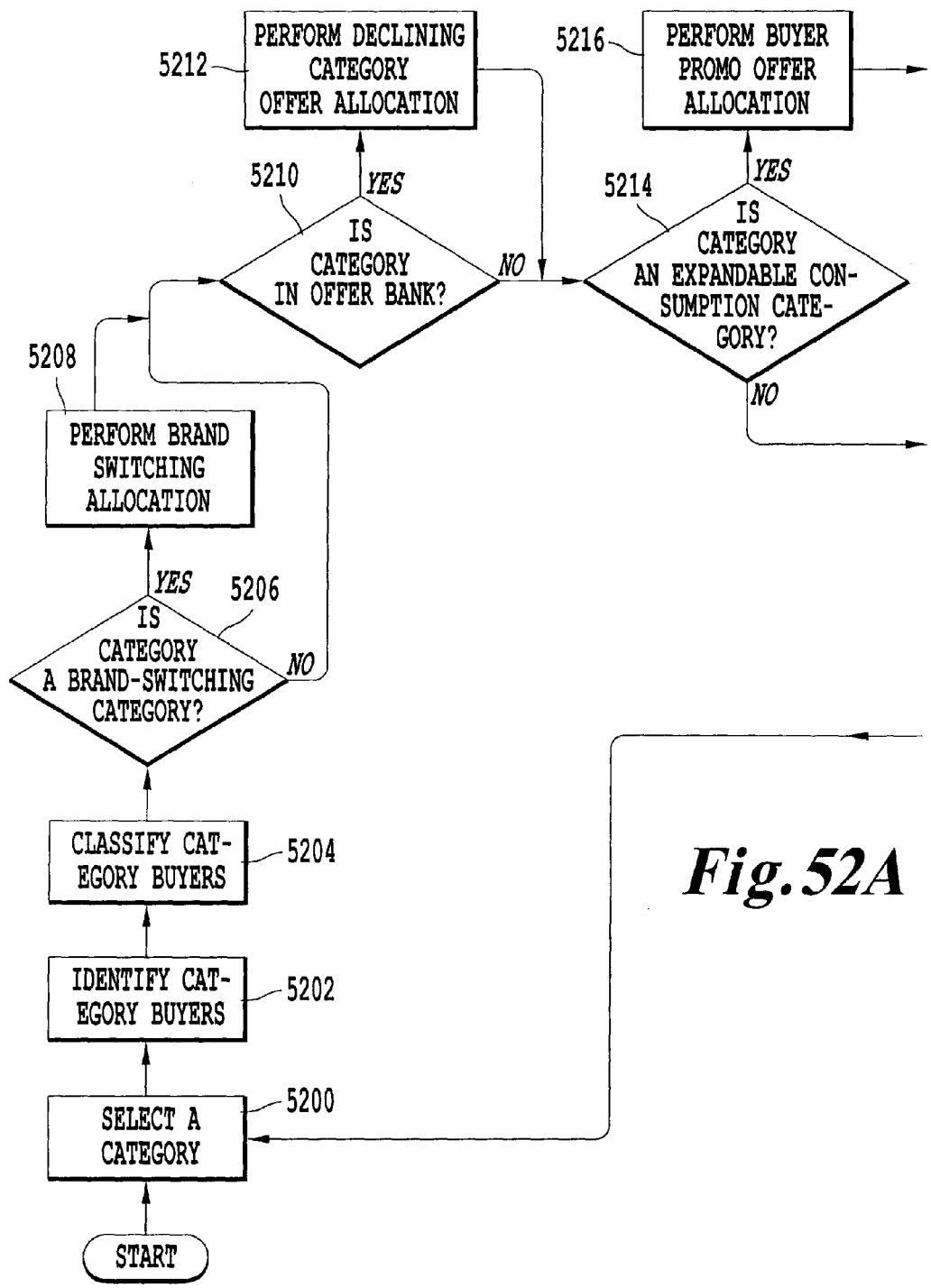
FIGS. 52A and 52B illustrate an exemplary process for allocating offers to one or more households.
Figure 52B:
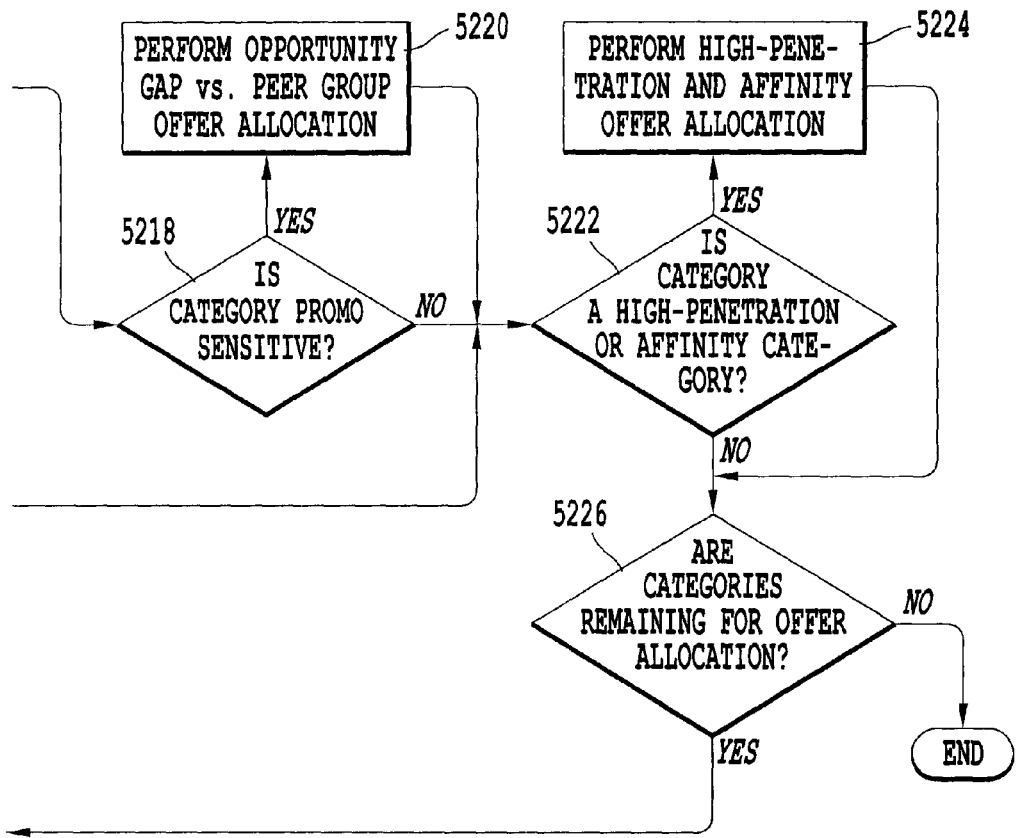

FIGS. 52A and 52B illustrate an example process for allocating offers to one or more households. The process may generally start at 5200 to select a category. In embodiments, the categories available for offer selection may be predetermined such as the categories listed in FIGS. 49 and 50. Process flow proceeds to 5202 to identify the category buyers of the selected category. Process flow proceeds to 5204 to classify the category buyers as functionally described above with respect to FIG. 51. Process flow proceeds to 5206 to determine if the category is a brand switching category. If the selected category is a brand switching category, process flow proceeds from 5206 to 5208 to perform a brand switching allocation process to identify potential brand switchers. As an example, a category is identified as a brand switching category if there is at least one brand switching partner associated with the selected category.

Process flow proceeds to 5210 to determine if the category is in the offer bank. Additionally, if the selected category is not a brand switching category, process flow proceeds from 5206 to 5210. If the category is in the offer bank, process flow proceeds from 5210 to 5212 to perform the declining category offer allocation to determine whether a category buyer's spending on the selected category is decreasing.

Process flow proceeds to 5214 to determine if the category is an expandable consumption category. Additionally, if the selected category is not in the offer bank, process flow proceeds from 5210 to 5214. If the category is an expandable consumption category, process flow proceeds from 5214 to 5216 to perform the buyer promotion offer allocation to determine the likelihood that a category buyer buys an item on promotion.

Process flow proceeds from 5216 to 5218 to determine if the selected category is promo sensitive. If the selected category is promo sensitive, process flow proceeds from 5218 to 5220 to perform the opportunity gap versus peer gap offer allocation to determine opportunities to increase retailer sales.

If the category is not promo sensitive, process flow proceeds from 5218 to 5222 to determine if the selected category is a high penetration or affinity category. As an example, an affinity category is a category that is commonly purchased by customers that purchase another category. For example customers who buy peanut butter commonly buy jelly as well. Therefore, jelly is an affinity category to peanut butter. Additionally, if the selected category is not an expandable consumption category, process flow proceeds from 5214 to 5222. If the category is a high penetration or affinity category, process flow proceeds from 5222 to 5224 to perform the high penetration and affinity offer allocation.

Process flow proceeds to 5226 to determine if there are any categories remaining for offer allocation. Additionally, if the selected category is not a high penetration or affinity category, process flow proceeds from 5222 to 5226. If there are no categories remaining for offer allocation, the process illustrated in FIGS. 52A and 52B ends. If there are categories remaining for offer allocation, process flow returns from 5226 to 5200.

Figure 53:
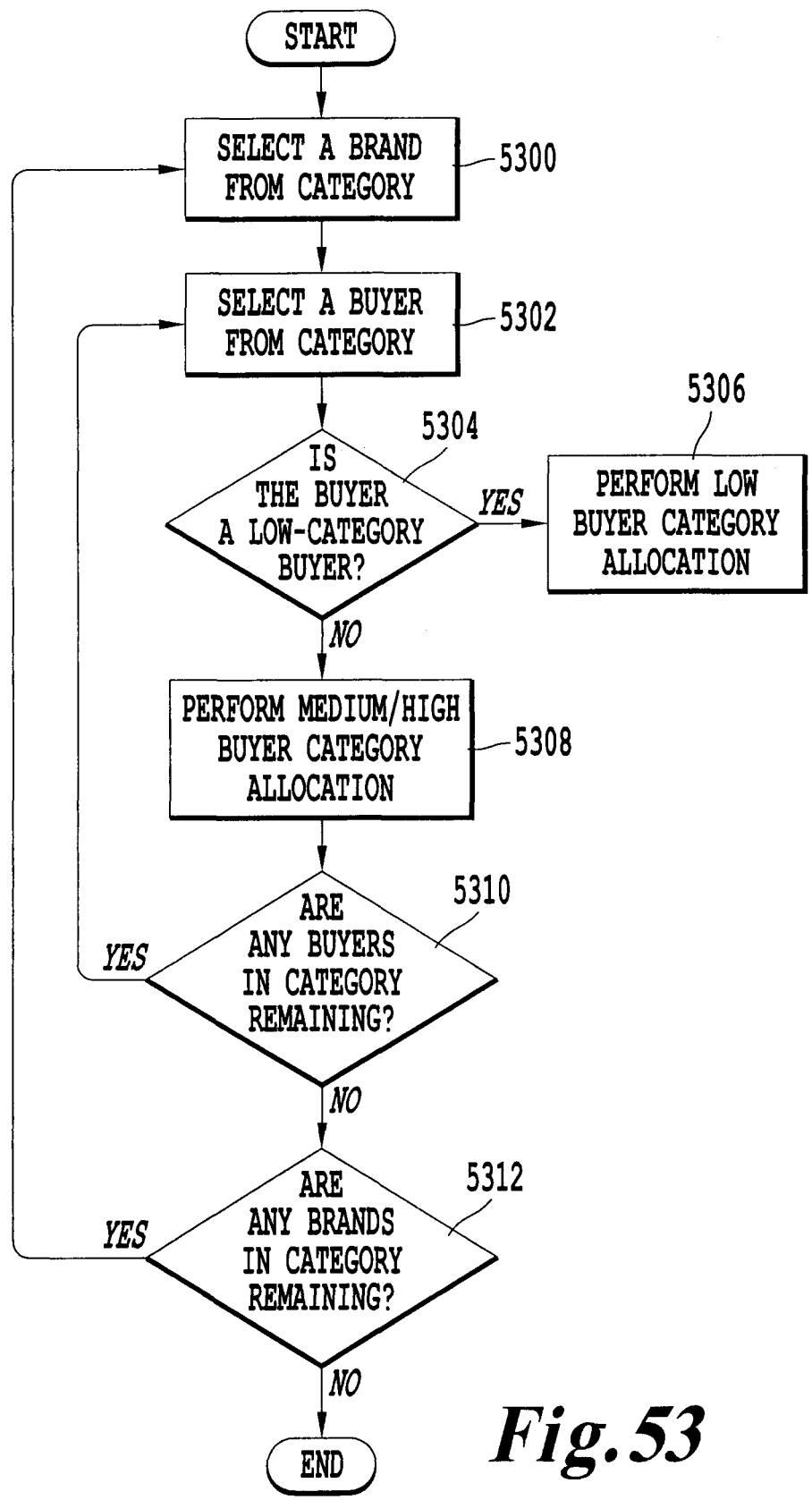
FIG. 53 illustrates an exemplary brand switching offer allocation process.

FIG. 53 illustrates an example brand switching offer allocation process. According to some embodiments, the offer allocation process iterates through each brand and category buyer of the selected category to determine if the category buyer should be allocated a brand switching offer. In embodiments, process flow may be directed from 5208 in the offer allocation process illustrated in FIGS. 52A and 52B to 5300.

The process may generally start at 5300 to select a brand selected from the selected category. Process flow proceeds to 5302 to select a buyer from the selected category. Process flow proceeds to 5304 to determine if the buyer is a low category buyer. If the buyer is a low category buyer, process flow proceeds from 5304 to 5306 to perform a low buyer category allocation process.

If the buyer is a not a low category buyer, process flow proceeds from 5304 to 5308 to perform a medium/high buyer category allocation process. As an example, if the buyer is not a low category buyer, then the buyer is either a medium category buyer or a high category buyer. Process flow proceeds to 5310 to determine if there are any buyers remaining in the category. Additionally, upon completing the low buyer category allocation process, process flow proceeds from 5306 to 5310. If there are buyers remaining in the category, process flow returns from 5310 to 5302 to perform the offer allocation process for the next selected category buyer. If there are no buyers remaining in the category process flow proceeds from 5310 to 5312 to determine if there are any brands in the category remaining. If brands are remaining in the category, process flow returns from 5312 to 5300 to perform the offer allocation process for the next selected brand. If there are no brands in the category remaining, the process illustrated in FIG. 53 ends.

Figure 54:
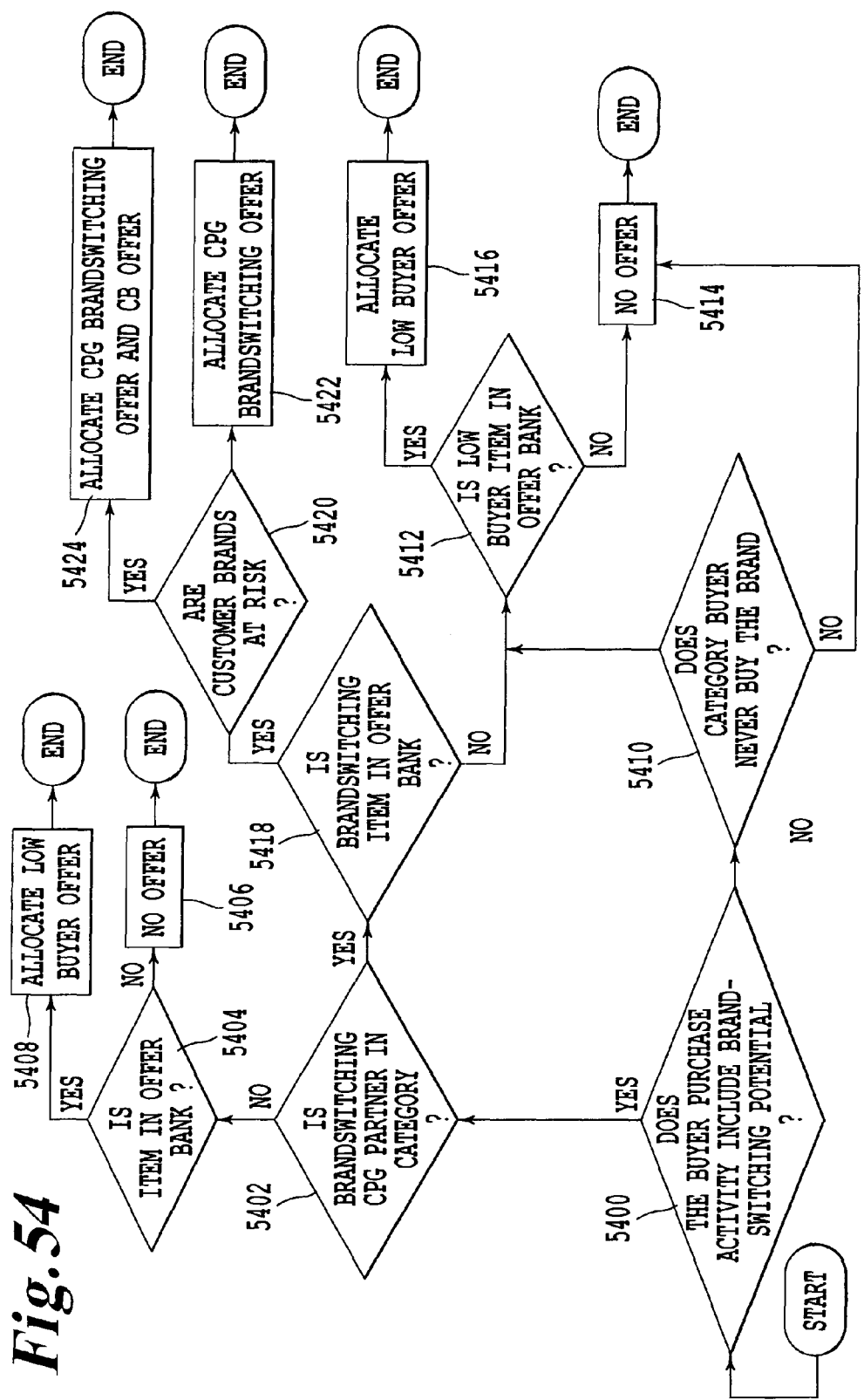
FIG. 54 illustrates an exemplary flow category buyer offer allocation process.

FIG. 54 illustrates an example low category buyer offer allocation process. In embodiments, process flow may be directed from 5306 in the offer allocation process illustrated in FIGS. 53 to 5400. The process may generally start at 5400 to determine if the low category buyer's purchase activity indicates brand switching potential. As an example, the low category buyer's purchase activity may indicate brand switching potential if the buyer is classified in any portion of the chart illustrated in FIG. 51 that contains an "X."

If the buyer purchase activity indicates brand switching potential, process flow proceeds from 5400 to 5402 to determine if there is a brand switching CPG partner in the selected category. If there is no brand switching CPG partner in the selected category, process flow proceeds from 5402 to 5404 to determine if the item is in the offer bank. If the item is not in the offer bank, process flow proceeds from 5404 to 5406 where no offer is provided and the process illustrated in FIG. 54 ends. If the item is in the offer bank, process flow proceeds from 5404 to 5408 to allocate a low buyer offer. After the low buyer offer is allocated the process illustrated in FIG. 54 ends. As an example, even when there is no brand switching CPG partner for the selected brand, but an item associated with the brand is in the offer bank, the retailer may realize an opportunity to increase retailer sales by allocating an offer to the category buyer.

If there is a brand switching CPG partner in the selected category, process flow proceeds from 5402 to 5418 to determine if the brand switching item is in the offer bank. If the brand switching item is in the offer bank, process flow proceeds from 5418 to 5420 to determine if consumer brands (retailer house brands) are at risk.

If no consumer brands are at risk, process flow proceeds from 5420 to 5422 to allocate a CPG brand switching offer. After the CPG brand switching offer is allocated, the process illustrated in FIG. 54 ends. If consumer brands are at risk, process flow proceeds from 5420 to 5424 to allocate a CPG brand switching offer and a consumer brand (CB) offer. After the CPG brand switching offer and consumer brand offer is allocated, the process illustrated in FIG. 54 ends.

If the brand switching item is not in the offer bank, process flow proceeds from 5418 to 5412 to determine if the low buyer item is in the offer bank. If the low buyer item is not in the offer bank, process flow proceeds from 5412 to 5414 where no offer is provided and the process illustrated in FIG. 54 subsequently ends. If the low buyer item is in the offer bank, process flow proceeds from 5412 to 5416 to allocate a lower buyer offer. After the low buyer offer is allocated, the process illustrated in FIG. 54 subsequently ends. As an example, even if the brand switching item is not in the offer bank but the low buyer item is in the offer bank, the retailer may realize an opportunity to increase retailer sales by allocating an offer to the low category buyer.

If the buyer purchase activity does not indicate brand switching potential, process flow proceeds from 5400 to 5410 to determine if the category buyer never buys the selected brand. If the category buyer never buys the selected brand, process flow proceeds from 5410 to 5414. If the category buyer buys the brand, process flow proceeds from 5410 to 5412.

Figure 55:
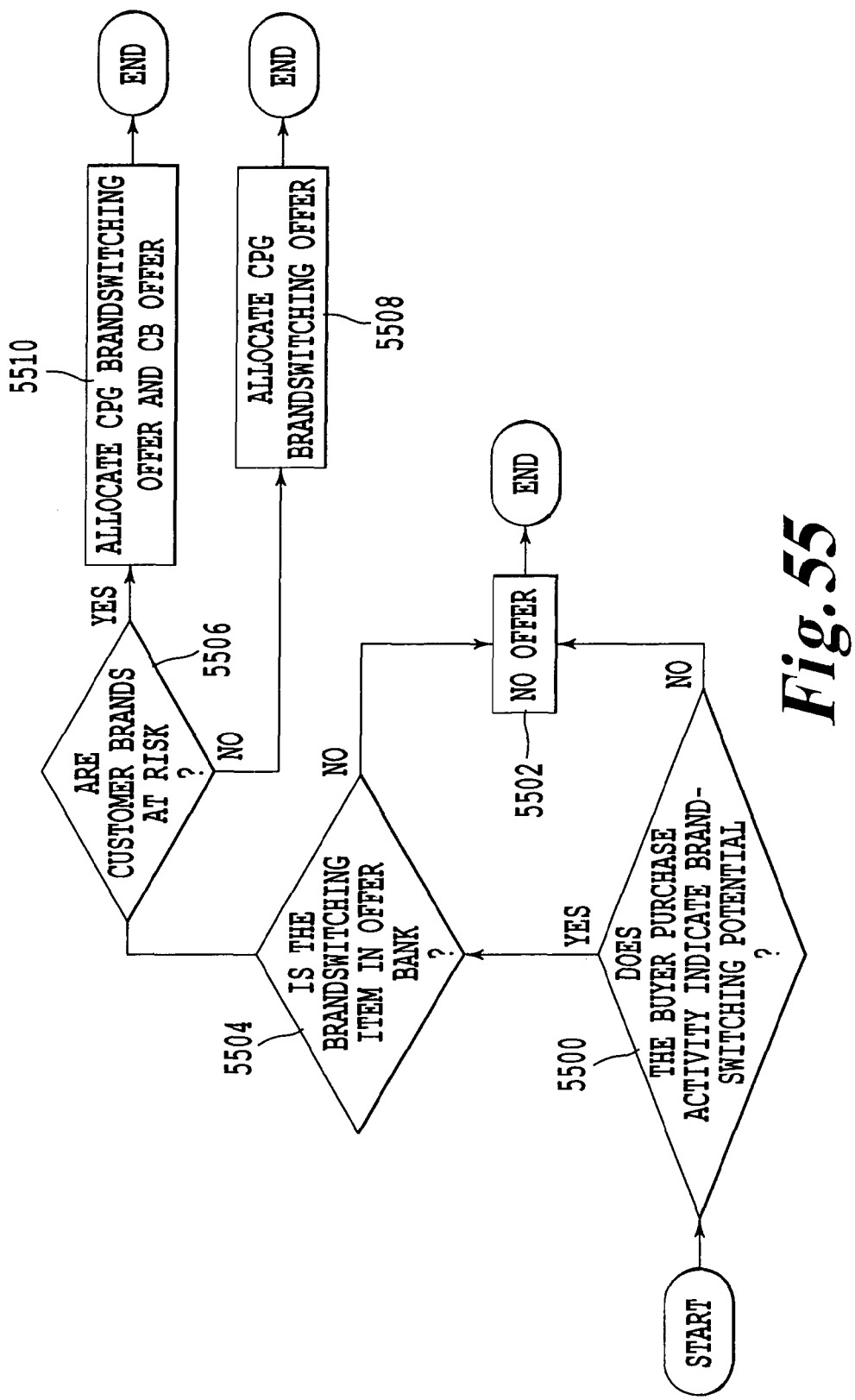
FIG. 55 illustrates an exemplary medium/high buyer category allocation offer process.

FIG. 55 illustrates an example medium/high buyer category allocation offer process. In embodiments, process flow may be directed from 5308 in the offer allocation process illustrated in FIGS. 53 to 5500. The process may generally start at 5500 to determine if the buyer purchase activity indicates brand switching potential as described above. If the buyer purchase activity does not indicate brand switching potential, process flow proceeds from 5500 to 5502 where no offer is provided and the process illustrated in FIG. 55 subsequently ends. As an example, if the buyer is a medium or high category buyer, and there is no brand switching potential, the retailer may decide not to allocate an offer since the medium or high category buyer may not have an incentive to increase his/her category spending.

If the buyer purchase activity indicates brand switching potential, process flow proceeds from 5500 to 5504 to determine if the brand switching item is in the offer bank. If the brand switching item is not in the offer bank, process flow proceeds from 5504 to 5502 where no offer is provided and the process illustrated in FIG. 55 subsequently ends.

If the brand switching item is in the offer bank, process flow proceeds from 5504 to 5506 to determine if consumer brands are at risk. If no consumer brands are at risk, process flow proceeds from 5506 to 5508 to allocate a CPG brand switching offer. After the CPG brand switching offer is allocated the process illustrated in FIG. 55 subsequently ends.

If consumer brands are at risk, process flow proceeds from 5506 to 5510 to allocate the CPG brand switching offer and consumer brand offer. After allocating the CPG brand switching offer and consumer brand offer, the process illustrated in FIG. 55 ends.

Figure 56:
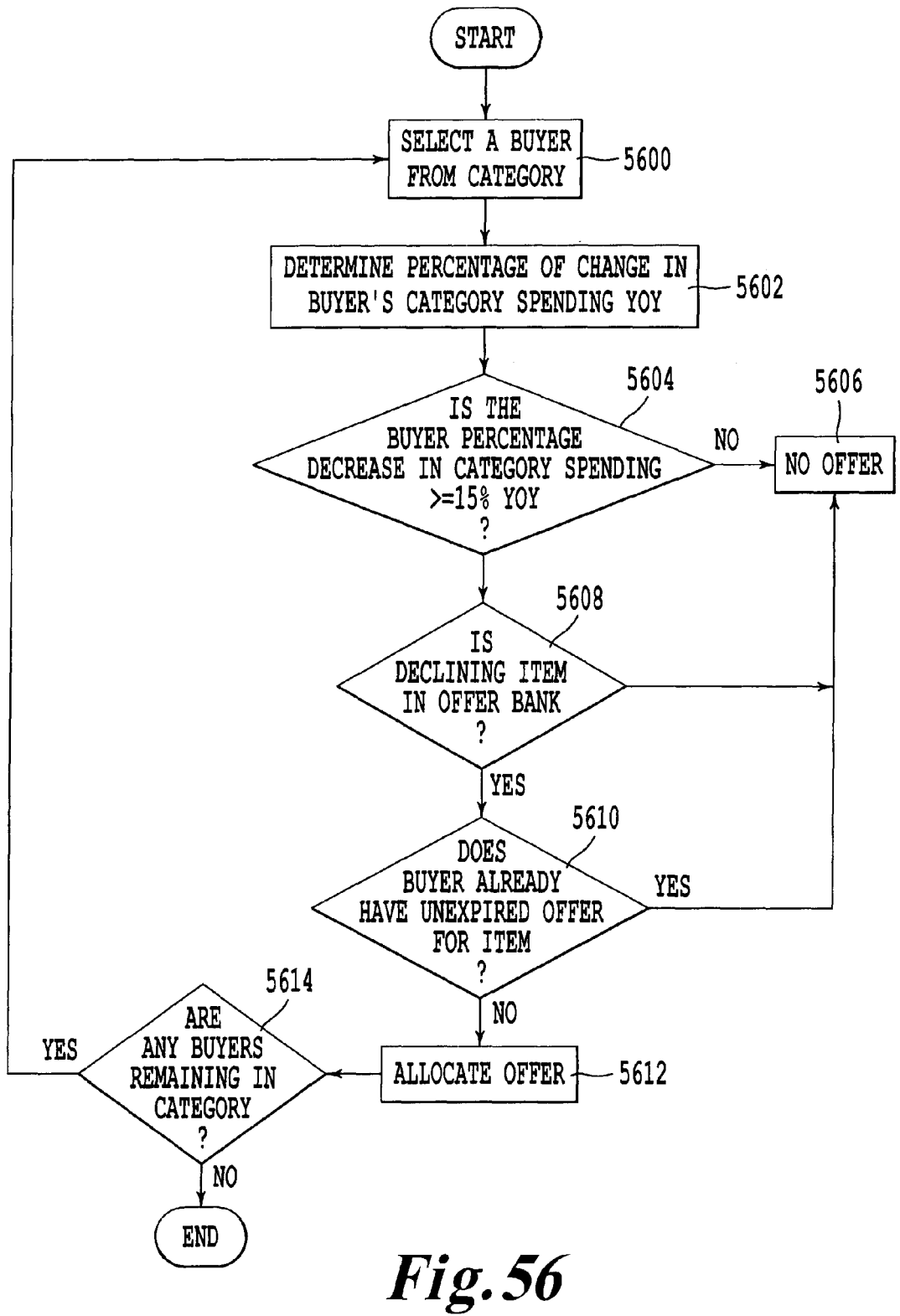
FIG. 56 illustrates an exemplary declining category offer allocation process.

FIG. 56 illustrates an example declining category offer allocation process. According to some embodiments, a declining category offer allocation process may be performed to determine if a category buyer's spending in the category has declined over a period of time. In embodiments, process flow may be directed from 5212 in the offer allocation process illustrated in FIGS. 52A and 52B to 5300.

The process may generally start at 5600 to select a buyer from the selected category. Process flow proceeds to 5602 to determine a percentage of change in the selected buyer's category spending year over year (YOY).

Process flow proceeds to 5604 to determine if the buyer's percentage decrease in category spending is ≥15% YOY. If the buyer's percentage of decrease in category spending is less than 15% YOY, process flow proceeds from 5604 to 5606 where no offer is provided and the process illustrated in FIG. 56 subsequently ends. As an example, if the buyer's spending in the selected category has not decreased in the past 12 months by more than 15%, than the retailer may not provide an offer since the category buyer would most likely not have any incentive to increase category spending if provided an offer.

If the buyer's percentage of decrease in category spending is ≥15% YOY, process flow proceeds from 5604 to 5608 to determine if the declining item is in the offer bank. If the declining item is not in the offer bank, process flow proceeds from 5608 to 5606 where no offer is provided and the process illustrated in FIG. 56 subsequently ends.

If the declining item is in the offer bank, process flow proceeds from 5608 to 5610 to determine if the buyer already has an unexpired offer for the item. If the buyer already has an unexpired offer for the item, process flow proceeds from 5610 to 5606 where no offer is provided and the process illustrated in FIG. 56 subsequently ends. As an example, if the buyer has already received a brand switching offer for the selected category or has any other unexpired offer for the selected category, the buyer may not be provided a new offer.

If the buyer does not have an unexpired offer for the item, process flow proceeds from 5610 to 5612 to allocate an offer. Accordingly, when the buyer's decrease in category spending in the past 12 months is greater than or equal to 15%, the retailer may allocate an offer since the buyer may have incentive to increase category spending.

Process flow proceeds to 5614 to determine if the there are any buyers remaining in the selected category. If there are no buyers remaining in the selected category, the process illustrated in FIG. 56 ends. If there are buyers remaining in the selected category, process flow returns from 5614 to 5600 perform the declining category allocation process for the next selected buyer.

Figure 57:
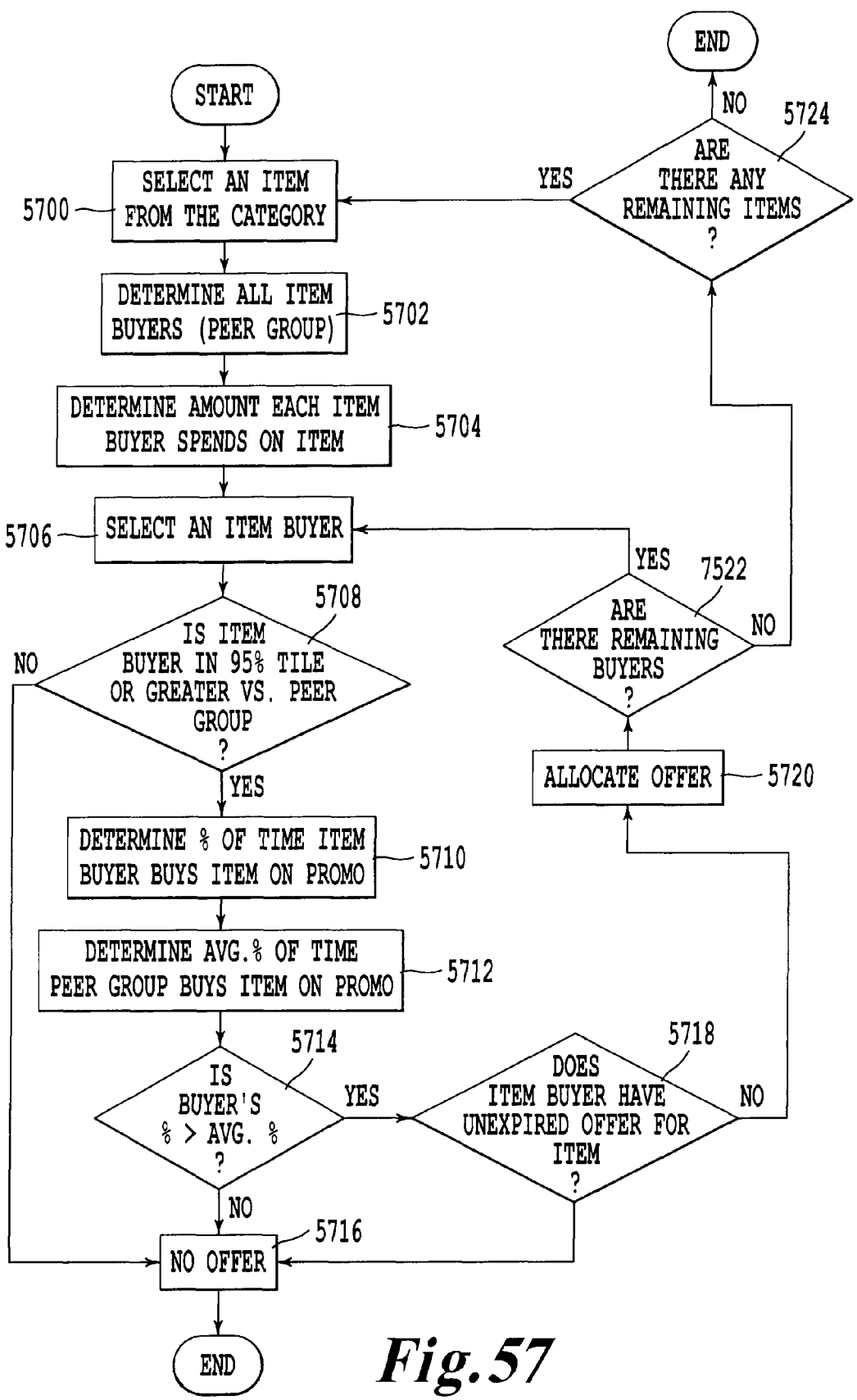
FIG. 57 illustrates an exemplary buyer promo offer allocation process.

FIG. 57 illustrates an example buyer promo offer allocation process. According to some embodiments, the buyer promo offer allocation process may identify buyers that are more likely to buy an item on promotion. In embodiments, process flow may be directed from 5216 in the offer allocation process illustrated in FIGS. 52A and 52B to 5700.

The process may generally start at 5700 to select an item from the selected category. Process flow proceeds to 5702 to determine all item buyers for the selected item. In embodiments, the determined item buyers may constitute a peer group. Process flow proceeds to 5704 to determine an amount each item buyer spends on the selected item. Process flow proceeds to 5706 to select an item buyer.

Process flow proceeds to 5708 to determine if the amount the item buyer spends on the item is in the 95th percentile or greater compared to the peer group. If the amount the item buyer spends is in the 95th percentile or greater compared to the peer group, process flow proceeds from 5708 to 5710 to determine the percentage of time the item buyer buys the selected item on promotion. Process flow proceeds to 5712 to determine the average percentage of time that the peer group buys the selected item on promotion.

Process flow proceeds to 5714 to determine if the percentage of time the buyer buys an item on promo is greater than the average percentage of time the peer group buys an item on promotion. If the buyers' percentage is less than the peer groups' percentage, process flow proceeds from 5714 to 5716 where no offer is provided and the process illustrated in FIG. 57 subsequently ends. Additionally, if the amount the item buyer spends on the selected item is less than the 95th percentile compared to the peer group, process flow proceeds from 5708 to 5716 where no offer is provided in the process illustrated in FIG. 57 subsequently ends.

If the buyers' percentage is greater than the average peer group percentage, process flow proceeds from 5714 to 5718 to determine if the item buyer already has an unexpired offer for the selected item. If the item buyer already has an unexpired offer for the selected item, process flow proceeds from 5718 to 5716 where no offer is allocated and the process illustrated in FIG. 57 subsequently ends. If the item buyer does not already have an unexpired offer for the item, process flow proceeds from 5718 to 5720 to allocate an offer.

Process flow proceeds to 5722 to determine if there are any remaining buyers. If there are any remaining buyers, process flow returns from 5722 to 5706. If there are no remaining buyers, process flow proceeds from 5722 to 5724 to determine if there are any remaining items. If there are no remaining items, the process illustrated in FIG. 57 ends. If there are remaining items, process flow returns from 5724 to 5700 to select the next item for performing the promo allocation offer process. Accordingly, the retailer may allocate an offer to the buyer if the buyer's purchase activity compared to the buyer's peer group indicates that the buyer is more likely to buy the selected item when an offer for the selected item is available.

Figure 58:
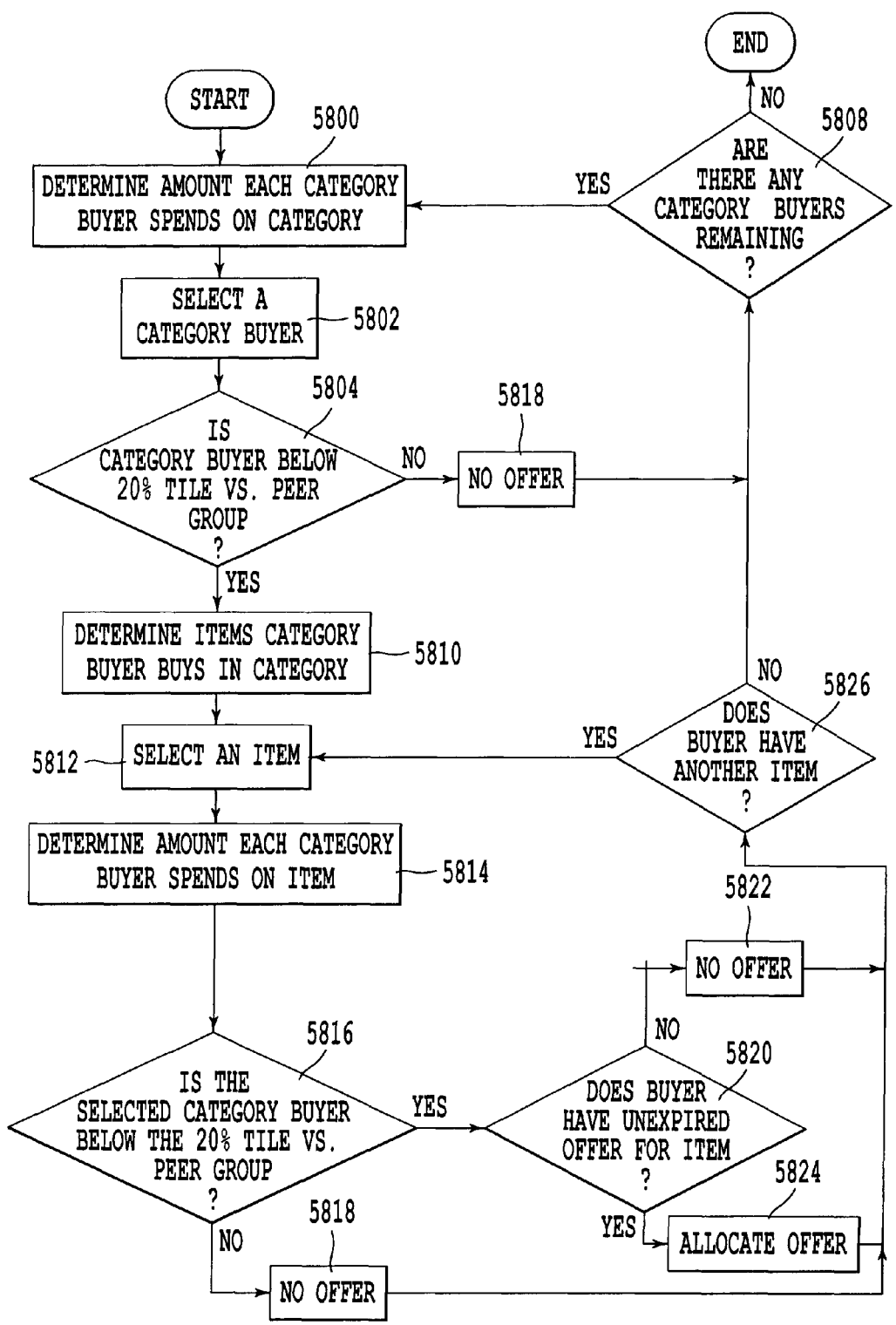
FIG. 58 illustrates an exemplary opportunity gap peer group offer allocation process.

FIG. 58 illustrates an example opportunity gap vs. peer group offer allocation process. According to some embodiments, the opportunity gap vs. peer group offer allocation process identifies opportunities to increase retailer sales by allocating offers to buyers who are not spending as much on items in the selected category compared to the buyers' peer group. In embodiments, process flow may be directed from 5220 in the offer allocation process illustrated in FIGS. 52A and 52B to 5800.

The process may generally start at 5800 to determine an amount each category buyer spends on the selected category. Process flow proceeds to 5802 to select a category buyer. Process flow proceeds to 5804 to determine if the amount the category buyer spends on the selected category is below the 20th percentile compared to the peer group. If the amount the category buyer spends on the category is above the 20th percentile compared to the peer group, process flow proceeds to 5806 where no offer is provided. Process flow proceeds to 5808 to determine if there are any category buyers remaining. If there are no category buyers remaining, the process illustrated in FIG. 58 ends. If there are any category buyers remaining, the process flow returns from 5808 to 5802 to select the next category buyer.

If the amount the category buyer spends on the selected category is below the 20th percentile compared to the peer group, process flow proceeds to 5810 to determine the items the category buyer buys in the selected category. Process flow proceeds to 5812 to select an item. Process flow proceeds to 5814 to determine an amount each category buyer spends on the selected item.

Process flow proceeds to 5816 to determine if the amount the selected category buyer spends on the item is below the 20th percentile compared to the peer group. If the amount the selected category buyer spends on the selected item is above the 20th percentile, process flow proceeds to 5818 where no offer is provided.

If the amount that the selected category buyer spends on the selected item is below the 20th percentile compared to the peer group, process flow proceeds to 5820 to determine if the selected category buyer has an unexpired offer for the selected item. If the category buyer has an unexpired offer for the selected item, process flow proceeds from 5820 to 5822 where no offer is provided. If the selected category buyer does not have an unexpired offer for the selected item, process flow proceeds from 5820 to 5824 to allocate an offer.

Process flow proceeds from 5818, 5822, and 5824 to 5826 to determine if the selected category buyer has previously purchased another item in the selected category. If the selected category buyer has another item available for possible offer allocation, process flow returns from 5826 to 5812 to select the next item for offer allocation. If the selected category buyer does not have any other items available for possible offer allocation, process flow proceeds from 5826 to 5808.

Figure 59:
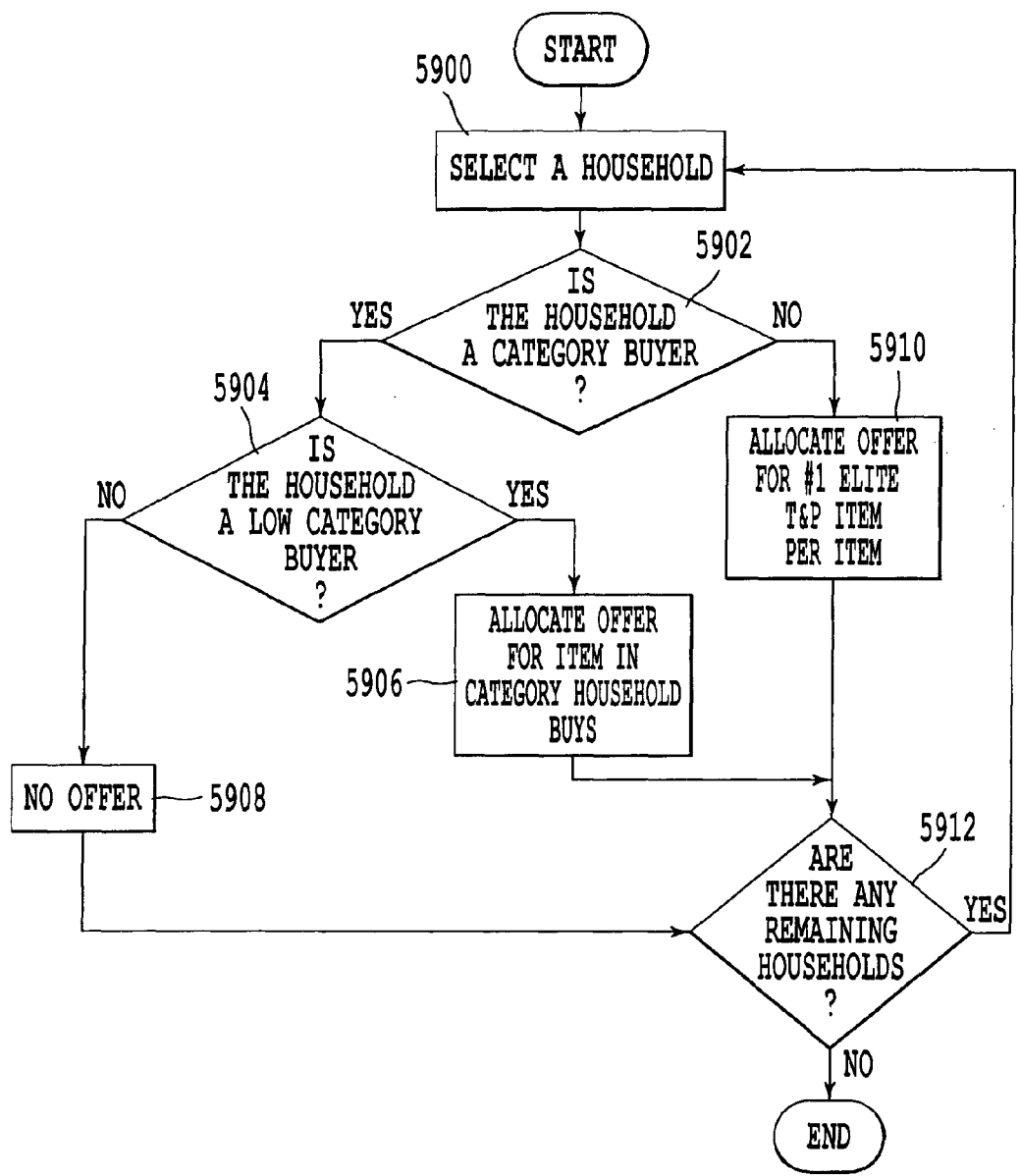
FIG. 59 illustrates an exemplary high penetration and affinity offer allocation process.

FIG. 59 illustrates an example high penetration and affinity offer allocation process. According to some embodiments, the high penetration and affinity offer allocation process iterates through each household registered with the customized offers savings program to allocate offers for the selected category. In embodiments, process flow may be directed from 5224 in the offer allocation process illustrated in FIGS. 52A and 52B to 5900.

The process may generally start at 5900 to select a household. Process flow proceeds to 5902 to determine if the household is a category buyer. If the household is a category buyer, process flow proceeds from 5902 to 5904 to determine if the household is a low category buyer. If the household is not a low category buyer, process flow proceeds from 5904 to 5908 where no offer is allocated. If the selected household is a low category buyer process flow proceeds from 5904 to 5906 to allocate an offer for an item in the selected category that the household buys.

If the selected household is not a category buyer, process flow proceeds from 5902 to 5910 to allocate an offer that customers in peer groups similar to this customer typically purchase. Process flow proceeds from 5906, 5908, and 5910 to 5912 to determine if there are any remaining households to be selected for offer allocation. If there are no remaining households to be selected for offer allocation, the process illustrated in FIG. 59 ends. If there are any remaining households to be selected for offer allocation, process flow returns from 5912 to 5900.

In embodiments, personalized offers include a comparison price point of the relevant competitor for each item within a certain area. Embodiments identify the primary store for each shopper, identify the competitor by item in that store, and do price checks and present the results on the site so consumers can see how the retailer's offer compares to the competitor's offer. According to some embodiments the competitor price will not be shown along with the personalized price, but rather, will compare the personalized price to the retailer's reference price. This reference price could be the retailer's regular retail price, the retailer's promoted price available in the marketplace for a period of time, or any other price that would provide a point of reference for the customer.

According to some embodiments, the price associated with a personalized offer is determined after determining the competitor's pricing. As an example, when a retailer is selling a product and a competitor is selling the same product at a different price, a customer of the retailer may be offered the competitor's price or a price that is lower than the competitor's price. The retailer has the option to match or beat the competition. As an example of matching the competition, the competitor's price may be offered to the customer as a personalized offer when the user logins into the user's account. Further, the competitor's price may be offered to the user at an in-store kiosk while the user is making a purchase. For example, when the customer is making a purchase that does not include the product for which the competitor's price is being offered, the customer may be offered a personalized offer at the competitor's price for the product.

Figure 60:
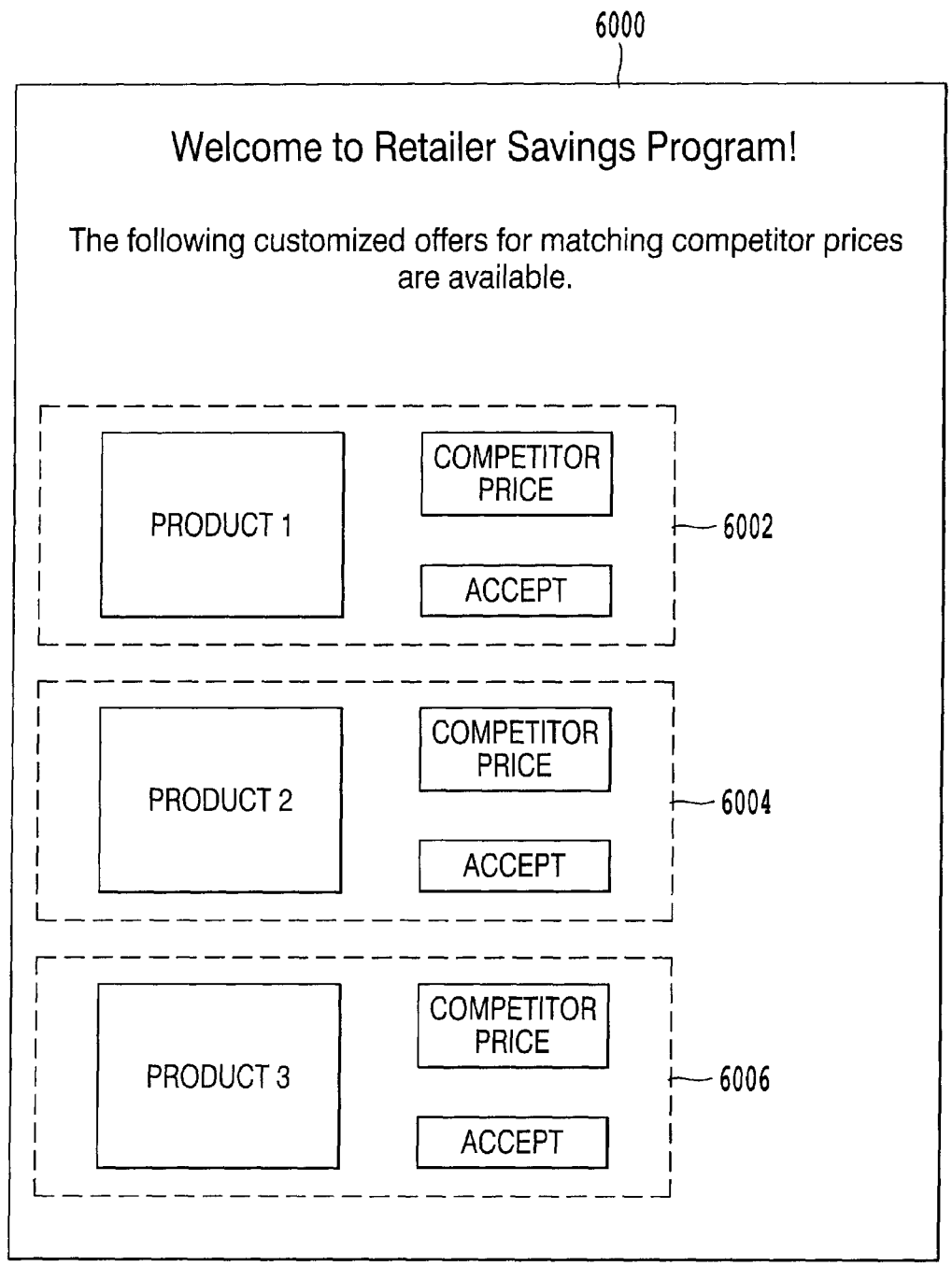
FIG. 60 illustrates an exemplary interface displayed as a web page on a customer's computer or on a screen of a POS device.
Figure 61:
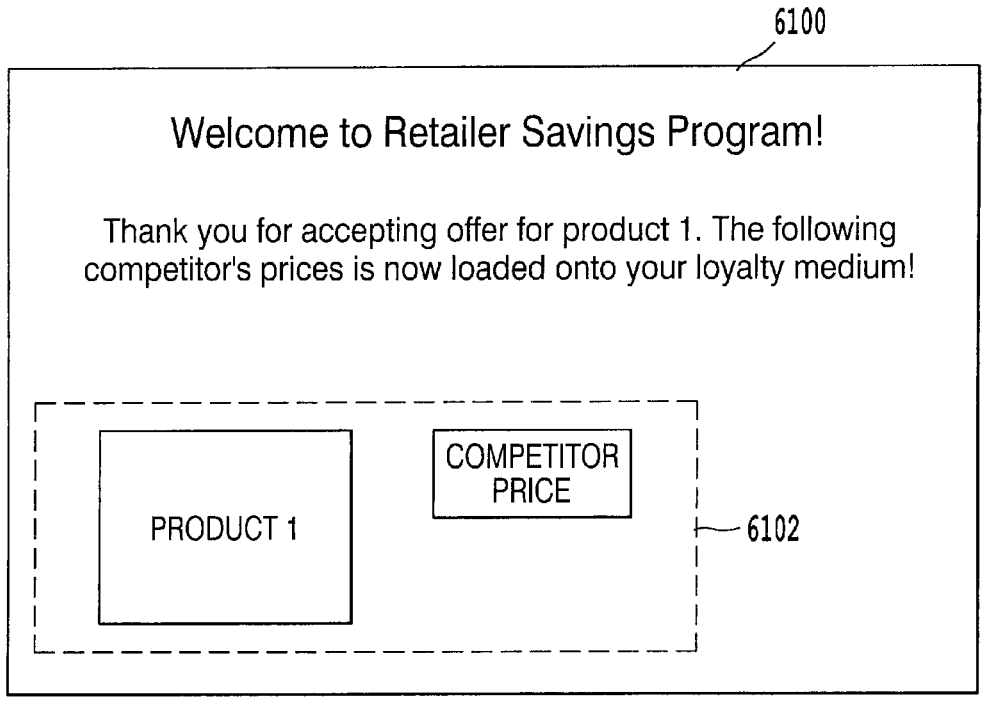
FIG. 61 illustrates an exemplary interface displaying an offer acceptance for a competitor price.

FIG. 60 illustrates an example interface 6000 displayed as a web page on a customer's computer or on the customer's mobile device through a mobile device. As illustrated in FIG. 60, the interface 6000 includes personalized offers 6002, 6004, and 6006 for matching competitor prices for products 1, 2, and 3, respectively. In some embodiments, if the customer clicks on the "Accept" button for a personalized offer including a competitor's price for a product, the competitor's price of the accepted offer is associated with the customer's account and loaded onto the customer's loyalty medium. FIG. 61 illustrates an example interface 6100 illustrating an example offer acceptance 6102 for a competitor price. As illustrated in FIG. 61, upon acceptance of any one of the offers illustrated in FIG. 60, the competitor price for the retail product is loaded onto the customer's loyalty medium.

Figure 62:
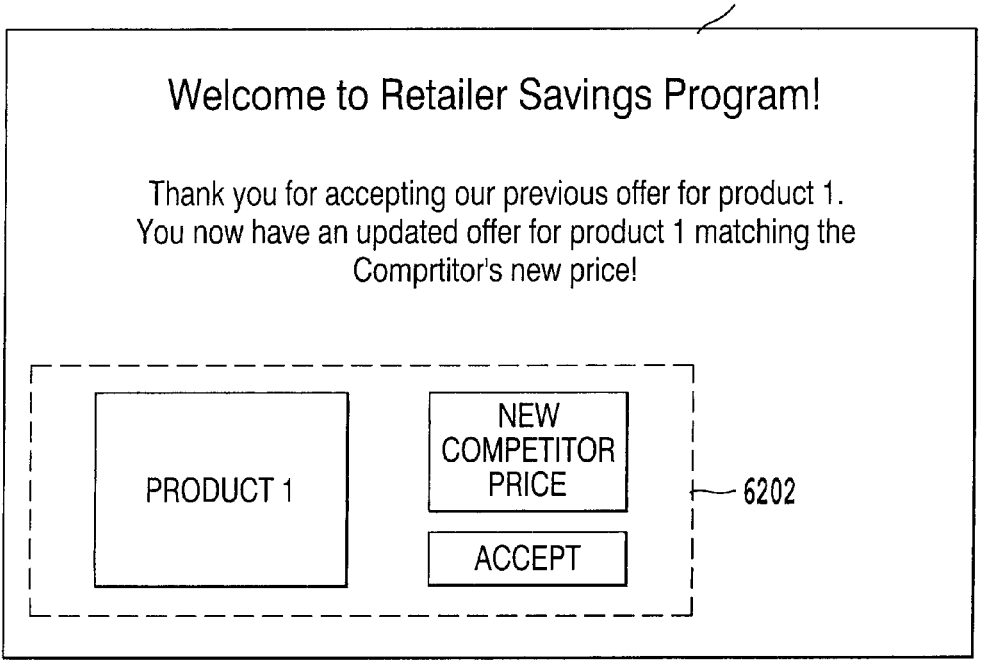
FIG. 62 illustrates an exemplary interface including the updated personalized offer for the competitor's price.

According to embodiments, the customer is provided with an updated personalized offer to take into account a change in a competitor's price. For example, when a customer accepts an offer for a competitor's price for a product, the competitor's price may decrease before the customer's next access of the customer's account. If the customer purchase history indicates that the customer has not purchased the product with the previously accepted competitor price, the customer may be provided an updated offer with the competitor's new price during the customer's subsequent access to the customer's account. FIG. 62 illustrates an example interface 6200 including the updated personalized offer 6202 for the competitor's price. In some embodiments, the interface 6200 is displayed when the customer is accessing the customer's account on a terminal, and a change occurs in the competitor's price for a previously accepted offer. In some embodiments, when the customer accepts the updated offer 6202, the new competitor's price for Product 1 is associated with the customer's account and loaded onto the customer's loyalty medium.

In another example, a customer may initially accept a personalized offer including a competitor's price for a product while the customer is logged onto the customer's account. However, before the customer's next purchase at the retailer, the competitor's price for the product may have changed. Accordingly, if the customer's current purchase does not include the product for which the competitor's price was previously accepted, the customer may be offered an updated personalized offer indicating the competitor's new price for the offer. As an example, upon purchase, the customer may be provided the updated personalized offer via SMS message, email, or a mobile application interface. If the customer's current purchase includes the product for which the competitor's prices was previously accepted, the customer may not be offered the updated personalized offer since there is no incentive to provide the new competitor's price.

Figure 63:
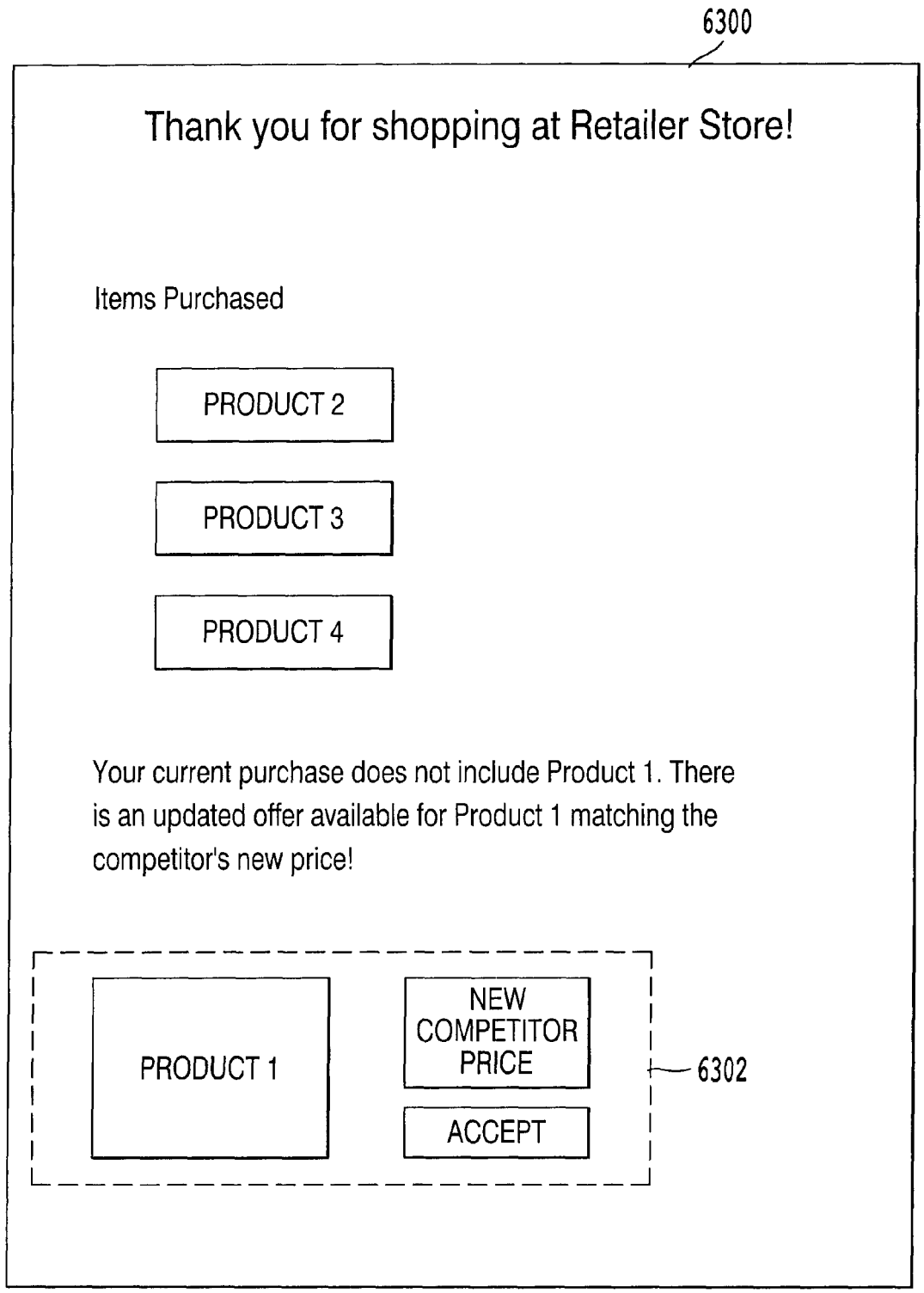
FIG. 63 illustrates and exemplary interface displayed on a POS device while a customer is making a purchase.

FIG. 63 illustrates an example interface 6300 displayed to the customer while a customer is making a purchase. In embodiments, the interface 6300 is displayed via a mobile application on the customer's phone. In another embodiment, the interface 6300 is displayed at an in-store kiosk while the customer is performing a self-checkout. As illustrated in FIG. 63, the customer purchased Products 2-4, but did not purchase Product 1. Accordingly, in some embodiments, the customer is provided with an updated personalized offer 6302 including a competitor's new price for Product 1. If the customer accepts the updated offer 6302, the competitor's new price for Product 1 is associated with the customer's account and loaded onto the customer's loyalty medium.

Figure 64:
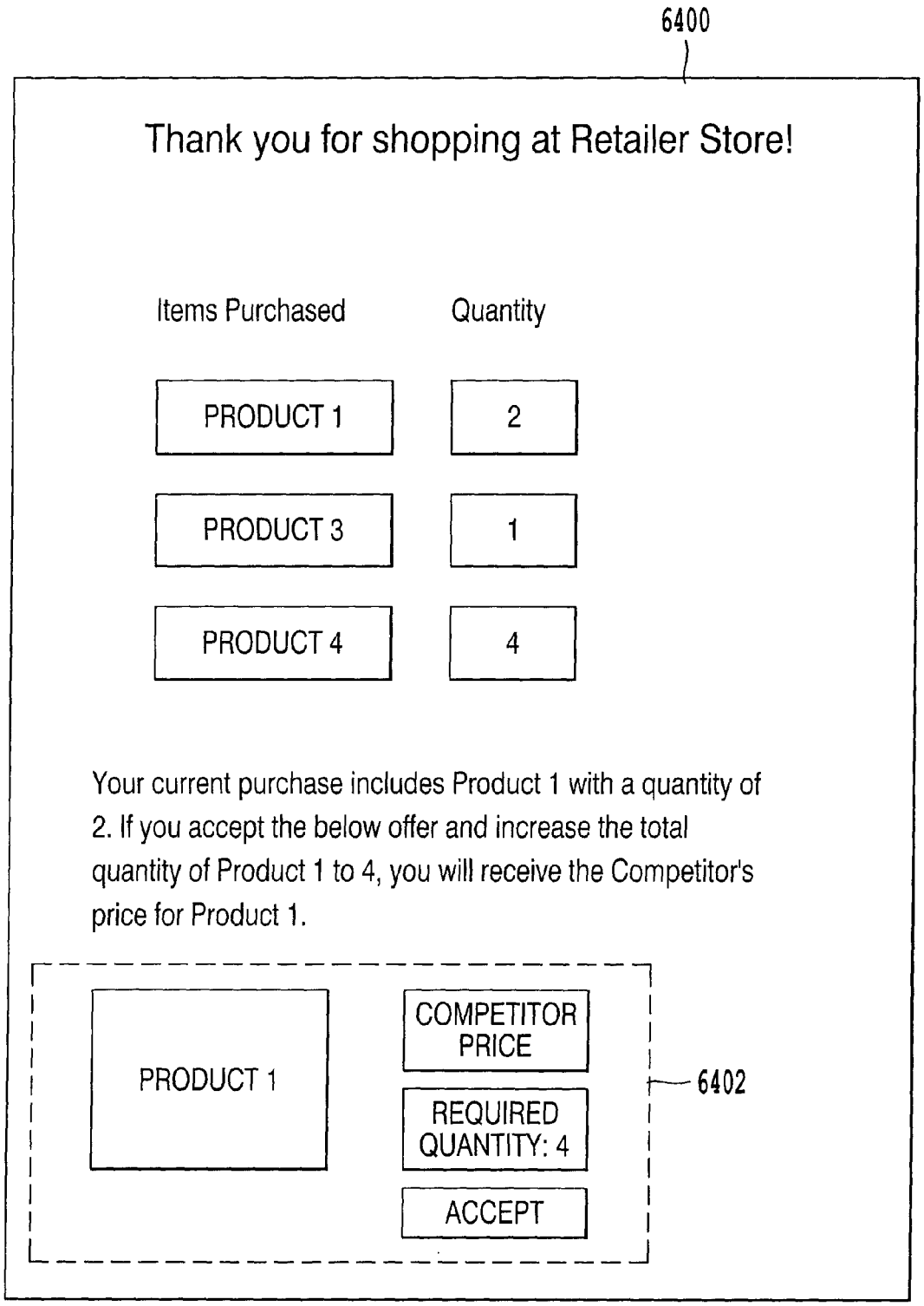
FIG. 64 illustrates an exemplary interface displayed on a POS device while a customer is making a purchase.

In further embodiments, an offer for a competitor price provided to the customer (e.g., via mobile application or in-store kiosk) may include limits that entice the customer to continue shopping at the retailer. For example, if the customer's current purchase does not include the product for which an unaccepted personalized offer or an updated personalized offer for a competitor price is available, the personalized offer may include quantity and/or time limits on the offer. In some embodiments, when a customer is purchasing a product, a personalized offer for a competitor's price provided to the customer (e.g., via mobile application or in-store kiosk) indicates that the customer can receive the competitor's price if the quantity of the purchased product is increased. FIG. 64 illustrates an example interface 6400 displayed to the customer either via a mobile application or an in-store kiosk while a customer is making a purchase. As illustrated in FIG. 64, the customer is purchasing Product 1 with a quantity of 2. However, if the customer accepts the personalized offer 6402 and increases the total purchased quantity of Product 1 to 4, the customer receives the competitor's price for Product 1. In additional embodiments, the personalized offer 6402 is an updated offer including a new competitor's price that is different than a previously accepted competitor's price for Product 1.

In other embodiments, if the customer accepts the personalized offer for the competitor's price, the offer for the competitor's price may only be valid for a specified period of time to entice that the customer to continue shopping at the retailer. FIG. 65 illustrates an example interface 6500 displayed to the customer either via a mobile application or an in-store kiosk while a customer is making a purchase. As illustrated in FIG. 65, the customer purchased products 2-4, but did not purchase Product 1. Personalized offer 6502 specifies that if the customer accepts the offer, the customer receives the competitor's prices for Product 1 for the next offer. Thus, by accepting the personalized offer 6502, the customer has incentive to return to the retailer's store and continue making purchases.

According to some embodiments, an offer for a competitor's price for a product takes into account the brands associated with the product. For example, a product may be associated with brands B1 and B2. In some embodiments, if a customer's purchase history indicates a customer preference for B1 over B2, and a competitor is offering B1 for a lower price than the retailer, the customer is offered the competitor's price for B1 to entice the customer to continue purchasing B1 from the retailer. In other embodiments, if a customer's purchase history indicates a customer preference for B1 over B2, a competitor is offering B2 for a lower price than the retailer, and B2 is associated with a CPG partner, the customer is offered the competitor's price for B2 to entice the customer to start purchasing B2.

According to embodiments, the competitor's price for a product is stored in a database. As an example, one or more entities associated with the retailer may collect data regarding a competitor's price for the product. In other embodiments, when a customer is logged onto the customer's account, the customer may be provided the opportunity of entering a competitor's price for a product. For example, when the customer is interested in purchasing a product from the retailer and has knowledge that the retailer's competitor is offering the product as a different price, the customer may indicate in their account the competitor's price for the product. FIG. 66 illustrates an example interface 6600 where a customer specifies a product for which the customer desires to receive a personalized offer.

In some embodiments, an information area 6602 is provided to the customer to enter information identifying a product such as the product's name and brand, information identifying a competitor such as the competitor's name and location, and the competitor's price for the product.

FIG. 67 illustrates an example competitor price matching interface 6700 which includes one or more competitor price offers such as competitor price offer 6702. In embodiments, the competitor price offer specifies a competitor 6704, a product 6706, the competitor's price 6708, and any limits 6710 associated with the competitor price offer 6702. The user can load the competitor's price 6708 for the product 6706 onto the user's loyalty medium by selecting the add button 6712. FIG. 68 illustrates another example competitor price matching interface 6800 providing one or more competitor price offers for another competitor.

Figure 69:
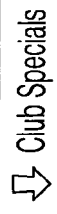
FIG. 69 illustrates an exemplary user dashboard interface.

FIG. 69 illustrates an example user dashboard interface 6900. According to some embodiments, the user dashboard interface 6900 presents competitor prices for products based upon customer buying habits. For example, if the customer's purchase history indicates a preference for a particular product, an offer including a competitor price for that product is included in the user dashboard interface 6900.

FIG. 70 illustrates an example shopping list 7000 illustrating products for which the user accepted a competitor's price. FIG. 71 illustrates another example shopping list 7100 illustrating products for which the user accepted a competitor's price.

Figure 72:
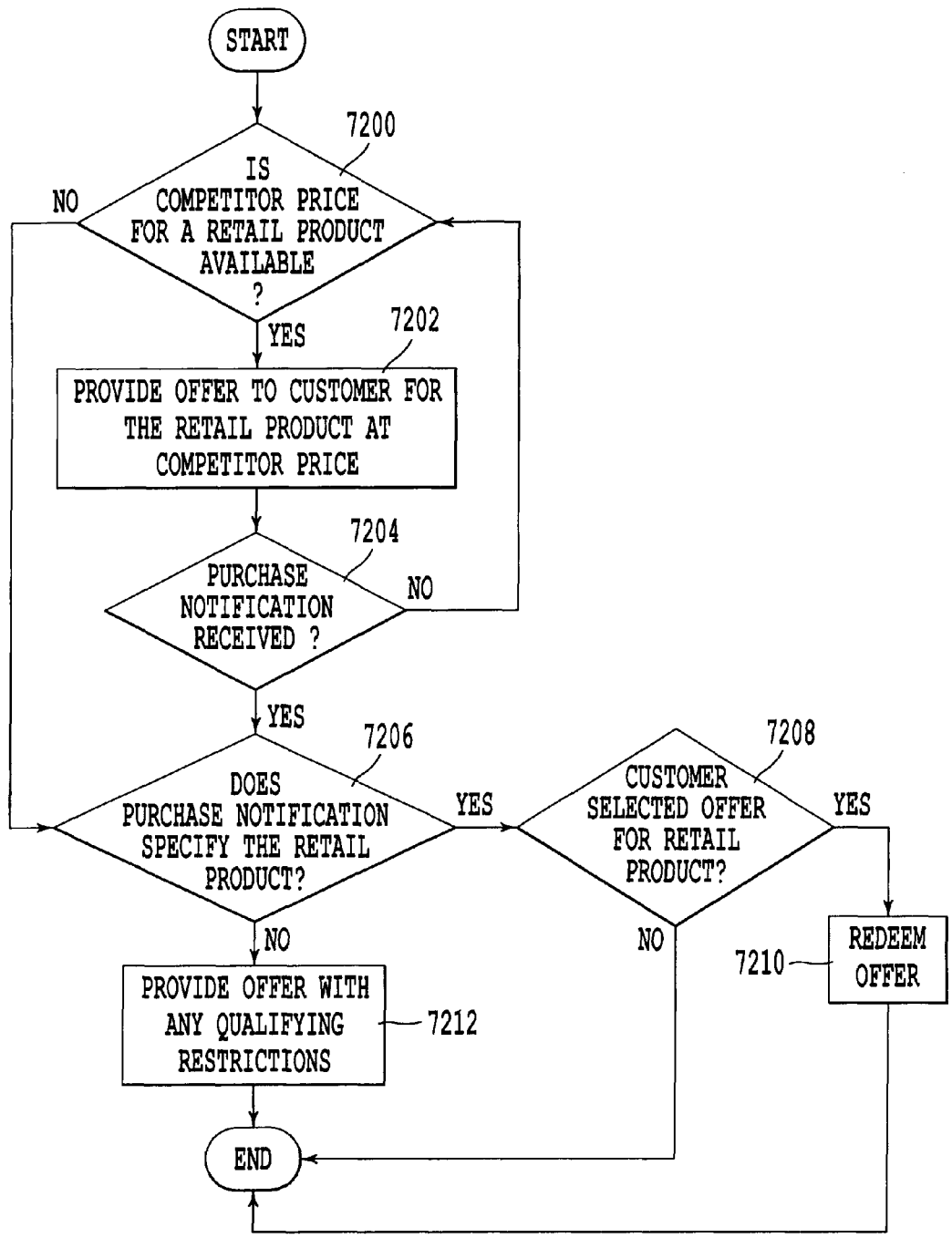
FIG. 72 illustrates an exemplary flow chart for providing customized offers at competitor prices.

FIG. 72 illustrates an example flow chart for providing customized offers at competitor prices. In embodiments, the process illustrated in FIG. 72 is started upon a customer registered with the discount savings program and accessing the customer's account either through a computer terminal, an in-store kiosk, or mobile application. The process may generally start at 7200 or it is determined if a competitor price for a retail product is available. According to some embodiments, a competitor price for a retail product becomes available when a competitor of the retailer is offering the retail product at a lower price than the customer. If no competitor price for the retail product is available, process flow proceeds from 7200 to 7206. If a competitor price for a retail product is available, process flow proceeds from 7200 to 7202 to provide a customized offer to the customer for the retail product at the competitor price. As an example, any one of offers 6002, 6004, and 6006 illustrated in FIG. 60 may be provided to a customer if a competitor price becomes available. In embodiments, if a customer accepts a customized offer at a competitor price, the competitor price is loaded onto a loyalty medium associated with the customer's account.

Process flow proceeds from 7202 to 7204 to determine if a purchase notification is received. As an example, when a customer makes a purchase and scans their loyalty medium at an in-store kiosk, a purchase notification may be sent to an enterprise server storing the customer's account, where the purchase notification specifies the customer's account and each product the customer is purchasing. If no purchase notification is received, process flow returns from 7204 to 7200. If a purchase notification is received, process flow proceeds from 7204 to 7206 to determine if the purchase notification specifies the retail product. If the purchase notification specifies the retail product, process flow proceeds from 7206 to 7208 to determine if the customer selected an offer for the retail product. If the customer has selected an offer for the retail product, process flow proceeds from 7208 to 7210 to redeem the offer.

As an example, if a customer accepted a customized offer providing a competitor price for the retail product, the customer is provided the competitor price upon purchase of the retail product. If a customer did not select an offer for the retail product, and the purchase notification specifies that the customer is purchasing the retail product, process flow terminates at 7208 since there is no incentive to provide the customer with a customized offer. If the purchase notification specifies the retail product, process flow proceeds from 7206 to 7212 to provide a customized offer along with any qualifying restrictions.

As an example, if the purchase notification indicates that the customer is not purchasing a retail product, and an allocated customized offer for a competitor price was not selected by the customer, the customized offer for the competitor price may be displayed to the customer via a mobile application or on an in-store kiosk. Further, the display of the customized offer at the competitor price may include any restrictions on the offer as illustrated in FIGS. 64 and 65. In another example, if the customer has already accepted a customized offer for the retail product at a competitor price, but the customer is not currently purchasing the retail product, an updated offer with a new competitor price may be displayed to the customer.

Mobile Applications

Embodiments are directed to one or more mobile applications that permit customers to access their account and receive customized offers and/or shopping lists on the customer's mobile device. As an example, one or more mobile applications associated with the retailer may be downloaded from the retailer's server 102 onto the customer's mobile device 110 (FIG. 1). The mobile application permits customers to access the customer's account, where the customer can view his or her personalized offers and account information. In embodiments, the mobile application can be created for the iPhone®, Android™, Blackberry® platforms, or any other desired mobile platform. In additional embodiments the mobile application can be created for any desired tablet device such as an iPad®, Motorola Xoom™, etc.

Figure 73:
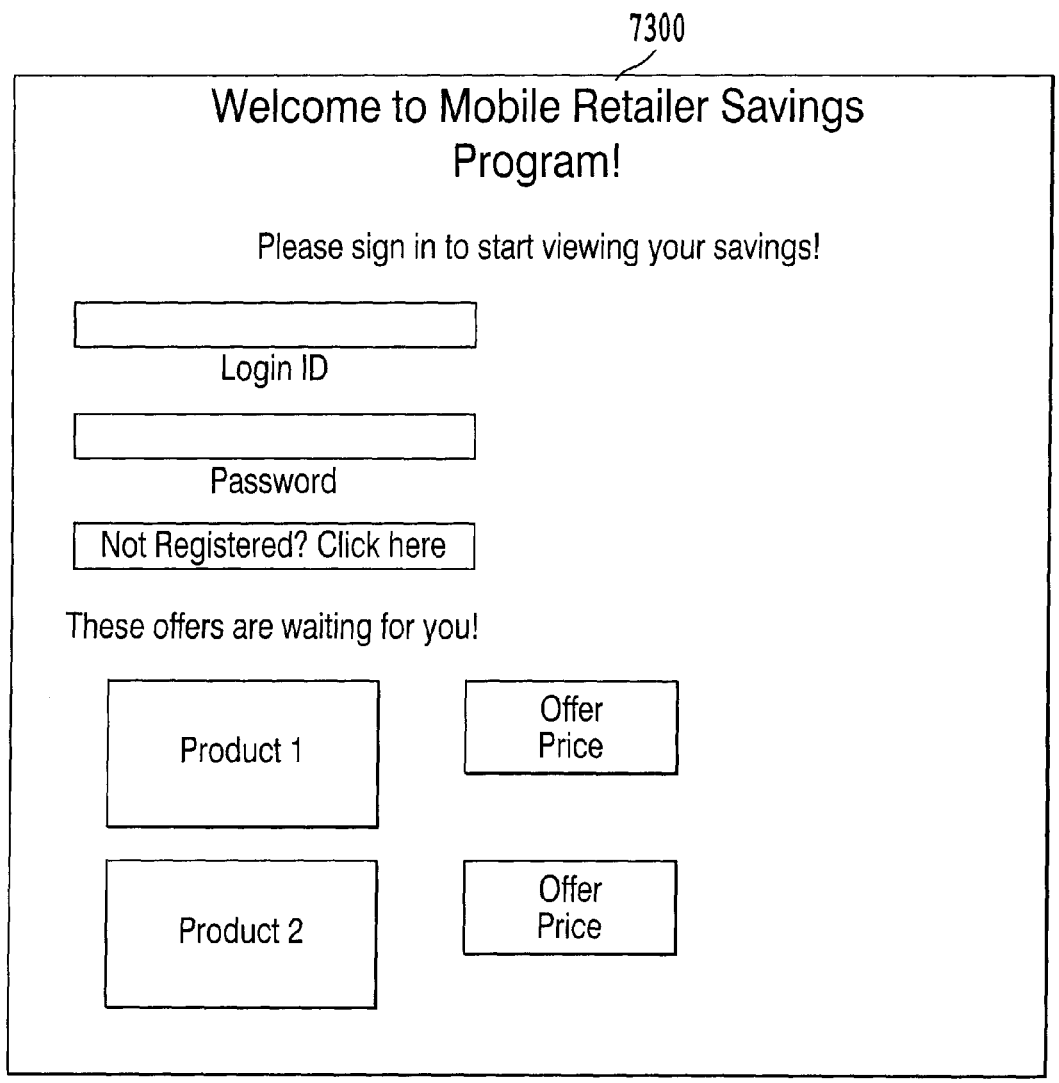
FIG. 73 illustrates an exemplary mobile user interface.

According to some embodiments, the mobile application provides any of the interfaces illustrated in FIGS. 23-45C on a user's mobile device. FIG. 73 illustrates an example mobile user interface 7300. In some embodiments, a mobile application provides location based marketing via the customer's mobile device. As an example, upon activation of the mobile application, the customer may receive retailer advertisements, coupons, and/or offers on the mobile device.

Figure 74:
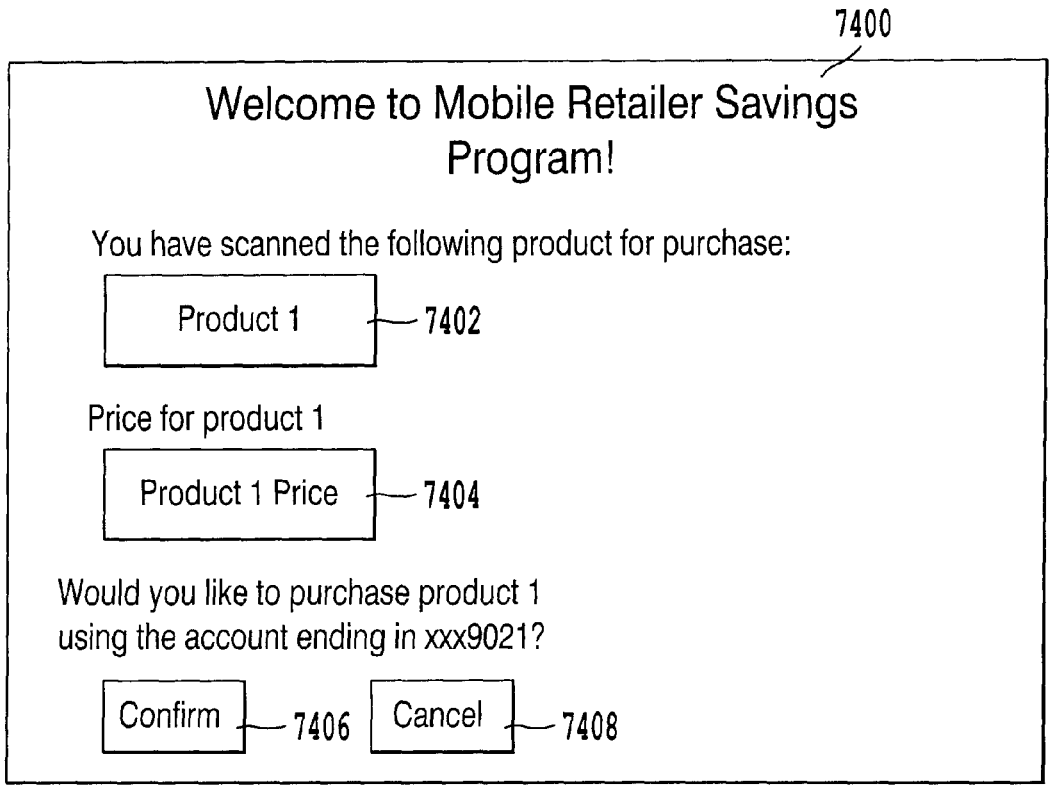
FIG. 74 illustrates an exemplary mobile purchase interface.

In further embodiments, the mobile application permits the customer to make payments via the mobile device. As an example, a customer can use the mobile device to scan a barcode associated with an item, where the item's purchase price is uploaded to the customer's mobile device. In another example, a customer can use the mobile device's near field communication capability or FOB to scan any tag associated with the item, where the scanned tag provides the purchase price of the item to the mobile application. FIG. 74 illustrates an example mobile purchase interface 7400 showing the item and the item's purchase price on the customer's mobile device, where the customer can confirm payment of the item. For example, FIG. 74 illustrates that the customer scanned Product 1 7402 having a purchase price 7404. In some embodiments, if the customer has accepted already accepted a customized offer for Product 1, the purchase price 7404 reflects the offer price. In further embodiments, if an offer for Product 1 has not been loaded onto the customer's loyalty medium, the offer is displayed in the mobile purchase interface 7400. The customer's account may be linked to the customer's personal checking account where the mobile application permits the customer to directly deduct the item's purchase amount from the customer's checking account. For example, as illustrated in FIG. 74, the customer can select the confirm button 7406 to have the purchase price 7404 deducted from the customer's account ending in 9021. The customer may cancel the transaction by selecting the cancel button 7408.

Figure 75:
FIG. 75 illustrates another exemplary mobile purchase interface.

In another example, upon checkout of items at a POS device, the POS device can transmit a total purchase amount to the retailer's server, where the mobile application retrieves the total purchase amount, and the customer can confirm payment of the purchase amount. According to some embodiments, the customer is required to confirm the purchase before the customer leaves the store. In other embodiments, the customer is required to confirm the purchase within a predetermined time limit (e.g., one week). FIG. 75 illustrates an example mobile purchase interface 7500 showing a total purchase price 7502 for the customer's transaction. The customer can select the confirm button 7504 to have the total purchase price 7502 deducted from the customer's account ending in 9021, or the customer can cancel the transaction by selecting the cancel button 7506.

Figure 76:
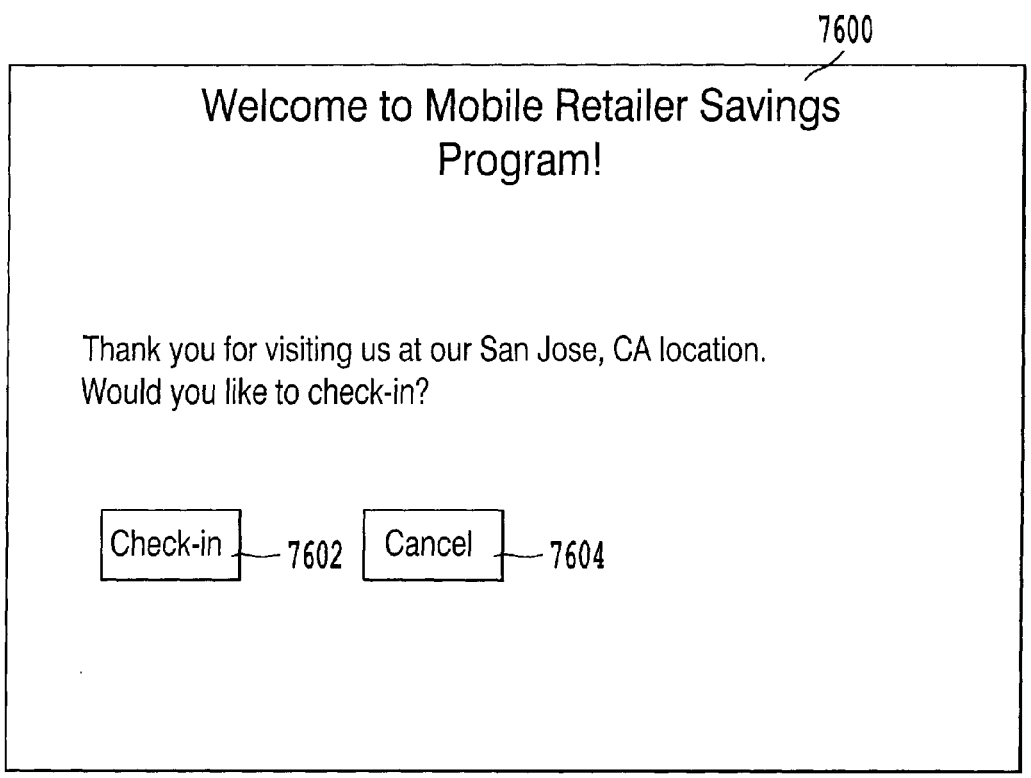
FIG. 76 illustrates an exemplary mobile check-in interface.

In some embodiments, the mobile application permits the customer to check-in at the store, where the customer's shopping list can be displayed with that particular store's aisle numbers. FIG. 76 illustrates an example mobile check-in interface 7600. For example, when the customer enters the retailer store in San Jose, Calif., the customer can select the check-in button 7602 for that particular store or proceed without check-in by selecting the cancel button 7604. In further embodiments, when customer checks in at a store via the mobile application, the customer's shopping list from the customer's account is displayed on the mobile device with the retailer's San Jose store's aisle numbers.

Figure 77:
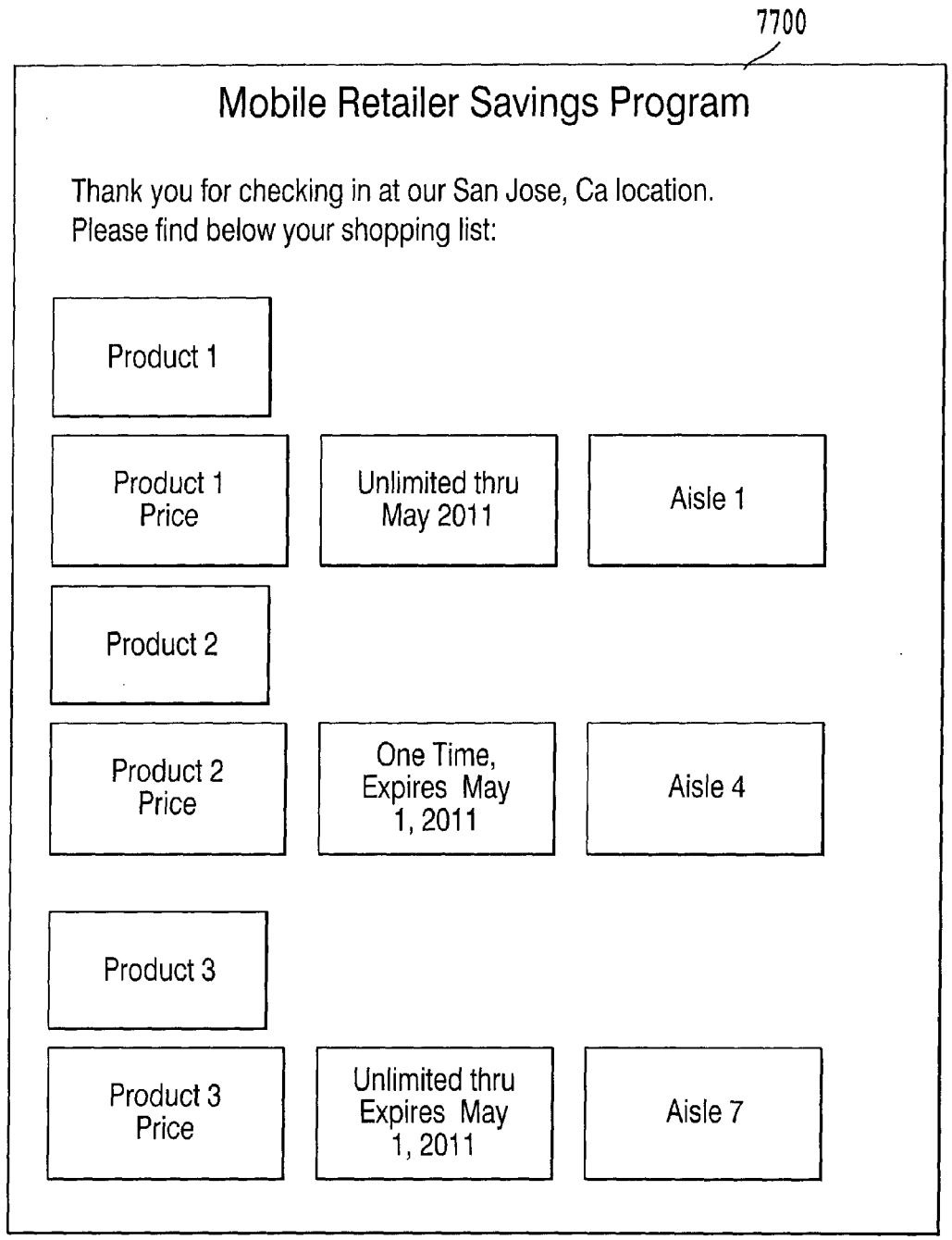
FIG. 77 illustrates an exemplary mobile shopping list interface.
Figure 78:
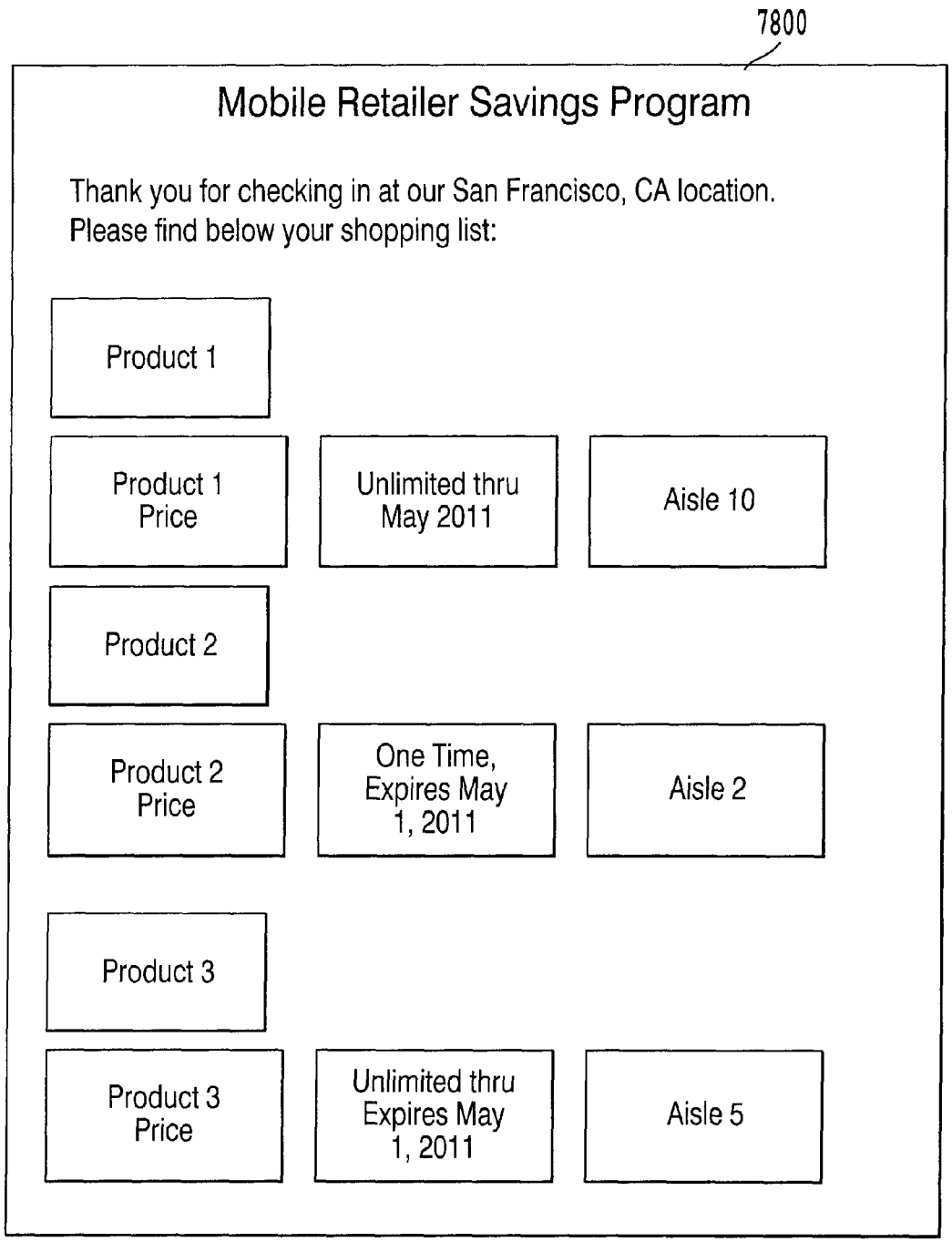
FIG. 78 illustrates another exemplary mobile shopping list interface.

FIG. 77 illustrates an example mobile shopping list interface 7700 displaying the San Jose store aisle numbers for each product included in the list. In another example, when the customer is shopping at the retailer's San Francisco, Calif. location, the customer can check-in at the San Francisco store, where the customer's shopping list is displayed on the mobile device with the retailer's San Francisco store's aisle numbers. FIG. 78 illustrates another mobile shopping list interface 7800 displaying the San Francisco store aisle numbers for each product included in the list.

Thus, by providing the shopping list on the customer's mobile device via the mobile application, users do not have to remember to print the shopping list and bring them to the store. Further, by correlating a particular store's aisle numbers with the customer's shopping list, the user saves time since the user does not have to look for the items in the store. In further embodiments, the users receive additional savings from the additional offers printed on the shopping list.

By permitting the customer to check-in via the mobile application at a particular store, the retailer has knowledge when the shoppers come in to the stores. Further, the check-ins may be used to trigger the activation of any desired loyalty program. The shopping list printout can be a platform for further shopper personalization, 1:1 marketing, and couponing.

Obviously, numerous modifications and variations of the present advancements are possible in light of the above teachings. It is therefore to be understood that within the scope of the appended claims, the advancements may be practiced otherwise than as specifically described herein. It is further understood that any features from the customized savings programs, special programs, convenience programs, club specials shopping lists, competitor pricing, mobile applications, and/or offer games can be combined with each other to provide any desired user interface or provide any desired offer.

The invention claimed is:

1. An individualized discount and reward system comprising:
a mobile device in communication with a rewards server; the mobile device comprising:
one or more non-transitory computer readable memories to store a mobile application and customer data, the customer data associated with a loyalty program of a retailer, the customer data including at least one retailer account and purchase history associated with a customer;
a communications interface that communicates with the rewards server over a wireless communication network, the mobile application downloaded from the rewards server to the mobile device over the wireless communication network;

a user interface to receive customer input; and a processor configured to:
  display the mobile application via the user interface,
  display a log-in page permitting a customer to access the at least one retailer account associated with the customer,
  receive, from the rewards server, a price point generated by the rewards server, for at least one customized offer for the customer generated by the rewards server,
  display to the customer, via the mobile application, one or more display pages including a categorical display of a plurality of offers that includes the at least one customized offer and an offer selection option for individual selection of each offer included in the plurality of offers, the price point for the at least one customized offer including a loyalty adjustment of at least one product in accordance with the at least one customized offer,
  display to the customer, via the mobile application, a shopping list page including designated shopping list, each offer included in the customer designated shopping list being individually designated by the customer, and
  update, upon reception of the customer input indicating selection of the at least one customized offer, the at least one retailer account associated with the customer to indicate selection of the at least one customized offer, wherein selection of the at least one customized offer is distinct from redemption of the at least one customized offer; and the rewards server comprising:
  a processor configured to:
    allocate the at least one customized offer to the at least one retailer account using at least the purchase history associated with the customer, the at least one customized offer including a loyalty adjustment changing a general market price point of a retail product to a purchase price at or below a competitor price offered for a competing product by a competitor of the retailer, the competitor located within a geographic location specified in the at least one retailer account, wherein the loyalty adjustment is based on at least the purchase history;
    receive a purchase notification from a point of sale device, the purchase notification including the at least one retailer account associated with the customer;
    upon reception of the purchase notification from the point of sale device,
      i) divert the purchase notification to a second server which is operated by the retailer and separate from the rewards server, and
      ii) distribute one or more functions to the second server to prevent the individualized discount and reward server from being slowed down, the one or more functions distributed to the second server including:
        communicate with the mobile device to confirm a payment for the retailer.

2. The system according to claim 1, wherein the processor of the mobile device is further configured to:
  display, via the mobile application, an option to check in at a store associated with the retailer according to a current location of the mobile device.

3. The system according to claim 2, wherein the processor of the mobile device is further configured to:
  retrieve from the at least one retailer account, upon selection of the option to check-in at the store, the customer designated shopping list, and
  display, via the mobile application, the retrieved customer designated shopping list and a corresponding location in the store for each product included in the customer designated shopping list.

4. The system according to claim 1, wherein the mobile device is a smartphone.

5. The system according to claim 1, wherein the mobile device is a tablet device.

6. The system according to claim 1, wherein the categorical display of the plurality of offers is sorted according to the purchase history associated with the customer.

7. The system according to claim 1, wherein the customer designated shopping list includes at least one product that is not associated with the plurality of offers.

8. The system according to claim 1, the mobile device further comprising:
  a barcode scanner configured to scan a barcode of the retail product, wherein the processor of the mobile device is further configured to:
    display the purchase price, is the mobile application, for the retail product upon identification of the barcode scanned by the barcode scanner,
    display an option for payment, via the mobile application, of the retail product using at least one monetary payment account associated with the at least one retailer account, and
    update, upon reception of the customer input indicating selection of the payment option, the at least one retailer account to indicate a deduction of the displayed purchase price from the at least one monetary payment account.

9. The system according to claim 1, wherein the processor of the mobile device is further configured to display to the customer, via the mobile application, one or more offer acceptance pages including each offer from the plurality of offers individually selected by the customer and a shopping list selection option for individual selection of each individually selected offer to be added to the customer designated shopping list.

10. The system according to claim 1, wherein the processor of the mobile device is further configured to update the display of the customer designated shopping list on the shopping list page upon reception of a notification from the reward server that the at least one customized offer has been redeemed.

11. An individualized discount and reward system comprising:
  a mobile device in communication with a rewards server;
  the mobile device comprising:
    one or more non-transitory computer readable memories to store a mobile application an customer data, the customer data associated with a loyalty program of a retailer, the customer data including at least one retailer account and purchase history associated with a customer;
    a communications interface that communicates with the rewards server over a wireless communication network, the mobile application downloaded from the rewards server to the mobile device over the wireless communication network;
    a user interface to receive customer input; and
    a processor configured to:
      display a log-in page permitting a customer to access the at least one retailer account associated with the customer, receive, from the rewards server, a price point generated by the rewards server, for at least one customized offer for the customer generated by the rewards server, display to the customer, via the mobile application, one or more display pages including a categorical display of a plurality of offers that includes the at least one customized offer and an offer selection option for individual selection of each offer included in the plurality of offers, the price point from the at least one customized offer including a loyalty adjustment of at least one product in accordance with the at least one customized offer, the rewards server including:
one or more linked databases to store the mobile application and the customer data associated with the loyalty program of the retailer, the customer data including the at least one retailer account and the purchase history associated with the customer,
a processor, and
a non-transitory computer readable memory which stores instructions, the processor of the rewards server processing the instructions so as to cause the rewards server to:
generate at least one customized offer for the customer,
generate a price point for the at least one customized offer for the customer,
allocate the at least one customized offer to the at least one retailer account using at least the purchase history associated with the customer, the at least one customized offer including a loyalty adjustment changing a general market price point of a retail product to a purchase price at or below a competitor price offered for a competing product by a competitor of the retailer, the competitor located within a geographic location specified in the at least one retailer account, wherein the loyalty adjustment is based on at least the purchase history,
receive a purchase notification from a point of sale device, the purchase notification including the at least one retailer account associated with the customer;
upon reception of the purchase notification from the point of sale device,
i) divert the purchase notification to a second server which is operated by the retailer and separate from the rewards server, and
ii) distribute one or more functions to the second server to prevent the individualized discount and reward server from being slowed down, the one or more functions distributed to the second server including:
communicate with the mobile device to confirm a payment for the retailer.

12. The system according to claim 11,
the processor of the mobile device further configured to:
display the mobile application via the user interface,
display to the customer, via the mobile application, a shopping list page including a customer designated shopping list, each offer included in the customer designated shopping list being individually designated by the customer, and
update, upon reception of the customer input indicating selection of the at least one customized offer, the retailer account associated with the customer to indicate selection of the at least one customized offer, wherein selection of the at least one customized offer is distinct from redemption of the at least one customized offer.

13. The system according to claim 12, the processor of the mobile device further configured to:
retrieve from the at least one retailer account, upon selection of an option to check-in at store, the customer designated shopping list, and
display, via the mobile application, the retrieved customer designated shopping list and a corresponding location in the store for each product included in the customer designated shopping list.

14. The system according to claim 12, the processor of the mobile device further configured to:
display, via the mobile application, an option to check-in at a store associated with the retailer according to a current location of the mobile device.

15. The system according to claim 12, wherein the mobile device is a smartphone or tablet device.

16. The system according to claim 11, wherein the categorical display of a plurality of offers is sorted according to the purchase history associated with the customer.

17. The system according to claim 12, wherein the customer designated shopping list includes at least one product that is not associated with a plurality of offers.

18. The system according to claim 12, wherein the mobile device further includes:
a barcode scanner configured to scan a barcode of the retail product, wherein the processor of the mobile device is further configured to:
display the purchase price, via the mobile application, for the retail product upon identification of the barcode scanned by the barcode scanner,
display an option for payment, via the mobile application, of the retail product using at least one monetary payment account associated with the at least one retailer account, and
update, upon reception of the customer input indicating selection of the payment option, the at least one retailer account to indicate a deduction of the displayed purchase price from the at least one monetary payment account.

19. The system according to claim 12, wherein the processor of the mobile device is further configured to display to the customer, via the mobile application, one or more offer acceptance pages including each offer from a plurality of offers individually selected by the customer and a shopping list selection option for individual selection of each individually selected offer to be added to the customer designated shopping list.

20. The system according to claim 11, wherein the processor of the mobile device is further configured to update the display of a customer designated shopping list on a shopping list page upon reception of a notification from the reward server that the at least one customized offer has been redeemed.

* * * * *

UNITED STATES PATENT AND TRADEMARK OFFICE
CERTIFICATE OF CORRECTION

PATENT NO.        : 9,355,403 B2
APPLICATION NO.   : 13/072567
DATED             : May 31, 2016
INVENTOR(S)       : David Edward Thomas et al.

It is certified that error appears in the above-identified patent and that said Letters Patent is hereby corrected as shown below:

In the claims:

Claim 1, column 45, line 24, replace "including designated" with --including a customer designated--.
Claim 1, column 45, line 62, replace "retailer." with --retail product.--.
Claim 2, column 45, line 65, replace "check in" with --check-in--.
Claim 8, column 46, line 24, replace "price, is the" with --price, via the--.
Claim 11, column 46, line 54, replace "application an customer" with --application and customer--.
Claim 11, column 47, line 11, replace "from the at least" with --for the at least--.
Claim 11, column 47, line 15, replace "data associated" with --data, associated--.
Claim 11, column 47, line 37, replace "history," with --history;--.
Claim 11, column 47, line 52, replace "retailer." with --retail product.--.

Signed and Sealed this
Twelfth Day of July, 2016

Michelle K. Lee
*Director of the United States Patent and Trademark Office*